United States Patent
Sato et al.

(10) Patent No.: US 8,111,414 B2
(45) Date of Patent: Feb. 7, 2012

(54) IMAGE PROCESSING APPARATUS, CONTROL METHOD THEREOF, AND PROGRAM

(75) Inventors: Tomoya Sato, Kawasaki (JP); Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 11/908,578

(22) PCT Filed: May 16, 2006

(86) PCT No.: PCT/JP2006/310086
§ 371 (c)(1),
(2), (4) Date: Sep. 13, 2007

(87) PCT Pub. No.: WO2006/123806
PCT Pub. Date: Nov. 23, 2006

(65) Prior Publication Data
US 2009/0080013 A1   Mar. 26, 2009

(30) Foreign Application Priority Data
May 18, 2005  (JP) ................................. 2005-145881

(51) Int. Cl.
*G06F 3/12* (2006.01)
*H04N 1/40* (2006.01)
(52) U.S. Cl. ...................................... 358/1.15; 358/448
(58) Field of Classification Search .................. 358/1.15, 358/1.12, 448, 468, 443, 434, 426.12, 438, 358/439, 442, 1.9, 2.1
See application file for complete search history.

(56) References Cited

U.S. PATENT DOCUMENTS

| 5,905,866 | A | 5/1999 | Nakabayashi et al. |
| 6,078,415 | A | 6/2000 | Yamamoto |
| 6,553,431 | B1 | 4/2003 | Yamamoto et al. |
| 6,785,023 | B1 | 8/2004 | Iida |
| 7,069,292 | B2 | 6/2006 | Sugahara |
| 7,113,304 | B2 | 9/2006 | Iida |
| 7,120,910 | B2 | 10/2006 | Matsuda et al. |
| 7,139,093 | B2 * | 11/2006 | Iida .............................. 358/1.15 |
| 7,167,264 | B2 | 1/2007 | Takamiya |
| 7,327,478 | B2 | 2/2008 | Matsuda |
| 7,516,450 | B2 * | 4/2009 | Ogura .......................... 717/168 |

(Continued)

FOREIGN PATENT DOCUMENTS
EP    1 024 652    2/2000

(Continued)

OTHER PUBLICATIONS

Japanese Office Action dated Jan. 18, 2010 issued during prosecution of related Japanese application No. 2005-145881.

(Continued)

*Primary Examiner* — Jerome Grant, II
(74) *Attorney, Agent, or Firm* — Fitzpatrick, Cella, Harper & Scinto

(57) ABSTRACT

When information on addition and change of data which is stored in an apparatus and dynamically changes is set as a monitoring target, the information is accumulated in a syndication by an application management interface. Periodically or in response to a request, an update information generation unit reproduces an entry in the syndication as an RSS feed, i.e., XML data complying with the RSS feed standard in accordance with a template, and saves the XML data in an update information storage unit. A computer executes an RSS reader to acquire and display the RSS feed in the update information storage unit.

31 Claims, 40 Drawing Sheets

U.S. PATENT DOCUMENTS

| | | | |
|---|---|---|---|
| 7,600,226 B2 | 10/2009 | Aiba | |
| 2001/0029521 A1 | 10/2001 | Matsuda et al. | |
| 2002/0039148 A1 | 4/2002 | Yamamoto | |
| 2002/0122203 A1 | 9/2002 | Matsuda | |
| 2003/0137682 A1 | 7/2003 | Sakai et al. | |
| 2004/0148379 A1* | 7/2004 | Ogura | 709/223 |
| 2004/0196508 A1* | 10/2004 | Iida | 358/442 |
| 2005/0055451 A1 | 3/2005 | Tsuyama | |
| 2007/0139698 A1 | 6/2007 | Sato | |
| 2009/0080013 A1* | 3/2009 | Sato et al. | 358/1.15 |

FOREIGN PATENT DOCUMENTS

| | | |
|---|---|---|
| EP | 1 143 695 | 10/2001 |
| EP | 1 385 089 | 1/2004 |
| JP | 4-139557 | 5/1992 |
| JP | 10-232815 A | 9/1998 |
| JP | 11-110223 | 4/1999 |
| JP | 2000-222333 | 8/2000 |
| JP | 2001-84137 | 3/2001 |
| JP | 2001-169236 | 6/2001 |
| JP | 2001-225531 | 8/2001 |
| JP | 2001-232908 | 8/2001 |
| JP | 2001-273030 | 10/2001 |
| JP | 2001-312462 | 11/2001 |
| JP | 2002-149478 A | 5/2002 |
| JP | 2003-177989 | 6/2003 |
| JP | 2003-281147 | 10/2003 |
| JP | 2004-025455 | 1/2004 |
| JP | 2004-62531 | 2/2004 |
| JP | 2004-129047 | 4/2004 |
| JP | 2004-230828 | 8/2004 |
| JP | 2004-259222 | 9/2004 |
| JP | 2004-266470 | 9/2004 |
| JP | 2005-092330 | 4/2005 |
| WO | WO2006123806 | * 11/2006 |

OTHER PUBLICATIONS

Tatsuhiko Miyagawa, "Web application programming recipe, Cookbook", WEB+DB Press, Japan, Gijutsu-Hyohron Co., Ltd., Sep. 20, 2003, vol. 16, pp. 220-227. (Partial English Translation provided).

Supplementary European Search Report dated May, 13, 2008 issued during prosecution of European application No. 06732660.3.

Nottingham, M., et al., "The Atom Syndication Form; draft-iet-f-atompub-format-08.txt", IETF Standard-Working Draft, Internet Engineering Task Force, IETF, CH, vol. atompub, No. 8, Apr. 18, 2005.

Hammond, T., et al., "082-9873 of RSS in Science Publishing Syndication and Annotation on th", D-LIB Magazine, Corporation for National Research Initiatives, Reston, VA, US, vol. 10, No. 12, Dec. 2004. pp. 1-16.

Dan Brickley et al., "RDF Site Summary (RSS) 1.0" [online] May 30, 2001, RSS-Dev Working Group, [searched on Mar. 17, 2005, <URL:http://purl.org/rss/1.0/spec>.

U.S. Appl. No. 11/908,580, filed Sep. 13, 2007.

Japanese Office Action issued on Sep. 21, 2010 during prosecution of related Japanese application No. 2010-064935.

Japanese Office Action dated Aug. 7, 2009 concerning Japanese Patent Application No. 2005-145882.

M. Nottingham, et al., "The Atom Syndication Forma draft-ietf-atompub-froamat-03", [online] Oct. 20, 2004, RSS-DEV Working Group, [searched on Mar. 17, 2005], Internet. <URL:http://atompub.org/2004/10/20/draft-ietf-atompub-format-03.txt>.

* cited by examiner

FIG. 12

Service Management Service

FILE (F) EDIT (E) VIEW (V) FAVORITES (A) TOOLS (T) HELP (H)

BACK ▼ | SEARCH FAVORITES MEDIA

ADDRESS (D): http://172.24.16.111:8000/sms/  GO LINK

▼ javascript CONSTRUCTOR ▶ WEB SEARCH ▼ SEARCH ☐ OPTIONS

PRINT | HIGH-SPEED PRINT | PREVIEW | OPTIONS | DISPLAY PRINT LIST

Service Management Service

| APPLICATION LIST | INSTALL | SYSTEM MANAGEMENT | LOG OUT |

APPLICATION LIST  1301  1302  1306  1303  1307
1304          1305 — UNINSTALL | START | STOP

| | NAME | INSTALL DATE | APPLICATION ID | STATE | LICENSE | RESOURCE USE STATUS |
|---|---|---|---|---|---|---|
| ⊙ | Bundle | 2004/11/27 | 4d06d282-deb4-462e-bd48-71167c177144 | START | IN-STALLED | DISK CAPACITY: 4KB<br>MEMORY: 100KB<br>THREAD: 0<br>SOCKET: 0<br>FILE DESCRIPTOR: 0 |
| ○ | USBMouse Applet-Service | 2004/11/04 | 81074d5a-ac96-4b62-9121-94a608bdd4bd | IN-STALLED | UNNEC-ESSARY | DISK CAPACITY: 19KB<br>MEMORY: 1004KB<br>THREAD: 2<br>SOCKET: 0<br>FILE DESCRIPTOR: 0 |
| ○ | PortalService | 2004/10/29 | 0906ebfc-d39e-4149-9cc5-3caa528fcd03 | START | UNNEC-ESSARY | DISK CAPACITY: 1KB<br>MEMORY: 220KB<br>THREAD: 1<br>SOCKET: 0<br>FILE DESCRIPTOR: 1 |

RESOURCE INFORMATION  1308

| | AMOUNT USED | REMAINING AMOUNT | USE RATIO |
|---|---|---|---|
| HARD DISK | 24KB | 271363 KB | 0% |
| MEMORY | 320KB | 23827 KB | 1% |
| THREAD | 1 | 185 | 1% |
| SOCKET | 0 | 82 | 0% |
| FILE DESCRIPTOR | 1 | 46 | 2% |

DEVICE SERIAL No. JAD00832

PAGE IS DISPLAYED                                INTRANET

FIG. 14

Service Management Service

FILE (F)  EDIT (E)  VIEW (V)  FAVORITES (A)  TOOLS (T)  HELP (H)

BACK▼ ⊗ ⊠ ⇩ ⌂ | SEARCH ✱FAVORITES MEDIA | ✉▼ 🖨 ✎ ○ ▸▸

ADDRESS (D): http://172.24.16.111:8000/sms/     ▶ GO|LINK▸▸

▼ [                    ] ▶ WEB SEARCH ▼SEARCH ☐ OPTIONS ▼

PRINT | HIGH-SPEED PRINT | PREVIEW | OPTIONS | DISPLAY PRINT LIST

Service Management Service

| APPLICATION LIST | INSTALL | SYSTEM MANAGEMENT | LOG OUT |
| 1501 | 1502 | 1503 | 1504 |

APPLICATION / LICENSE INFORMATION

APPLICATION INFORMATION

| ITEM | CONTENTS |
|---|---|
| APPLICATION ID | 4d06d282-deb4-462e-bd48-71167c177144 |
| APPLICATION NAME | Bundle |
| INSTALL DATE | 2004/11/27 |
| DESCRIPTION | Test Sample |
| MANUFACTURER | Canon Inc. |
| PRODUCT VERSION | 2.0.0 |

1505           1506                    1507

NEW LICENSE

LICENSE INFORMATION

| ITEM | CONTENTS |
|---|---|
| STATE | INSTALLED |
| SERIAL No. | JAD00832 |
| TERM OF VALIDITY | 4/(2005/01/25) |

| COUNTER TYPE | CURRENT VALUE | UPPER LIMIT VALUE |
|---|---|---|
| TOTAL (FULL COLOR / LARGE) | 0 | -- |
| TOTAL (FULL COLOR / SMALL) | 0 | -- |
| TOTAL (FULL COLOR 1) | 0 | -- |
| TOTAL (MONO COLOR / LARGE) | 0 | -- |
| TOTAL (MONO COLOR / SMALL) | 0 | -- |
| TOTAL (MONO COLOR) | 0 | -- |

PAGE IS DISPLAYED                                INTRANET

FIG. 22

```
<?xml.version="1.0" encoding="utf-8"?>
```

2201 — `<rdf : RDF`
```
xmlns : rdf="http://www.w3.org/1999/02/22-rdf-syntax-ns#"
xmlns : dc="http://purl.org/dc/elements/1.1/"
xmlns : sy="http://purl.org/rss/1.0/modules/syndication/"
xmlns : admin="http://webns.net/mvcb/"
xmlns="http://purl.org/rss/1.0/">
```

2202 — `<channel rdf : about="<TMPL_VAR name="systemUrl">">`
2207 — `<title>TMPL_VAR name="webApplicationName"> : <TMPL_VAR name="deviceName"> : <TMPL_VAR name="productName"></title>`
2208 — `<link>TMPL_VAR name="systemUrl"></link>`
```
<description> INSTALLATION LOCATION : <TMPL_VAR name="deviceLocation"> :
ADMINISTRATOR : <TMPL_VAR name="administrator"> : MESSAGE :
<TMPL_VAR name="messageOfTheDay"></description>
<dc : language>ja</dc : language>
```
2301 — `<dc : creator></dc : creator>`
2302 — `<dc : date><TMPL_VAR="lastUpdateDate"></dc : date>`
```
<admin : generatorAgent rdf : resource="<TMPL_VAR name="generatorAgent">"/>

<items>
```
2211 — `<rdf : Seq><TMPL_LOOP name="entry">`
2212 — `<rdf : li rdf : resource="<TMPL_VAR name="entryPermanentLink">"/>`
2213 — `</TMPL_LOOP></rdf : seq>`
```
</items>

</channel>
```

2204 — `<TMPL_VAR name="entry">`
```
<item rdf : about="<TMPL_VAR name="entryPermanentLink">">
```
2217 — `<title>NEW APPLICATION<TMPL_VAR name="entryApplicationName"></title>`
2218 — `<link><TMPL_VAR name="entryPermanentLink"></link>`
```
<description><![CDATA[<TMPL_VAR name="entryDescription">
```
2219 — `<TMPL_IF name="entryIsNewApplication">`
```
<TMPL_VAR name="entryApplicationDescription">
<table summary="APPLICATION INFORMATION TABLE : ATTRIBUTE NAME
ON FIRST COLUMN, AND VALUE ON SECOND COLUMN" border="1">
<caption>APPLICATION INFORMATION</caption>
<tr><th>ATTRIBUTE</th><th>VALUE</th></tr>
<tr><td>USER WHO INSTALLED APPLICATION</td><td>
<TMPL_VAR name="entryOperator"></td></tr>
<tr><td>LICENSE</td><td><TMPL_VAR name="entryLicenseCondition"></td></tr>
<tr><td>DETAILS</td><td><TMPL_VAR name="entryApplicationSeeAlso"></td></tr>
</table>
</TMPL_IF>
]]></description>
```
2304 — `<dc : subject><TMPL_VAR name="entrySubject"></dc : subject>`
2205 — `<dc : creator><TMPL_VAR name="entryOperator"></creator>`
```
<dc : date><TMPL_VAR name="entryDate"></dc : date>
```
2306 — `</item>`
```
<TMPL_LOOP>

</rdf : RDF>
```

FIG. 26

```
2307  <?xml.version="1.0" encoding="utf-8"?>

2201  <rdf : RDF
      xmlns : rdf="http://www.w3.org/1999/02/22-rdf-syntax-ns#"
      xmlns : dc="http://purl.org/dc/elements/1.1/"
      xmlns : sy="http://purl.org/rss/1.0/modules/syndication/"
      xmlns : admin="http://webns.net/mvcb/"
      xmlns="http://purl.org/rss/1.0/">

2202  <channel rdf : about="http://my-mfp.example.com/">
2207  <title>REMOTE UI : my-mfp : MFP3200</title>
      <link>http://my-mfp.example.com/</link>
2308  <description>INSTALLATION LOCATION : NEW BUILDING 3F;ADMINISTRATOR :
2208  SATO;MESSAGE : PLEASE USE DOUBLE-SIDED COPYING</description>
      <dc : language>ja</dc : language>
2301  <dc : creator></dc : creator>
2302  <dc : date>2004-12-19T23:46:36+09:00</dc : date>
      <admin : generatorAgent rdf : resource="http://canon.com/product/remote-ui/mfp3200/"/>

2211  <items>
2212  <rdf : Seq>
2213  <rdf : li rdf : resource="http://my-mfp.example.com/archives/2004/12/22/0123401 .html"/>
2213  <rdf : li rdf : resource="http://my-mfp.example.com/archives/2004/12/22/0123400 .html"/>
      <!- rdf.li REPEAT li ELEMENT...-->
      </rdf : Seq>
      </items>

</channel>

2204  <item rdf : about="http://my-mfp.example.com/archives/2004/12/22/0123401 .html">
2217  <title>NEW APPLICATION USBMouseApplet-Service</title>
      <link>http://my-mfp.example.com/archives/2004/12/22/0123401 .html</link>
2218  <description><![CDATA[<p><a href="http://my-mfp.example.com : 8000/sms/info/
2219  USBMouseApplet-Service/"><img src="http://my-mfp.example.com : 8000/sms/info/
      USBMouseApplet-Service/logo.png"alt="USBMouseApplet-Service"/></a></p>
      <p>NEW APPLICATION "USBMouseApplet-Service" BECOMES AVAILABLE</p>
      <blockquote cite="http://my-mfp.example.com : 8000/sms/info/USBMouseApplet-Service/">
      <p>USBMouseApplet-Service ALLOWS OPERATING MFP WITH MOUSE
      USB-CONNECTED TO MFP</p></blockquote>
      <table summary="APPLICATION INFORMATION TABLE : ATTRIBUTE NAME ON FIRST
      COLUMN, AND VALUE ON SECOND COLUMN "border="1">
      <caption>APPLICATION INFORMATION</caption>
      <tr><td>ATTRIBUTE</th><th>VALUE</th></tr>
      <tr><td>USER WHO INSTALLED APPLICATION</td><td><a her="mailto :
      yamamoto@example.com">YAMAMOTO</a></td></tr>
      <tr><td>LICENSE</td><td>UNNECESSARY</td></tr>
      <tr><td>DETAILS</td><td><a herf="http://my-mfp.example.com : 8000/sms/info/
      USBMouseApplet-Service/">http://my-mfp.example.com : 8000/sms/info/USBMouseApplet-
      Service/"</a></td></tr>
2304  </table>]]></description>
2305  <dc : subject>NEW APPLICATION</dc : subject>
      <dc : creator>YAMAMOTO</creator>
2306  <dc : date>2004-12-19T23:46:36+09:00</dc : date>
      </item>

<item rdf : about="http://my-mfp.example.com/archives/2004/12/22/0123400 .html">
      <!--...-->
      </item>

<!--REPEAT OF item ELEMENT-->

</rdf : RDF>
```

F I G. 34

| | SETTING OF TERM OF VALIDITY OF UPDATE INFORMATION OF RECEIVED DOCUMENT | | |
|---|---|---|---|
| | SOURCE | GENERAL AFFAIRS DEPARTMENT | |
| 4601 | HEAD OFFICE | 3 DAYS ▼ | 4604 |
| 4602 | TERM OF VALIDITY | 7 DAYS ▼ | 4605 |
| 4603 | ... | ... ▼ | 4606 |
| | | OK    CANCEL | |

FIG. 35

```
<?xml.version="1.0" encoding="utf-8"?>
```

2201 — `<rdf : RDF`
`xmlns : rdf="http://www.w3.org/1999/02/22-rdf-syntax-ns#"`
`xmlns : dc="http://purl.org/dc/elements/1.1/"`
`xmlns : sy="http://purl.org/rss/1.0/modules/syndication/"`
`xmlns : admin="http://webns.net/mvcb/"`
`xmlns="http://purl.org/rss/1.0/">`

2202 — `<channel rdf : about="http://my-mfp.example.com/">`
2207 — `<title>REMOTE UI : my-mfp : MFP3200</title>`
`<link>http://my-mfp.example.com/</link>`
2208 — `<description> INSTALLATION LOCATION : NEW BUILDING 3F;`
ADMINISTRATOR : SATO;
MESSAGE : PLEASE USE DOUBLE-SIDED COPYING</description>`
`<dc : language>ja</dc : language>`
4701 — `<dc : creator></dc : creator>`
4702 — `<dc : date>2004-12-19T23:46:36+09:00</dc : date>`
`<admin : generatorAgent rdf : resource="http://canon.com/product/remote-ui/mfp3200/"/>`

2211 — `<items>`
2212 — `<rdf : Seq>`
2213 — `<rdf : li rdf : resource="http://my-mfp.example.com/archives/2004/12/22/0123401.html"/>`
`<rdf : li rdf : resource="http://my-mfp.example.com/archives/2004/12/22/0123400.html"/>`
2214 — `<!- rdf.li REPEAT li ELEMENT...-->`
`</rdf : Seq>`
`</items>`

`</channel>`

2204 — `<item rdf : about="http://my-mfp.example.com/archives/2004/12/22/0123401.html">`
2217 — `<title>PROGRESS REPORT IN OCTOBER</title>`
2218 — `<link>http://my-mfp.example.com/archives/2004/12/22/0123401.html</link>`
2219 — `<description><![CDATA[<p><a href="http://my-mfp.example.com/box/preview/bbs-box/document-63.html"><img src="http://my-mfp.example.com/box/thumbnail/bbs-box/document-63.png"alt="THUMBNAIL IMAGE OF "PROGRESS REPORT IN OCTOBER"align="left"/></a>`
THIS IS BUSINESS PROGRESS REPORT IN OCTOBER</p>
`]]></description>`
4704 — `<dc : subject>ACCUMULATION OF SCANNED DOCUMENT</dc : subject>`
4705 — `<dc : creator>YAMAMOTO</creator>`
`<dc : date>2004-12-19T23:46:36+09:00</dc : date>`
4706 — `</item>`

`<item rdf : about="http://my-mfp.example.com/archives/2004/12/22/0123400.html">`
`<!-...->`
`</item>`

`<!-REPEAT OF item ELEMENT-->`

`</rdf : RDF>`

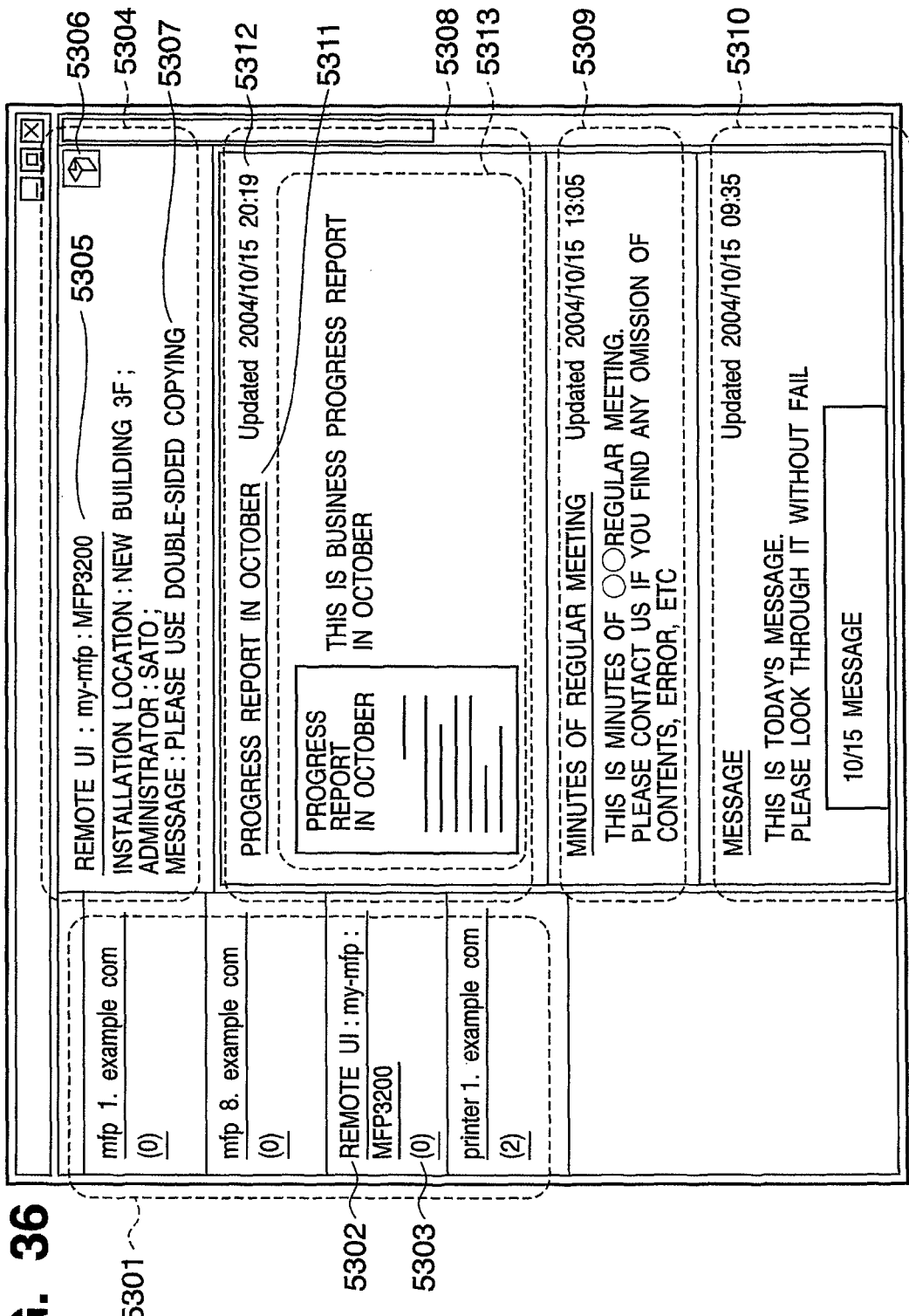

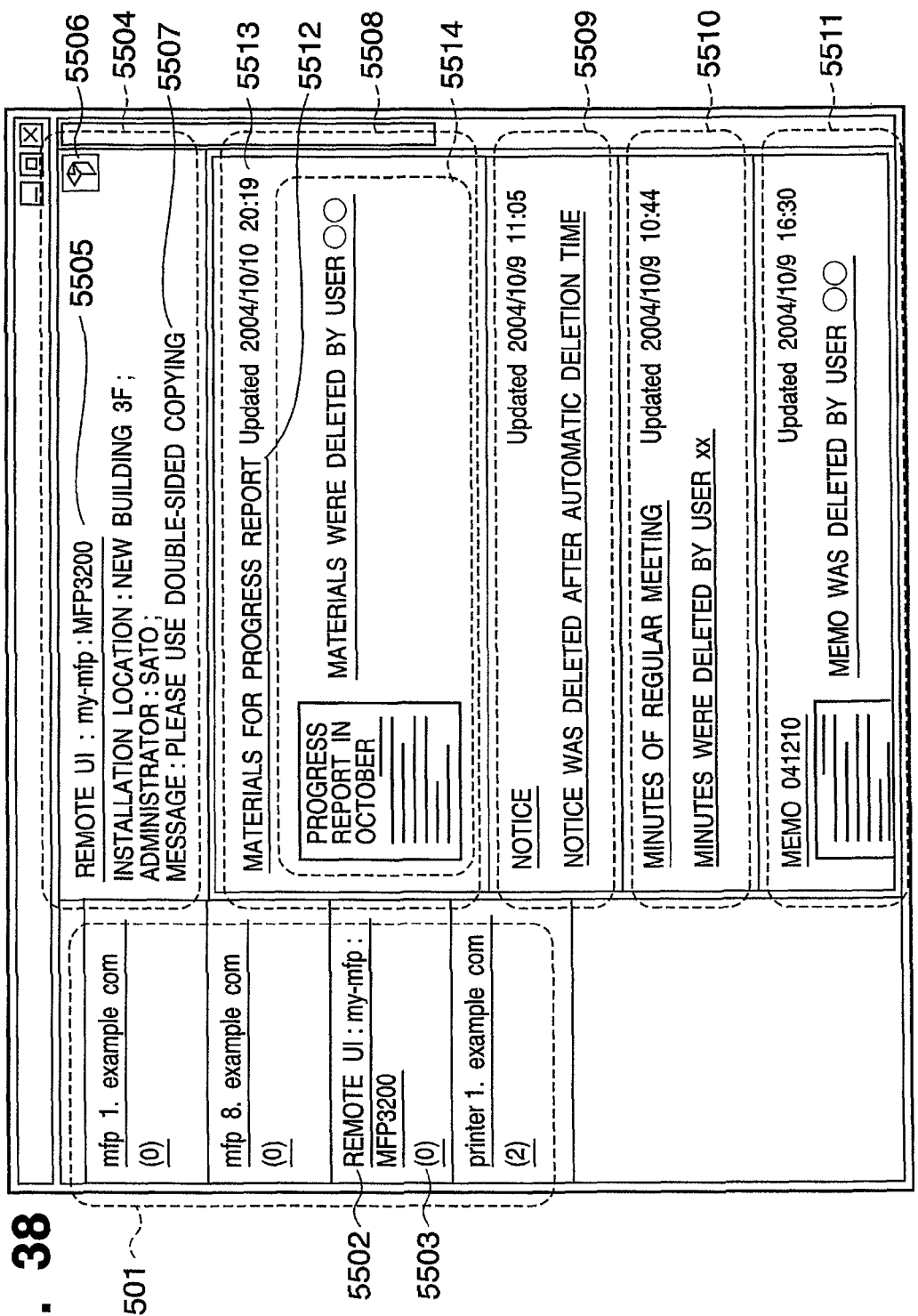

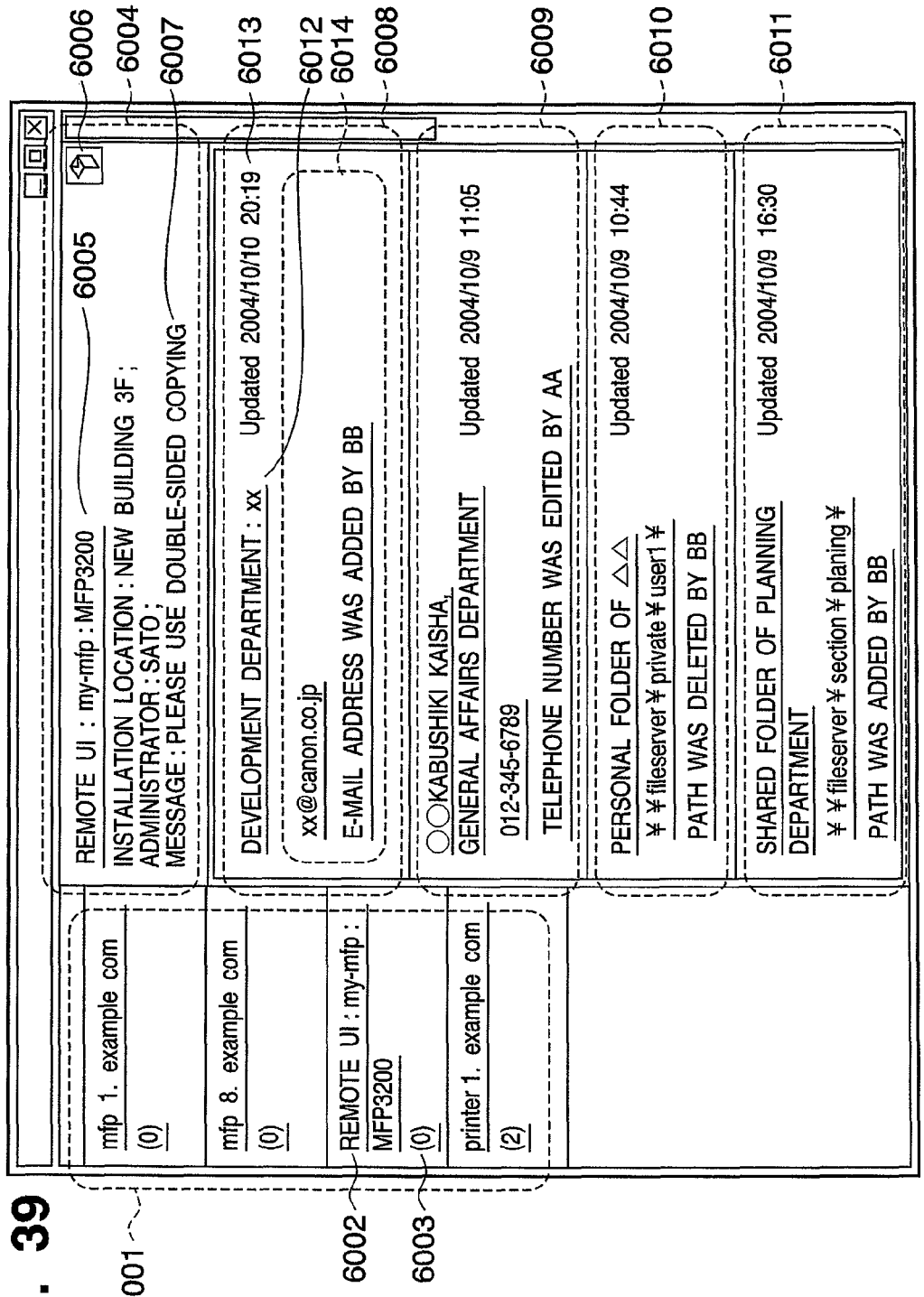

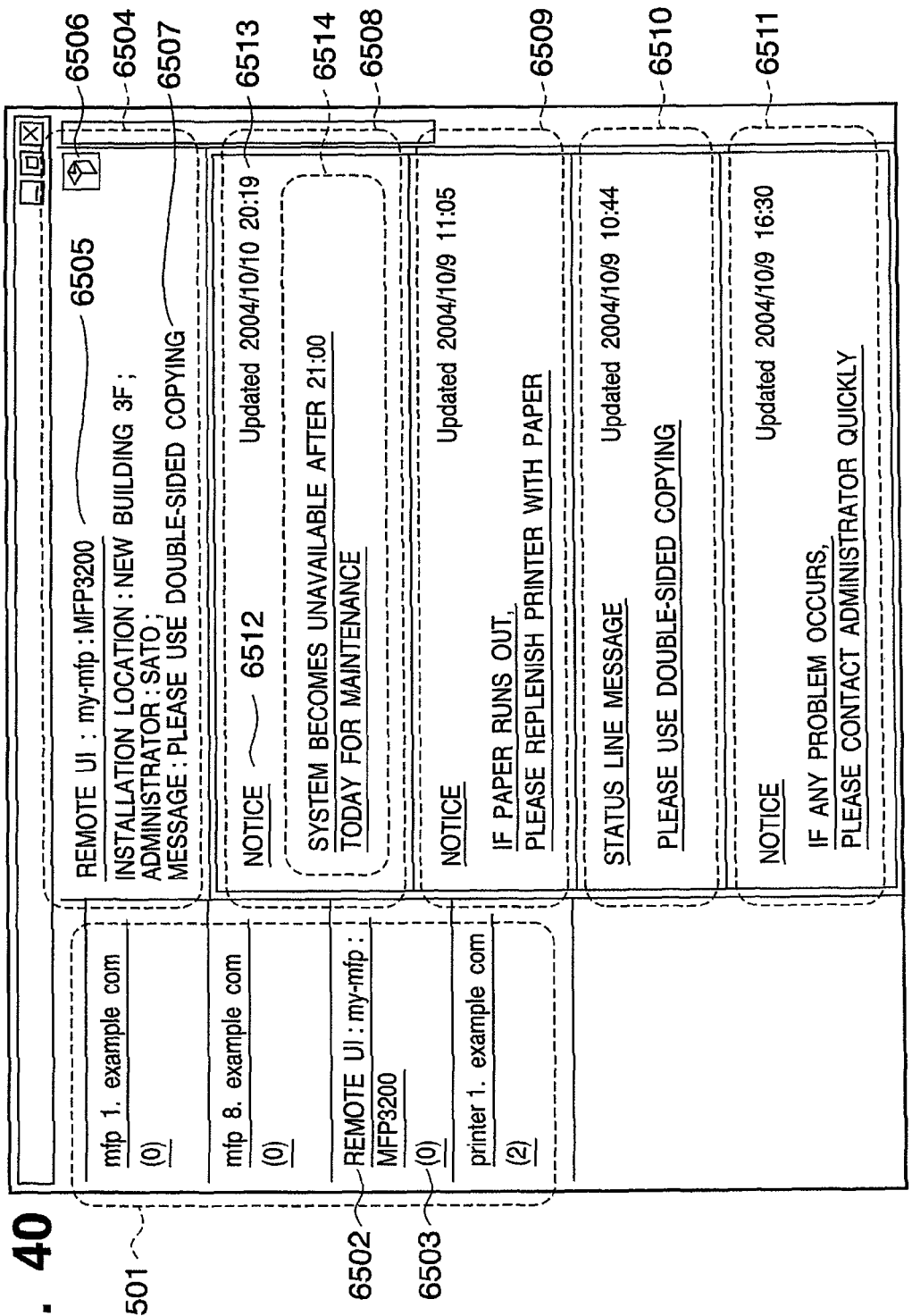

IMAGE PROCESSING APPARATUS, CONTROL METHOD THEREOF, AND PROGRAM

This application is a National Stage application of International Application No. PCT/JP2006/310086, filed on May 16, 2006.

TECHNICAL FIELD

The present invention relates to an image processing apparatus, remote control method, and program and, more particularly, to an image processing apparatus which is connected to a network and has a communication means for communicating with an external apparatus, a remote control method applied to the image processing apparatus, and a program for causing a computer to execute the remote control method.

BACKGROUND ART

Recently, in the Internet Web technology field centered on information processing apparatuses, various versions of RSS used to syndicate the latest news, and XML applications such as Atom are becoming popular (see, e.g., the specifications of RSS 1.0 (RDF Site Summary) by the RSS DEV Working Group). In the proposal by the present invention, syndication means distributing and announcing update information/summary information.

In recent years, not only information processing apparatuses such as a general-purpose computer but also various embedded systems are connected to a network, and can be utilized or managed from a remote place via the network. The embedded system is a computer system which is embedded in an application specific apparatus, and comprises peripheral devices and applications specialized in specific purposes. For example, a printer, scanner, image communication apparatuses using a facsimile or E-mail protocol, and various image processing apparatuses such as a copying machine, document management system, digital camera, and projector are also connected to a network, and can be utilized or managed from a remote place via the network. For example, a printer and multi-functional peripheral available from CANON include Web servers, and incorporate a Web application "remote UI" for connecting the apparatus via a Web browser, and utilizing and managing the apparatus from a remote place.

Situations in which the administrator and user use or manage a plurality of apparatuses via a network are increasing. Also, situations in which the administrator and user use or manage an apparatus from various nodes on a network are increasing.

These days, embedded systems such as an image processing apparatus exploit an advanced, high-performance internal CPU and nonvolatile memory (hard disk or the like) to provide a larger number of more advanced functions. These functions are installed as embedded applications which are executed by the internal CPU, and the internal nonvolatile memory holds various settings and data necessary for the operation. Information accumulated in the apparatus is timely updated in accordance with an operation by the user or the operation of the apparatus.

Recently, there is known an image processing apparatus in which a function available by the user is added or deleted by installing or uninstalling an application or license. For example, CANON has commercialized MEAP® (Multi-functional Embedded Application Platform) which can dynamically add and delete an embedded application by embedding a Java® execution environment in a multi-functional peripheral.

Patent reference 1 discloses an image processing apparatus capable of acquiring, in the XML format, historical information of a font loaded into a printer.

[Non-Patent Reference 1] Dan Brickley and 10 others, "RDF Site Summary (RSS) 1.0", [online] May 30, 2001, RSS-DEV Working Group, [searched on Mar. 17, 2005], Internet <URL: http://purl.org/rss/1.0/spec>

[Non-Patent Reference 2] M. Nottingham and R. Sayer ed., "The Atom Syndication Format draft-ietf-atompub-format-03", [online] Oct. 20, 2004, RSS-DEV Working Group, [searched on Mar. 17, 2005], Internet <URL: http://atompub.org/2004/10/20/draft-ietf-atompub-format-03.txt>

[Patent Reference 1] Japanese Patent Laid-Open No. 2004-25455

However, the embedded system which is connected to a network and has a communication means for communicating with an external apparatus, especially the image processing apparatus cannot meet the following requirements.

(1) The administrator wants to centrally monitor a change in data (i.e., update information) accumulated in a plurality of apparatuses. The administrator wants to unitarily grasp update information of a plurality of apparatuses.

(2) The user wants to grasp a change, caused by another user, in data accumulated in an apparatus shared with another user. The user wants to unitarily grasp update information of a plurality of apparatuses.

(3) The administrator and user (to be simply referred to as the administrator hereinafter) want to grasp update information from anywhere (particularly including a remote place).

(4) The administrator wants to unitarily grasp update information of data in the apparatus together with update information of a Web site.

(5) The administrator wants to grasp update information in cooperation with a related Web page, Web application, and the like.

(6) The administrator wants to exploit update information in various ways. For example, similar to the concept of a semantic Web (technique proposed by Tim Berners-Lee in around 1998: a technique of adding semantics based on meta-data, and causing a computer to determine information contents, which have been determined by the human eye), the administrator wants the apparatus to provide update information as an free-purpose knowledge representation, and wants to exploit the update information for various purposes.

(7) The administrator wants to finely control the contents and format of update information supplied from the apparatus.

(8) The administrator wants to flexibly customize update information supplied from the apparatus.

(9) The administrator wants to grasp especially a change in application embedded in the apparatus and a change in license which permits the use of the embedded application.

(10) The administrator wants to grasp especially update information of documents accumulated in the apparatus.

(11) The administrator wants to grasp especially update information of an address book accumulated in the apparatus.

(12) The administrator wants to grasp information obtained by statistically processing data accumulated in the apparatus.

(13) The administrator wants to grasp changes including not only addition and modification of data accumulated in the apparatus but also deletion of data from the apparatus.

(14) The administrator wants to grasp details of deleted data for a predetermined period even after deletion.

(15) When a change in data accumulated in the apparatus pertains to an image, the administrator wants to grasp the contents of the image as update information.

Patent reference 1 discloses that historical information of the font is described in XML, but does not disclose any configuration capable of universal access by a URI (Uniform Resource Identifier). Further, the above-mentioned requirements such as the type of update information in addition to the font, flexibility of the format, and cooperation with another Web resource cannot be satisfied.

DISCLOSURE OF INVENTION

The present invention has been made to overcome the conventional drawbacks, and has as its object to provide an image processing apparatus capable of solving the above problems and meeting the above requirements, a control method thereof, and a program.

To achieve the above object, the present invention comprises the following arrangement.

An image processing apparatus which is connected to a network and communicates with an external apparatus comprises update information collection means for collecting information on update of data stored in the apparatus, generation means for generating and saving syndication data which describes the update information collected by the update information collection means in a markup language, and syndication data providing means for providing the syndication data in response to a request from the external apparatus.

A network apparatus which can communicate with an external apparatus on a network comprises collection means for collecting update information representing that data stored in the network apparatus is updated, generation means for generating data which describes the update information collected by the collection means in a format that can be reproduced by the external apparatus, save means for saving the data generated by the generation means, and data transmission means for transmitting data saved in the save means in response to a request from the external apparatus.

An image processing apparatus having a printing unit or an image reading unit comprises collection means for collecting update data, processing means for processing the collected update data, and output means for outputting the update data processed by the processing means in a format of a markup language notation including a plurality of items.

A structure of syndication data in a markup language notation that is recorded on a computer-readable recording medium and represents update information available in an information processing apparatus or an image processing apparatus comprises a declaration of version information of the markup language, a declaration of version information of the syndication data, an element which describes information on distribution, and elements which list pieces of update information, wherein the structure of the syndication data is distributed as update information of data stored in an image processing apparatus which is connected to a network, communicates with an external apparatus, and has a printing unit or an image reading unit.

The present invention exhibits the following effects. (1) The administrator can centrally monitor a change in data (i.e., update information) accumulated in a plurality of apparatuses. The administrator can unitarily grasp update information of a plurality of apparatuses. The present invention can also obtain any one of the following effects.

(2) The user can grasp a change, caused by another user, in data accumulated in an apparatus shared with another user. The user can unitarily grasp update information of a plurality of apparatuses.

(3) The administrator can grasp update information from anywhere (particularly including a remote place).

(4) The administrator can unitarily grasp update information of data in the apparatus together with update information of a Web site.

(5) The administrator can grasp update information in cooperation with a related Web page, Web application, and the like.

(6) The administrator can exploit update information in various ways.

(7) The administrator can finely control the contents and format of update information supplied from the apparatus.

(8) The administrator can flexibly customize update information supplied from the apparatus.

(9) The administrator can grasp a change in application embedded in the apparatus and a change in license which permits the use of the embedded application.

(10) The administrator can grasp update information of documents accumulated in the apparatus.

(11) The administrator can grasp update information of an address book accumulated in the apparatus.

(12) The administrator can grasp information obtained by statistically processing data accumulated in the apparatus.

(13) The administrator can grasp changes including not only addition and modification of data accumulated in the apparatus but also deletion of data from the apparatus.

(14) The administrator can grasp details of deleted data for a predetermined period even after deletion.

(15) When a change in data accumulated in the apparatus pertains to an image, the administrator can grasp the contents of the image as update information.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 12 is a view showing an example of an SMS application list window displayed on the Web browser on the network;

FIG. 14 is a view showing an example of a detailed SMS application window displayed on the Web browser on the network;

FIG. 22 shows an example of a template stored in a template DB;

FIG. 26 is a view showing an example of a feed file for syndicating application-related update information;

FIG. 34 is a view showing an example of a window for setting a period during which update information of a document in the reception box is posted in the update file;

FIG. 35 is a view showing an example of a feed file for syndicating box-related update information;

FIG. 36 is a view showing an example of a boxed document update information feed display window displayed on the operation panel of the image processing apparatus;

FIG. 38 is a view showing an example of an update information feed display window which is displayed by a general feed reader and related to deletion of a boxed document;

FIG. 39 is a view showing an example of an address book update information feed display window displayed on the operation panel of the image processing apparatus; and FIG. 40 is a view showing an example of a bulletin board update information feed display window displayed on the operation panel of the image processing apparatus.

BEST MODE FOR CARRYING OUT THE INVENTION

<System Configuration>

Figure 1:
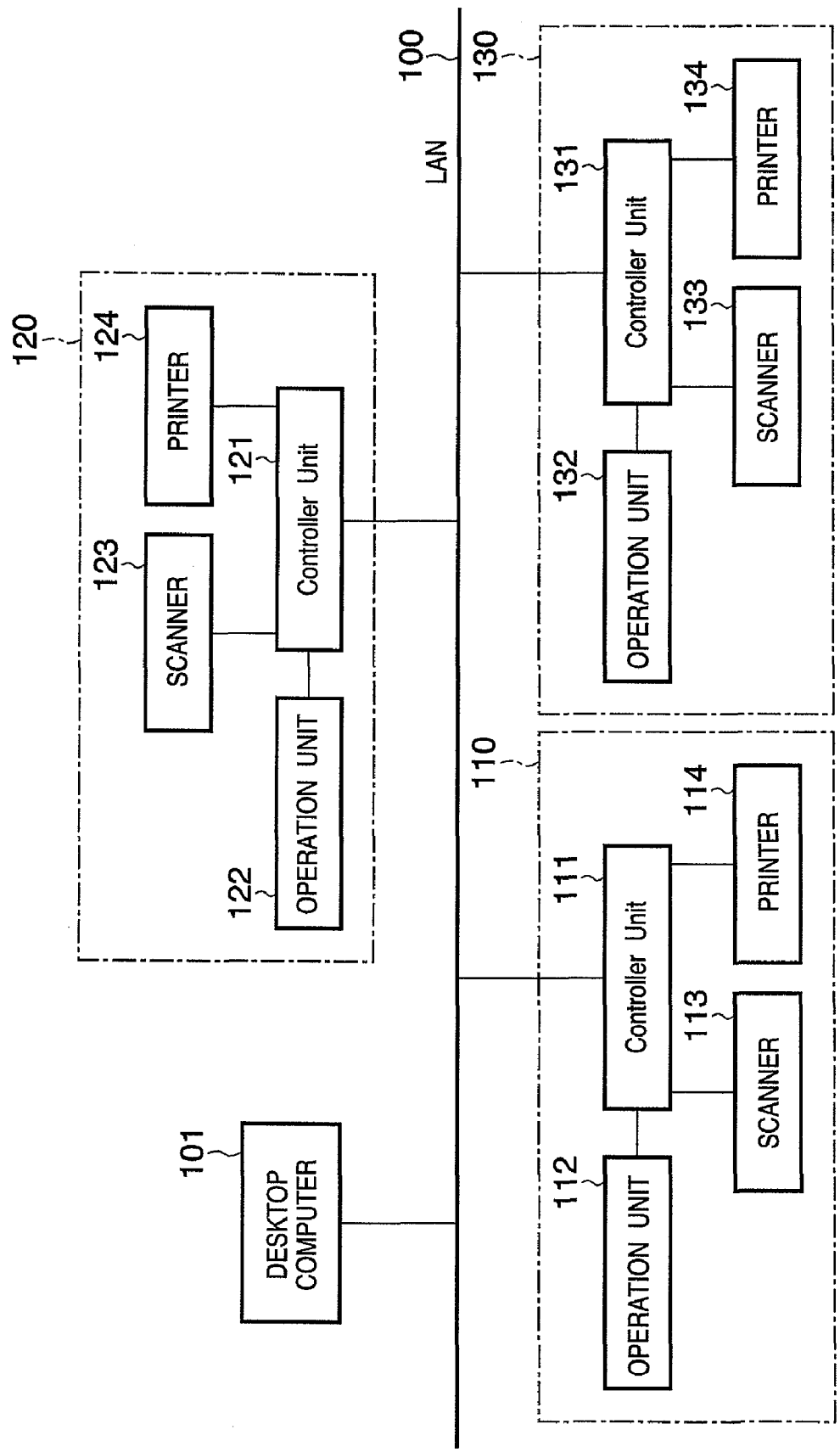
FIG. 1 is a block diagram showing the overall configuration of an image processing system according to an embodiment of the present invention.

The best mode for carrying out the invention will be described with reference to the accompanying drawings. FIG. 1 is a block diagram showing the overall configuration of an image processing system according to an embodiment of the present invention. In FIG. 1, the image processing system is configured by image processing apparatuses 110, 120, and 130 and a desktop computer 101 which are connected to each other via a network. The network is formed from, e.g., a LAN (Local Area Network) 100.

The image processing apparatus 110 comprises a scanner 113 serving as an image input device, a printer 114 serving as an image output device, a controller unit 111, and an operation unit 112 serving as a user interface. The image processing apparatus 110 is a so-called digital multi-functional peripheral, and can accomplish functions such as copying, printing, image capturing, image filing, and transmission (e.g., E-mail/FAX/FTP/file sharing) by using the above devices.

The scanner 113, printer 114, and operation unit 112 are connected to the controller unit 111, and controlled by instructions from the controller unit 111. The controller unit 111 is connected to the LAN 100.

The image processing apparatuses 120 and 130 have the same configuration as that of the image processing apparatus 110. The image processing apparatus 120 comprises a scanner 123, printer 124, and operation unit 122, which are connected to a controller unit 121. The image processing apparatus 130 comprises a scanner 133, printer 134, and operation unit 132, which are connected to a controller unit 131.

The desktop computer 101 is an information processing apparatus usually used by the user, and stores application programs, user data, and the like which are used by the user. The desktop computer 101 can also execute a distributed application in cooperation with the image processing apparatuses 110, 120, and 130 and a server computer (not shown) via the LAN 100.

<Software Configuration of Image Processing Apparatus>

Figure 2:
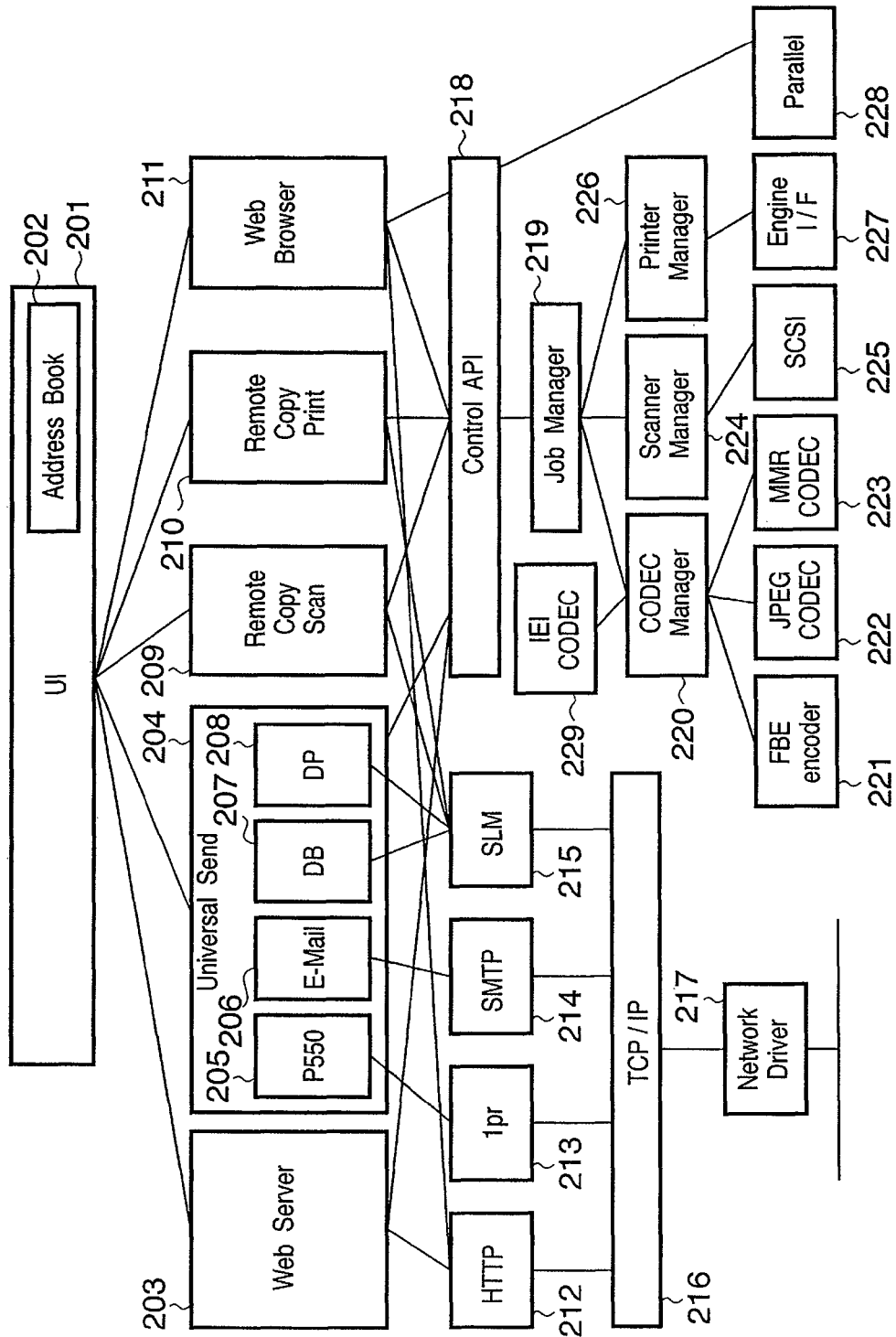
FIG. 2 is a block diagram showing the configuration of software executed in an image processing apparatus.

FIG. 2 is a block diagram showing the configuration of software executed in each of the image processing apparatuses 110, 120, and 130.

A user interface (UI) module 201 interfaces between the apparatus and a user operation when the operator performs various operations and settings to the image processing apparatus. This module transfers input information to various modules (to be described later), requests processes, and sets data in accordance with operations by the operator.

An Address-Book module 202 is a database module which manages the data destination, communication destination, and the like. As for data managed by the Address-Book module 202, the Address-Book module 202 adds, deletes, and acquires data in accordance with operation instructions from the UI module 201. The Address-Book module 202 sends data and gives communication destination information to modules (to be described later) in accordance with operations by the operator.

A Web-Server module 203 notifies a Web client of management information of the image processing apparatus in accordance with a request from the Web client (e.g., the desktop computer 101). The management information is acquired via a Universal-Send module 204, Remote-Copy-Scan module 209, Remote-Copy-Print module 210, and Control-API module 218 (to be described later). The Web client is notified of the management information via an HTTP module 212, TCP/IP communication module 216, and Network-Driver 217 (to be described later).

The Universal-Send module 204 controls data distribution. This module distributes data designated by the operator via the UI module 201 to a similarly designated communication (output) destination. When the operator designates generation of data to be distributed using the scanner function of the apparatus, the Universal-Send module 204 operates the apparatus via the Control-API module 218 (to be described later), and generates data.

A P550 module 205 is contained in the Universal-Send module 204, and executed when a printer is designated as an output destination. An E-Mail module 206 is contained in the Universal-Send module 204, and executed when an E-mail address is designated as a communication destination. A DB module 207 is contained in the Universal-Send module 204, and executed when a database is designated as an output destination. A DP module 208 is contained in the Universal-Send module 204, and executed when an image processing apparatus similar to the apparatus in FIG. 2 is designated as an output destination.

The Remote-Copy-Scan module 209 reads image information by using the scanner function of the image processing apparatus, and outputs the read image information to another image processing apparatus connected to a network or the like. The Remote-Copy-Scan module 209 implements a copying function, which is originally implemented by a single image processing apparatus, by using a plurality of image processing apparatuses.

The Remote-Copy-Print module 210 outputs, by using the printer function of the image processing apparatus, image information obtained by another image processing apparatus connected via a network or the like. The Remote-Copy-Print module 210 implements a copying function, which is originally implemented by a single image processing apparatus, by using a plurality of image processing apparatuses.

A Web Browser module 211 loads and displays information from various Web sites (homepages) on the Internet or an intranet. The detailed configuration of the Web browser will be described later.

The HTTP module 212 is used when the image processing apparatus performs communication by HTTP (HyperText Transfer Protocol). By using the TCP/IP communication module 216 (to be described later), the HTTP module 212 provides a communication function to the Web-Server module 203 and Web Browser module 211. This module copes with various protocols (e.g., HTTP) used in the Web, and also provides a communication function based on particularly a security protocol.

By using the TCP/IP communication module 216 (to be described later), an Ipr module 213 provides a communication function to the P550 module 205 in the Universal-Send module 204.

By using the TCP/IP communication module 216 (to be described later), an SMTP module 214 provides a communication function to the E-Mail module 206 in the Universal-Send module 204.

By using the TCP/IP communication module 216 (to be described later), an SLM (Salutation-Manager) module 215 provides a communication function to the DB module 207 and DP module 208 in the Universal-Send module 204, the Remote-Copy-Scan module 209, and the Remote-Copy-Print module 210.

By using the Network-Driver 217 (to be described later), the TCP/IP communication module 216 provides a network communication function to various modules described above. The Network-Driver 217 controls a portion physically connected to a network.

A Control-API 218 provides an interface with a downstream module such as a Job-Manager module 219 (to be described later) to an upstream module such as the Universal-Send module 204.

The Job-Manager module 219 interprets various processes designated by various modules described above via the Control-API 218, and gives instructions to respective modules (220, 224, and 226) to be described later. The Job-Manager module 219 unitarily manages hardware processes executed in the image processing apparatus.

A CODEC-Manager module 220 manages and controls various data compression/decompression processes among processes designated by the Job-Manager module 219.

An FBE encoder module 221 encodes, by using the FBE format, data loaded by a scan process executed by the Job-Manager module 219 and a Scan-Manager module 224 (to be described later).

A JPEG-CODEC module 222 JPEG-compresses data loaded in a scan process executed by the Job-Manager module 219 and Scan-Manager module 224. The JPEG-CODEC module 222 JPEG-expands print data in a printing process executed by a Print-Manager module 226.

An MMR-CODEC module 223 MMR-compresses data loaded in a scan process executed by the Job-Manager module 219 and Scan-Manager module 224. The MMR-CODEC module 223 MMR-decompresses print data in a printing process executed by the Print-Manager module 226.

An information-embedded image CODEC (IEI-CODEC) module 229 decodes information embedded in image data loaded in a scan process executed by the Job-Manager module 219 and Scan-Manager module 224. Also, the IEI-CODEC module 229 embeds information in print image data in a printing process executed by the Print-Manager module 226. Embedding of information in image data uses an encoding technique with a barcode, digital watermark, or the like. The IEI-CODEC module 229 supports, as a kind of decoding technique, character recognition of recognizing characters in an image of image data by segmentation and the OCR technique, and converting the characters into text data. The IEI-CODEC module 229 also supports, as a kind of encoding technique (information embedding technique), conversion from a text into image data by using a raster image processor, and overlay of converted image data and original image data.

The Scan-Manager module 224 manages and controls a scan process designated by the Job-Manager module 219.

An SCSI driver 225 interfaces communication between the Scan-Manager module 224 and the scanner unit internally connected to the image processing apparatus.

The Print-Manager module 226 manages and controls a printing process designated by the Job-Manager module 219.

An Engine-I/F module 227 provides an interface between the Print-Manager module 226 and the printing unit.

A Parallel port driver 228 provides an I/F when data is output to an output device (not shown) via a parallel port.

<Hardware Configuration of Image Processing Apparatus>

Figure 3:
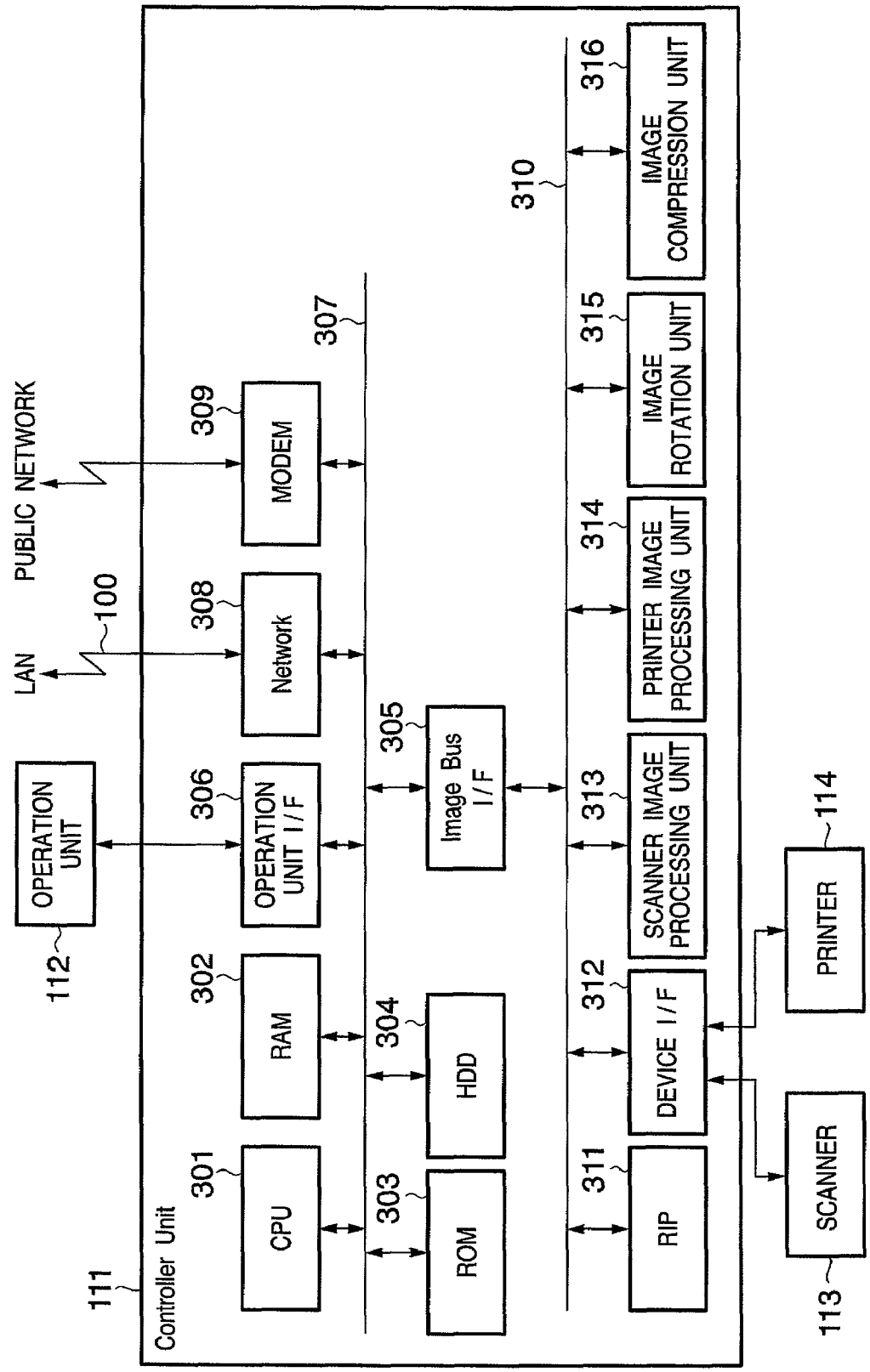
FIG. 3 is a block diagram showing the hardware configuration of the image processing apparatus.

FIG. 3 is a block diagram showing the hardware configuration of the image processing apparatus 110. The image processing apparatuses 120 and 130 also have the same configuration.

The controller unit 111 is connected to the scanner 113 serving as an image input device and the printer 114 serving as an image output device. Further, the controller unit 111 is connected to the LAN 100 and a public line (WAN). The controller unit 111 inputs/outputs image information and device information.

A CPU 301 is a controller which controls the whole controller unit 111. A RAM 302 is a system work memory used to operate the CPU 301. The RAM 302 is also an image memory for temporarily storing image data. A ROM 303 is a boot ROM, and stores the boot program of the system. An HDD 304 is a hard disk drive, and stores system software and image data.

An operation unit I/F 306 interfaces the operation unit 112, and outputs, to the operation unit 112, image data to be displayed on the operation unit 112. Also, the operation unit I/F 306 transfers, to the CPU 301, information input by the user via the operation unit 112.

A network interface (Network) 308 controls connection to the LAN 100, and inputs/outputs information to/from the LAN 100. A modem 309 controls connection to the public line, and inputs/outputs information to/from the public line. These devices are arranged on a system bus 307.

An image bus interface (Image Bus I/F) 305 is a bus bridge which connects the system bus 307 and an image bus 310 for transferring image data at high speed, and converts the data structure. The image bus 310 is formed from a PCI bus or I15E1394 bus.

The following devices are arranged on the image bus 310. A raster image processor (RIP) 311 expands a PDL code transmitted from a network into a bitmap image. A device I/F 312 connects the controller unit 111 and the scanner 113 and printer 114 serving as image input/output devices, and performs conversion between a synchronous system and an asynchronous system of image data.

A scanner image processing unit 313 performs correction, process, and editing for input image data. A printer image processing unit 314 performs correction, resolution conversion, and the like corresponding to the performance of the printer 114 for printout image data. An image rotation unit 315 rotates image data. An image compression unit 316 performs a JPEG compression/decompression process for multi-level image data, and JBIG, MMR, and MH compression/decompression processes for binary image data.

Figure 4:
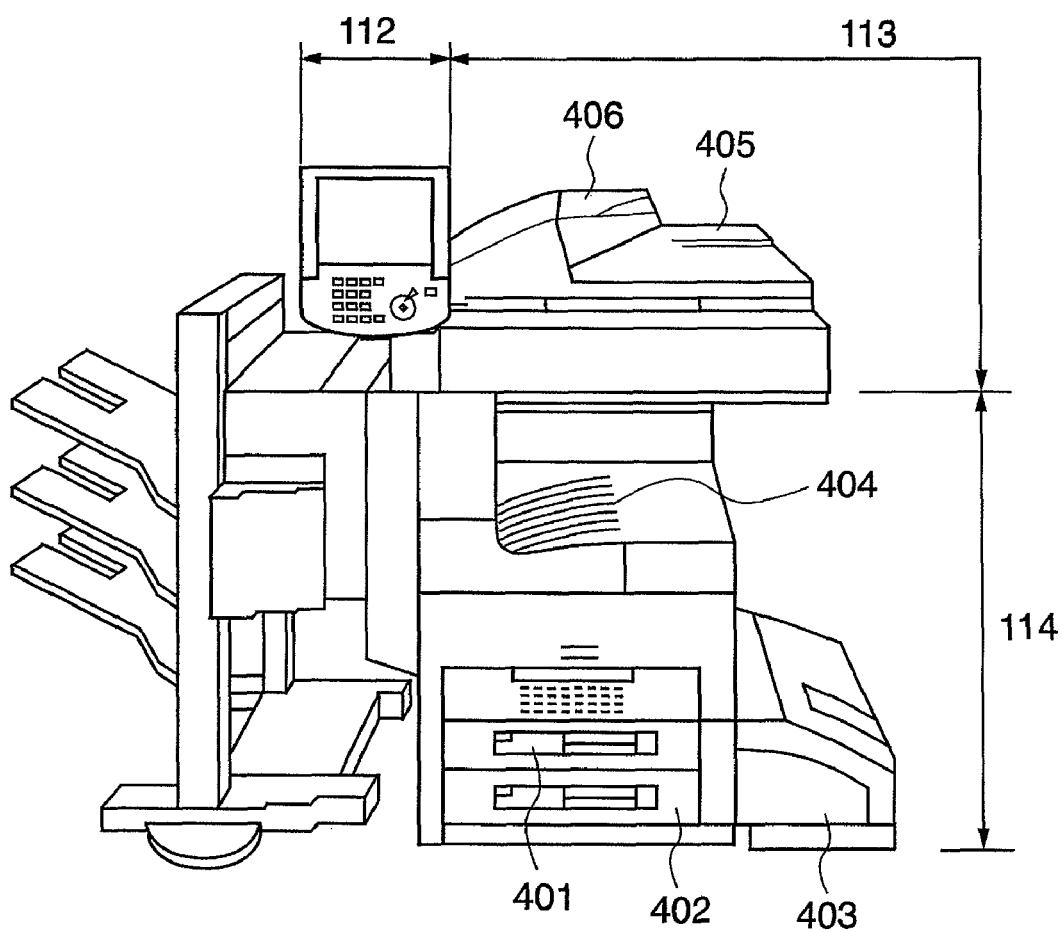
FIG. 4 is a perspective view showing the outer appearance of the image processing apparatus.

FIG. 4 is a perspective view showing the outer appearance of the image processing apparatus 110. The image processing apparatuses 120 and 130 also have the same outer appearance. Although the image processing apparatus 110 will be described, the image processing apparatuses 120 and 130 have completely the same configuration and perform the same operation.

The scanner 113 serving as an image input device illuminates an image on paper serving as a document, and scans a 13D line sensor (not shown) to generate raster image data.

When the user sets document sheets on a tray 406 of a document feeder 405 and designates the start of read on the operation unit 112, the CPU 301 of the controller unit 111 instructs the scanner 113 to feed the document sheets set on the tray 406 one by one, and the scanner 113 reads the document image.

The printer 114 serving as an image output device prints raster image data on paper. The printing method includes an electrophotographic method using a photosensitive drum and photosensitive belt, and an inkjet method of discharging ink from a small nozzle array to directly print an image on paper. Any method can be adopted. Note that a printing operation starts in response to an instruction from the CPU 301.

The printer 114 has a plurality of paper feed stages so as to select different paper sizes or different paper orientations, and is equipped with corresponding paper cassettes 401, 402, and 403. A delivery tray 404 receives printed paper.

Figure 5:
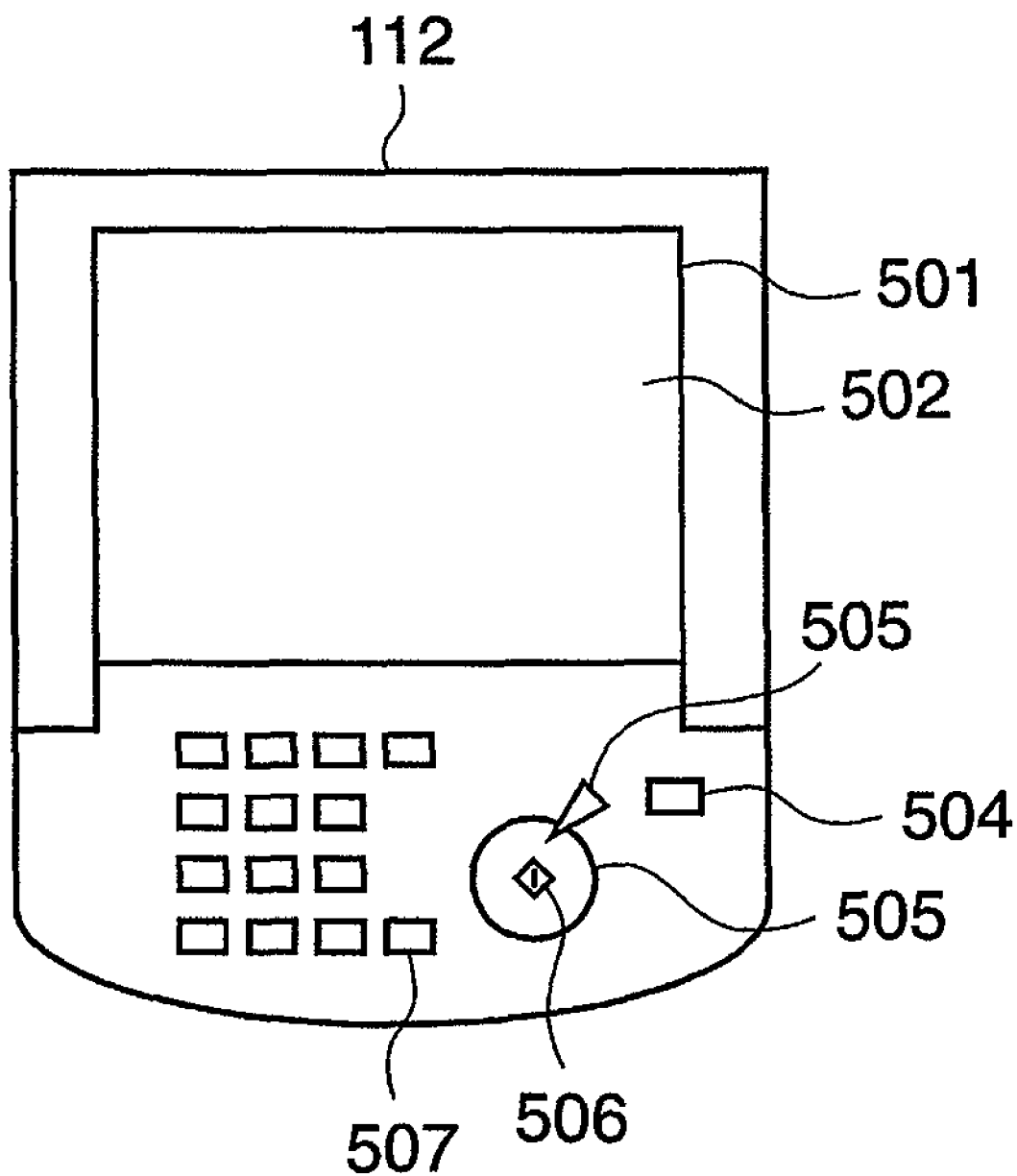
FIG. 5 is a plan view showing the configuration of the operation unit of the image processing apparatus.

FIG. 5 is a plan view showing the configuration of the operation unit 112 of the image processing apparatus 110. Note that the operation units of the image processing apparatuses 120 and 130 also have the same configuration.

An LCD display unit 501 is configured by adhering a touch panel sheet 502 on an LCD (Liquid Crystal Display). The LCD display unit 501 displays the operation window and soft keys of the image processing apparatus 110. When a displayed key is touched, the LCD display unit 501 transfers position information representing the touched position to the CPU 301 of the controller unit 111.

A start key 505 is operated to, for example, start reading a document image. An LED display 506 in two, green and red colors is arranged at the center of the start key 505, and the color of the LED display 506 represents whether the start key 505 is available. A stop key 503 is operated to stop an operation of the image processing apparatus 110 in progress. An ID key 507 is operated to input the user ID of the user. A reset key 504 is operated to initialize settings from the operation unit 112.

Figure 6:
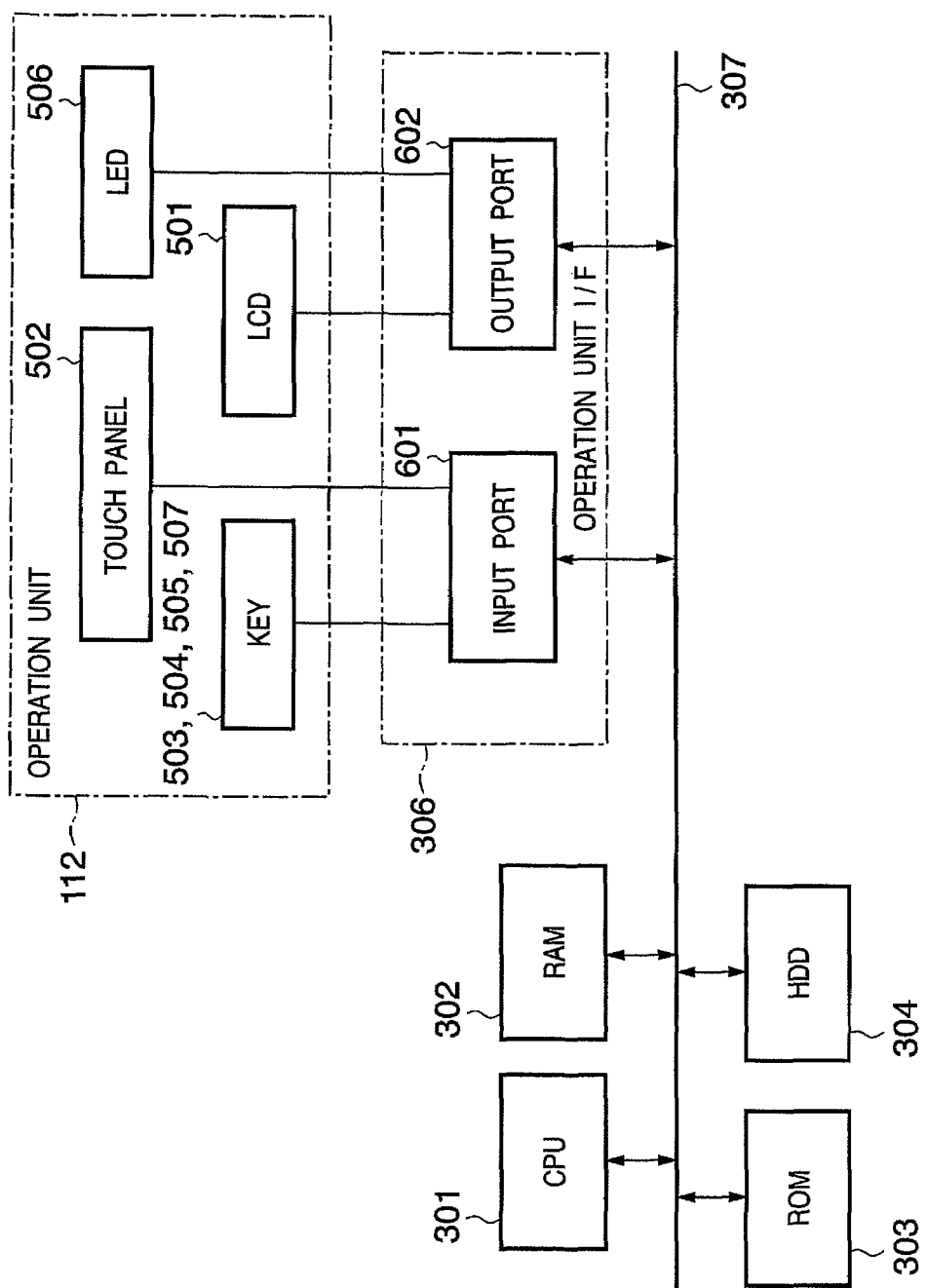
FIG. 6 is a block diagram showing the internal configurations of the operation unit and operation unit I/F of the image processing apparatus in correspondence with the internal configuration of a controller unit.

FIG. 6 is a block diagram showing the internal configurations of the operation unit 112 and operation unit I/F 306 of the image processing apparatus 110 in correspondence with the internal configuration of the controller unit 111. Although the image processing apparatus 110 will be described, the image processing apparatus 110 can be replaced with the image processing apparatus 120 or 130 without any problem.

As described above, the operation unit 112 is connected to the system bus 307 via the operation unit I/F 306. The system bus 307 is connected to the CPU 301, RAM 302, ROM 303, and HDD 304. The CPU 301 comprehensively controls access to various devices connected to the system bus 307 on the basis of control programs and the like stored in the ROM 303 and HDD 304. The CPU 301 loads input information from the scanner 113 connected via the device I/F 312, and outputs an image signal serving as output information to the printer 114 connected via the device I/F 312. The RAM 302 is a main memory, work area, and the like for the CPU 301.

User input information from the touch panel 502 and various hard keys 503, 504, 505, and 507 is transferred to the CPU 301 via an input port 601. The CPU 301 generates display window data on the basis of the contents of user input information and the control program, and outputs display window data to the LCD display unit 501 via an output port 602 for controlling a window output device. If necessary, the CPU 301 controls the two-color LED display 506.

Figure 7:
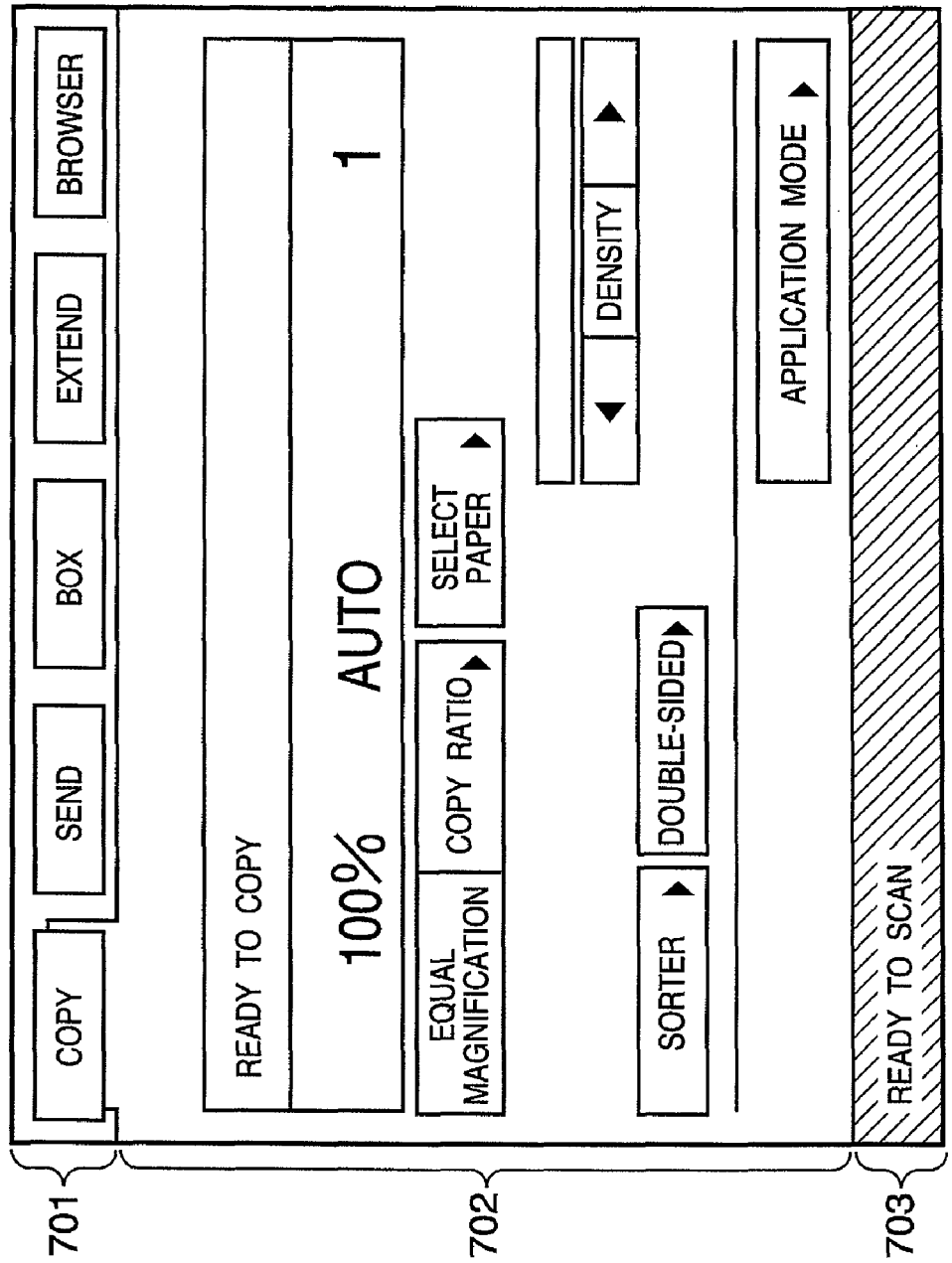
FIG. 7 is a view showing an example of a standard operation window displayed on the operation unit of the image processing apparatus.

FIG. 7 is a view showing an example of a standard operation window displayed on the operation unit 112 of the image processing apparatus 110. Buttons aligned at a top 701 in FIG. 7 are used to select one of various functions provided by the image processing apparatus 110.

The copying function is used to print, by the printer 114, document image data scanned and read by the scanner 113 and obtain a copy of a document. The sending function is used to send document image data read by the scanner 113 and image data accumulated in the HDD 304 to various output destinations. Output destinations are various output destinations to which data can be sent via the network interface 308 by various protocols, and various output destinations to which data can be sent via the modem 309 by protocols such as a facsimile protocol. A plurality of output destinations can be selected to send data.

The box function is used to browse, edit, print, and send document files which are accumulated in the HDD 304 and include image data and code data. Document files stored in the HDD 304 include document image data read by the scanner 113, data downloaded via the network interface 308, data which accumulates print data received from another apparatus via the network interface 308, and facsimile data received from another apparatus via the modem 309. The box function can be used as an electronic mail box in user's office environment. The box function can also be utilized for secured printing which enhances the confidentiality of a PDL print job by delaying printout on paper until a password is input. The extension function is used to call various extended functions so as to, for example, lock the scanner 113 for use from an external apparatus. The browser function is used to browse a Web site.

A middle portion 702 in FIG. 7 displays an operation window when the copying function is selected. A bottom 703 in FIG. 7 is a status display area where various messages such as each function of the image processing apparatus 110 and information on the apparatus itself are displayed for the user regardless of a function selected at the top 701.

(Operation of Distributed Application by Web Browser)

Figure 8:
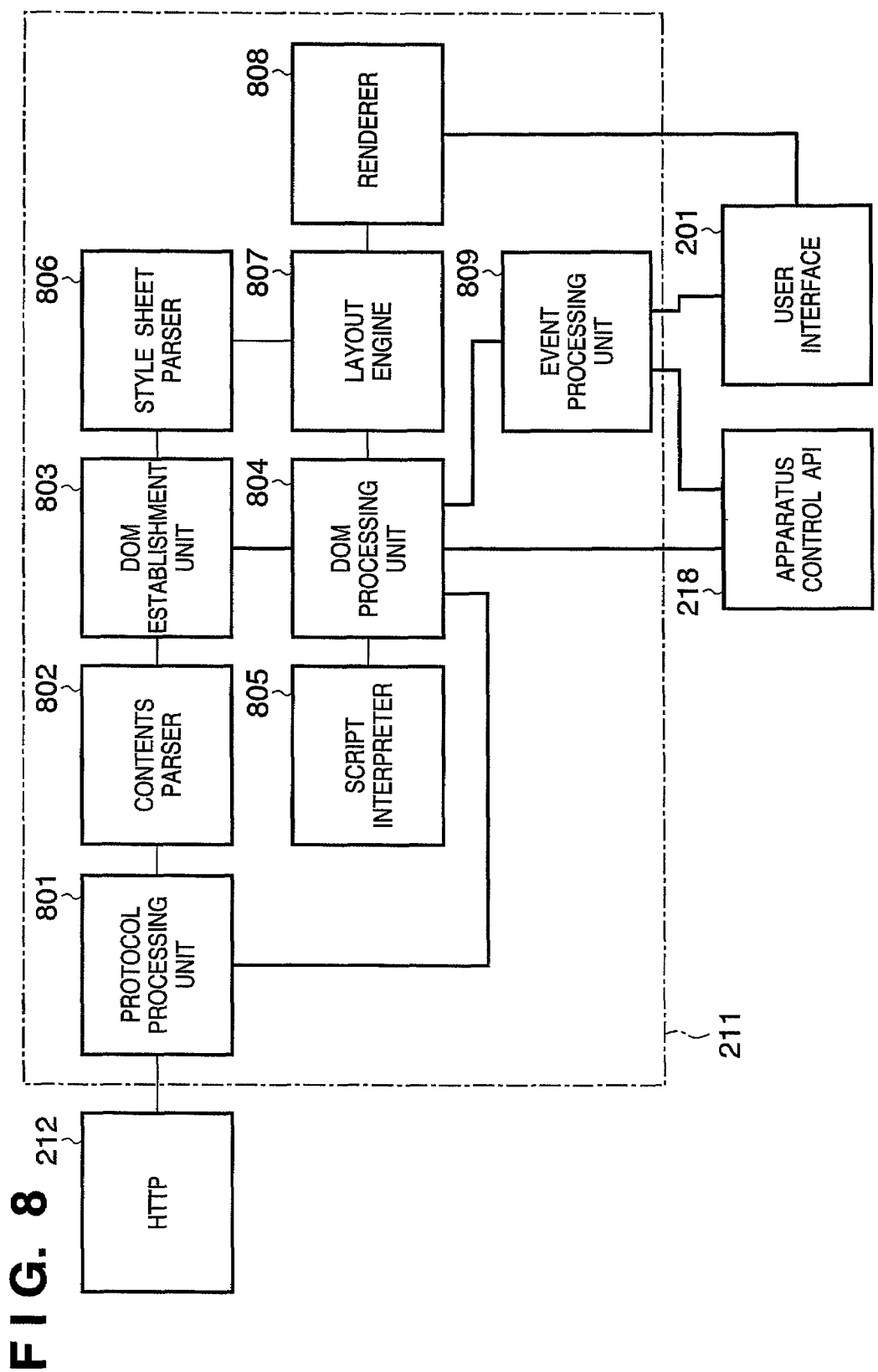
FIG. 8 is a block diagram showing the internal configuration of a Web browser module shown in FIG. 2.

FIG. 8 is a block diagram showing the internal configuration of the Web Browser module 211 shown in FIG. 2. A protocol processing unit 801 establishes a connection with another network node via the HTTP module 212, and communicates with the network node. In communication, the protocol processing unit 801 issues an HTTP request to a resource described by the URL, and receives the response. During this process, the protocol processing unit 801 encodes/decodes communication data in accordance with various encoding formats.

A contents parser 802 receives contents data in a presentation format such as HTML, XML, or XHTML from the protocol processing unit 801, and executes lexical analysis and syntax analysis to generate a parse tree.

A DOM establishment unit 803 receives the parse tree from the contents parser 802, and establishes a document object model (DOM) corresponding to the structure of contents data. Conventional HTML permits various grammatical omissions and includes various versions. In many cases, actually operated contents are neither well-formed nor valid. For this reason, the DOM establishment unit 803 infers a correct logical structure of grammatically invalid contents data, and tries to establish a valid DOM, similar to another general Web browser.

A DOM processing unit 804 holds and manages, in a memory, a DOM established by the DOM establishment unit 803 as a tree structure presenting the nesting relationship between objects. Various processes by the Web browser are implemented centrally using the DOM.

A layout engine 807 recursively determines a presentation in display of each object in accordance with the tree structure of objects held in the DOM processing unit 804, and as a result, obtains the layout of the entire document. The presentation in display of each object may be explicitly designated in a style sheet format such as Cascading Style Sheet (CSS) by a description embedded in a document or a description in another file linked from the document.

A style sheet parser 806 analyzes a style sheet associated with the document of contents.

The layout engine 807 determines a document layout by reflecting the analysis result of the style sheet.

In accordance with the document layout determined by the layout engine 807, a renderer 808 generates graphical user interface (GUI) data to be displayed on the LCD display unit 501 (FIG. 5). The generated GUI data is displayed on the LCD display unit 501 by the user interface (UI) 201.

An event processing unit 809 receives the event of an operation performed by the user to the touch panel sheet 502 or each key on the operation unit 112, and performs a process corresponding to the event. The event processing unit 809 also receives a state transition event of the apparatus, a job, or the like from the apparatus control API 218, and performs a process corresponding to the event. Event handlers corresponding to various events are registered for each object class and each object instance in the tree structure of a DOM managed by the DOM processing unit 804. In response to a generated event, the event processing unit 809 determines, among objects managed by the DOM processing unit 804, an object which takes charge of processes of the event. Then, the event processing unit 809 distributes the event. If the object receives the distributed event, it executes various processes in accordance with the algorithm of an event handler corresponding to the event. Processes of the event handler include update of a DOM held by the DOM processing unit 804, a redrawing instruction to the layout engine 807, an instruction to issue an HTTP request to the DOM processing unit 804, and control of the function of the image processing apparatus by calling the apparatus control API 218.

A script interpreter 805 interprets and executes a script such as Java® Script (ECMA Script). The script is embedded in a document or described in another file linked from a document, and performs an operation to the DOM or the like. The contents provider can program the dynamic behavior of a provided document by the script.

Figure 9:
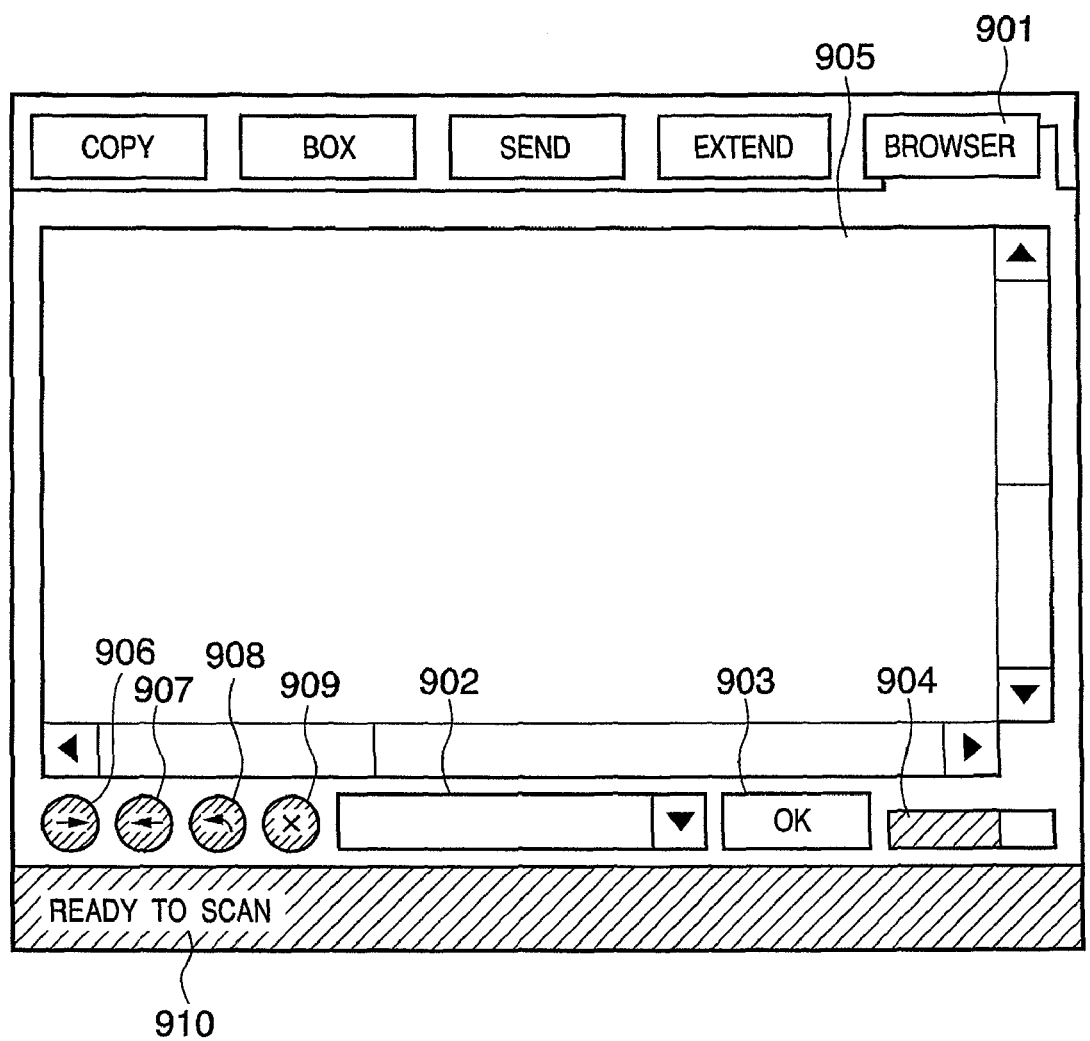
FIG. 9 is a view showing the layout of a window displayed when the Web browser function is selected on an LCD display unit shown in FIG. 5.

FIG. 9 is a view showing the layout of a window displayed when the Web browser function is selected on the LCD display unit 501 shown in FIG. 5. A tab 901 is used to select the Web browser function. By selecting this tab, the window of another function (copy, box, send, or extend) is switched to the display window of the Web browser function. A URL input field 902 is used to input the URL of a desired resource by the user. When the user touches this field, a virtual full keyboard (not shown) for inputting characters is displayed.

The user can input a desired character string with soft keys which are arranged on the virtual full keyboard and imitate keytops.

An OK button 903 is a soft key for finalizing a URL character string input to the URL input field 902. After the URL is finalized, the Web Browser module 211 issues an HTTP request to acquire the resource. A progress bar 904 represents the progress of a contents acquisition process in response to the HTTP request. A contents display area 905 displays an acquired resource.

A return button 906 is a soft key used to trace back the history of contents display and display again contents which have been displayed before the currently displayed contents. A Next button 907 is a soft key used to, when contents are displayed while the history of contents display is traced back, return to display of contents displayed after the currently displayed contents. A reload button 908 is a soft key used to acquire and display again the currently displayed contents. A stop button 909 is a soft key used to stop a contents acquisition process in progress.

A status area 910 (bottom 703) displays messages from various functions of the image processing apparatus 110. Even while the Web browser window is displayed, a message which is sent from the scanner 113, printer 114, or another function and draws user's attention is displayed in the status area 910. Similarly, a message from the Web browser function is also displayed in the status area 910. The Web browser function sends the URL character string of a link destination, the title character string of contents, a message designated by a script, and the like.

(Addition and Deletion of Embedded Application)

Figure 10:
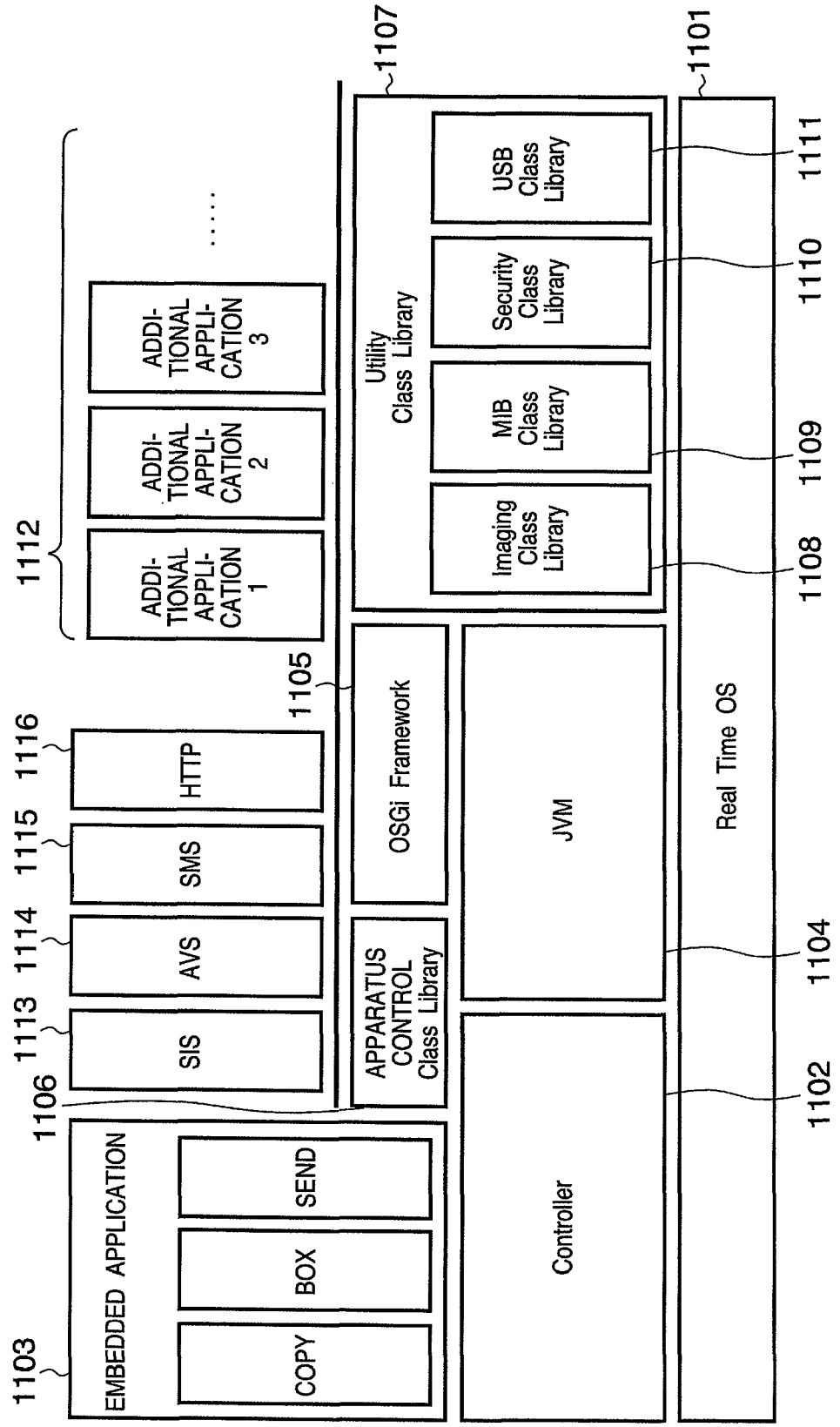
FIG. 10 is a view showing a software configuration for managing an embedded application in the image processing apparatus.

FIG. 10 is a view showing management of, e.g., adding and deleting an embedded application, and a software configuration for executing the management in the image processing apparatus. Note that an application which is described in JAVA® and can be added and deleted will be called especially an additional application. FIG. 2 is a block diagram showing the software hierarchy from hardware to the user interface from a viewpoint different from FIG. 10.

A real time OS 1101 is a real time operating system which controls the overall image forming apparatus. The real time OS 1101 provides software running on the real time OS 1101 with the services and frameworks of various resource management operations that are optimized to control an embedded system. A controller 1102 controls the hardware (e.g., reader unit and printer unit) of the image forming apparatus, and controls jobs which use printing, scanning, image conversion, and the like. An embedded application 1103 provides the copying, box, and sending functions which are implemented mainly using the functions of the controller 1102, and the embedded application 1103 includes a user interface. A JVM 1104 is a Java® virtual machine, and includes an interpreter and the like for operating a Java® program on the device.

An OSGi framework 1105 is a component which manages the lifecycle of an application running on the JVM 1104, and manages installation/uninstallation and start/stop of an application. This mechanism complies with a standard technique "OSGi Framework" which is one of standard techniques of management services. See "OSGi Service Platform Release 2, Oct. 2001, OSGi" for details of the OSGi framework.

An apparatus control class library 1106 provides an interface which allows an additional application to control devices such as the printer and scanner of the image processing apparatus via the controller 1102. A utility class library 1107 provides the additional application with various functions of the image processing apparatus. An imaging class library 1108 provides a basic image processing function, and performs processes such as size reduction of an image and format conversion of an image.

A MIB agent class library 1109 is used to acquire and set MIB (Management Information Base) information set in the image processing apparatus. A security class library 1110 provides an interface corresponding to Java® standard encryption/security packages (JCE and JSSE). A USB common class library 1111 provides a communication function via a USB.

An additional application 1112 is described in a Java® program, and can be dynamically added/deleted to/from the image processing apparatus. Additional applications are classified into an applet type serving as an application which displays a user interface on the operation unit, a servlet type which displays a user interface on a Web browser on a network, and an esplet type having no user information. By adding an application, the functions of the image processing apparatus can be extended.

A system interface service (SIS) 1113 provides an information exchange function between the additional application and the image forming apparatus. The system interface service 1113 is used to notify an application of an event such as a change in power state upon reception of a request from the application, or request a device from an application to control the LED or buzzer.

An applet viewer service 1114 performs, for example, registration, display, and switching of an applet type service. In addition, the applet viewer service 1114 notifies an applet type additional application of an event.

A service management service (SMS) 1115 provides a user interface for managing an additional application. The SMS has the following functions as application management functions.

List Display:
  A list of an application name, install date, application ID, state, license state, and resource use status is displayed.
Installation:
  An application is installed.
Uninstallation:
  An application is completely deleted from the device. Note that no application can be uninstalled unless the license is invalidated.
Start:
  A halting application is activated and started.
Stop:
  A running (active) application is stopped.
License Installation:
  The license file of an application which requires a license is installed.
License Invalidation:
  The license of an application is so invalidated as to extract a license file from a device onto a PC.
License Downloading:
  An invalid license (license file) is downloaded to a PC. The downloaded license can be installed again in only the same device.
Switching of Authentication Application:
  An authentication application is switched. After switching, the device must be activated again.
Change of Display Order:
  The display order of applications on the operation unit is changed.
Display of System Information:
  System information is displayed.

Application Information List:

A list of information including the license contents of an application is displayed.

Application History List:

A list of uninstalled applications is displayed.

Change of Password:

A password for logging in the SMS is changed.

An HTTP service 1116 is a component which performs communication by HTTP and HTTPS. The function of the HTTP service allows a Web browser on a network to access a system application and additional application. The HTTP service 1116 is extended from the log-in function on the basis of Http Service specifications defined in the above-mentioned "OSGi Framework".

Figure 11:
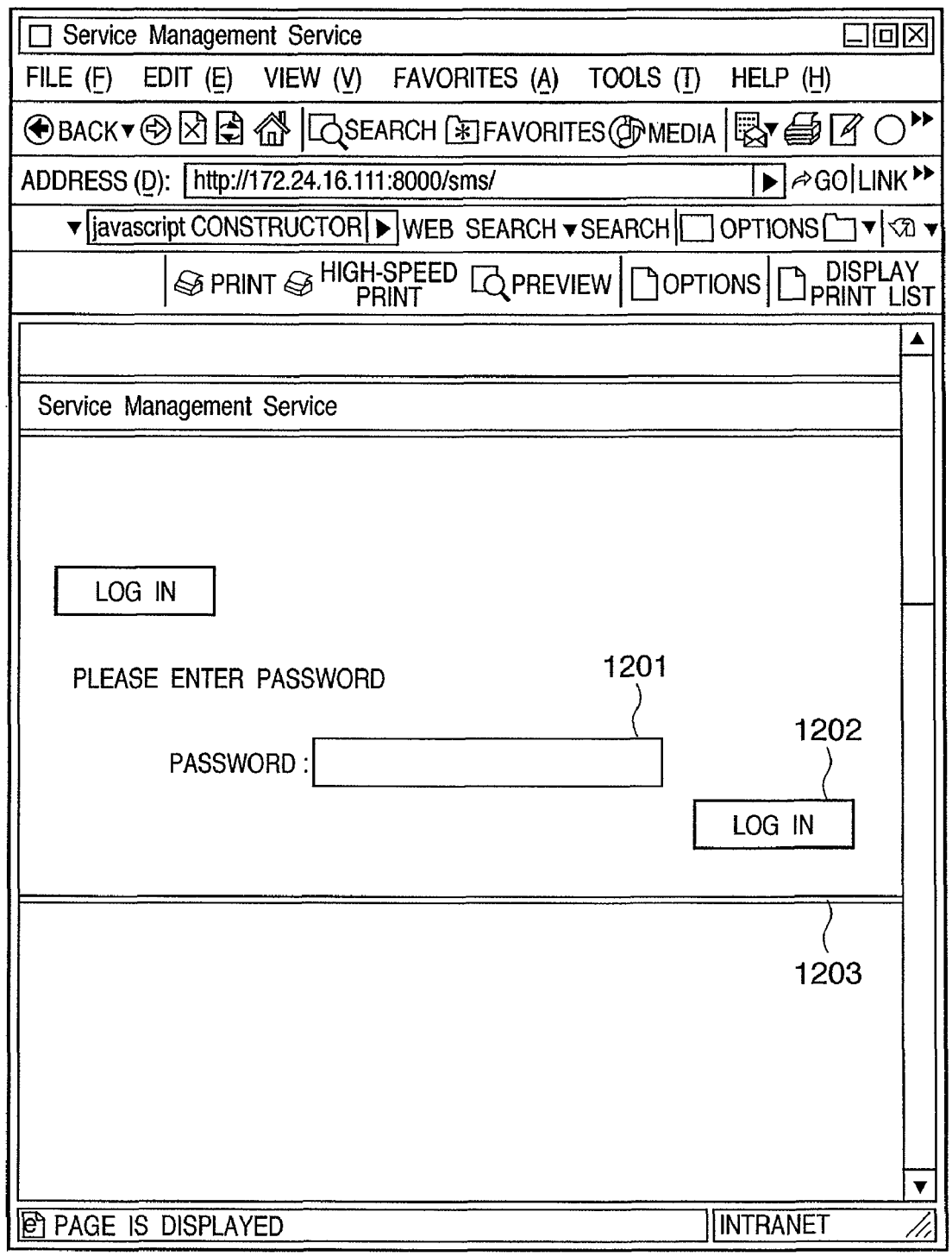
FIG. 11 is a view showing an example of an SMS log-in window displayed on the Web browser on a network.

FIG. 11 is a view showing an example of an SMS log-in window displayed on the Web browser on the network. The SMS log-in window is displayed upon access from an unauthorized browser. A password input column 1201 is an area for inputting a password. A log-in button 1202 is used to send password information input to the password input column and log in the SMS. Note that the SMS password can be changed by the user. A serial No display 1203 displays a serial number unique to the image processing apparatus.

FIG. 12 is a view showing an example of an SMS application list window displayed on the Web browser on the network. An install button 1301 is used to call an install window for newly installing an application. A system management button 1302 is used to call a system management window for setting the authentication type, application display order, and the like. A log-out button 1303 is used to log out the SMS. When the button 1303 is pressed, the SMS log-in window is displayed. An application list display area 1304 displays a list of applications installed in the image processing apparatus. The list is displayed like a table so that one application is displayed on one line. A selection radio button, name, install date, application ID, state, license state, and resource use status are displayed for each application. The name display is given by a link text, and when a name is selected, a detailed application window which presents more detailed information of the application is displayed.

An uninstall button 1305 is used to uninstall an application selected with the radio button. When a selected application cannot be uninstalled depending on the license state of the application, the button is grayed out to inhibit press of it. FIG. 12 shows a state in which the uninstall button 1305 is grayed out.

A start button 1306 is used to start an application selected with the radio button. A stop button 1307 is used to stop an application selected with the radio button. A resource information display area 1308 displays a hard disk capacity, memory, thread, socket, and file descriptor which are used by an installed application.

Figure 13:
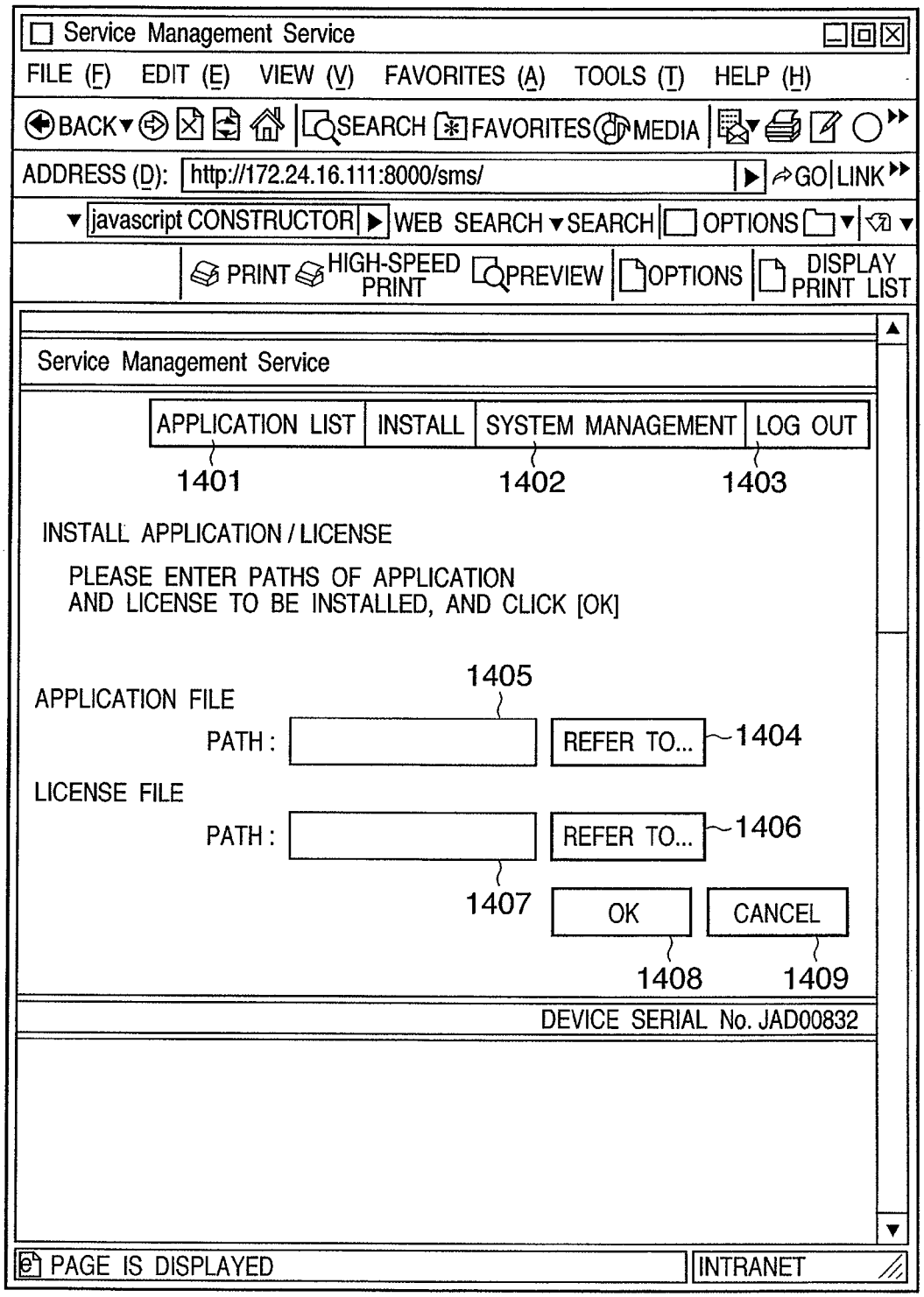
FIG. 13 is a view showing an example of an SMS application install window displayed on the Web browser on the network.

FIG. 13 is a view showing an example of an SMS application install window displayed on the Web browser on the network. An application list button 1401 is used to call the application list window in FIG. 12. A system management button 1402 is used to call a system management window for setting the authentication type, application display order, and the like. A log-out button 1403 is used to log out the SMS. When the button 1403 is pressed, the SMS log-in window is displayed.

An application selection button 1404 is used to select the file of an application to be installed. When the button 1404 is pressed, an OS standard file selection dialog is displayed. The user can select an application to be installed from this dialog. A field 1405 displays the path of an application file selected by the user.

A license file selection button 1406 is used to select a license file for an application to be installed. When the button 1406 is pressed, an OS standard file selection dialog is displayed. The user can select a license file to be installed from this dialog. A field 1407 displays the path of a license file selected by the user. An OK button 1408 is used to execute installation of an application file and license file selected by the user. A cancel button 1409 is used to cancel an install process.

FIG. 14 is a view showing an example of a detailed SMS application window displayed on the Web browser on the network. An application list button 1501 is used to call the application list window (FIG. 12). An install button 1502 is used to call the application install window (FIG. 13) for newly installing an application. A system management button 1503 is used to call a system management window for setting the authentication type, application display order, and the like. A log-out button 1504 is used to log out the SMS. When the button 1504 is pressed, the SMS log-in window (FIG. 11) is displayed.

An application information display area 1505 displays detailed information of an application. The displayed information includes the application ID, application name, install date, manufacturer, and product version. A license information display area 1506 displays license information of an application. The displayed information includes the license state, serial number, term of validity, and counter information. A license management button 1507 is used to call a license management window (FIG. 15).

Figure 15:
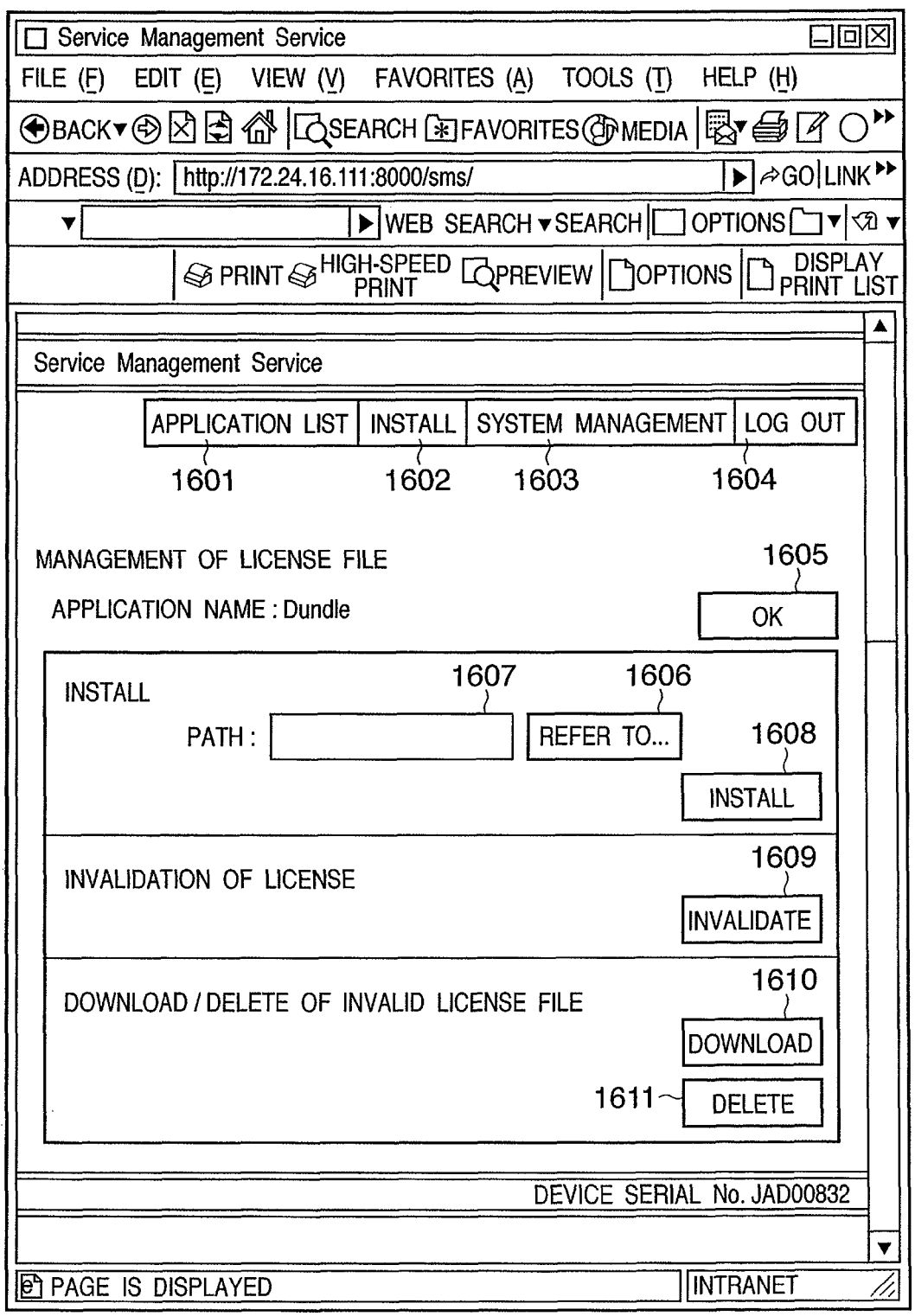
FIG. 15 is a view showing an example of an SMS license management window displayed on the browser on the network.

FIG. 15 is a view showing an example of an SMS license management window displayed on the Web browser on the network. Buttons 1601 to 1604 have the same roles as those of the buttons 1501 to 1504 shown in FIG. 14. An OK button 1605 is used to return to the detailed application window (FIG. 14). A license file selection button 1606 is used to select a license file to be installed. When the button 1606 is pressed, an OS standard file selection dialog is displayed. A display column 1607 displays the path of a license file selected by the user. An install button 1608 is used to execute installation of a license file selected by the user. An invalidation button 1609 is used to invalidate a license. A download button 1610 is used to download an invalid license file to a PC. A delete button 1611 is used to delete an invalid license file. When the download button 1610 and delete button 1611 cannot be operated depending on the license state, they are grayed out to inhibit press of them.

(Generation and Supply of Update Information Feed Data of Provided Service)

Figure 16:
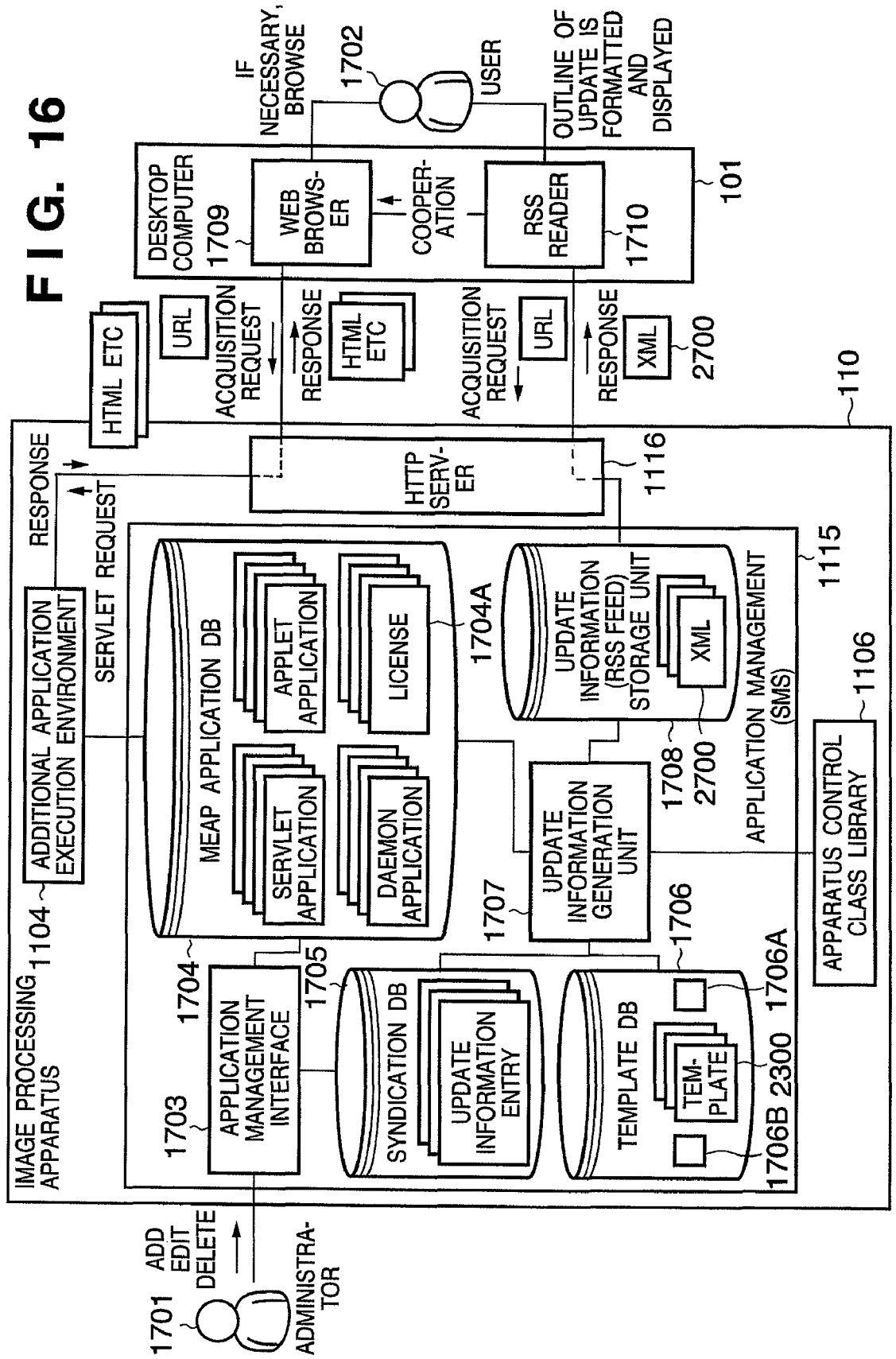
FIG. 16 is a block diagram showing a software structure for generating and supplying the RSS feed of application-related update information.

FIG. 16 is a block diagram showing a software structure for generating and supplying the RSS feed of update information (application-related update information) related to an application. An administrator 1701 is a user who performs MEAP® application management. The administrator 1701 operates the image processing apparatus 110 in order to perform management such as addition, editing, and deletion of an application which is dynamically embedded in the apparatus and provides services. A user 1702 accesses the image processing apparatus 110 via an RSS reader 1710 running on the desktop computer 101, and refers to update information related to a MEAP application. The user 1702 accesses the image processing apparatus 110 via a Web browser 1709 running on the desktop computer 101, and browses resources and Web applications provided by the image processing apparatus 110. The image processing apparatus 110 and desktop computer 101 are connected via a network, and software programs running on the respective apparatuses communicate data with each other in accordance with a protocol such as HTTP or HTTPS.

The software configuration in the image processing apparatus 110 will be explained. A software structure for generating and supplying the RSS feed of application-related update information includes the JVM 1104, apparatus control class library 1106, service management service 1115, and HTTP service 1116. The internal structure of the service management service 1115 is formed from the following software. Note that the additional application 1112 in FIG. 10 corresponds to applications which can be deleted and added, among applications stored in the MEAP application DB of FIG. 16. FIG. 10 independently shows the SMS 1115 and additional application 1112, but the additional application 1112 is managed by the SMS 1115. FIG. 16 shows this relationship as an inclusion relationship.

An application management interface 1703 provides a management interface for installing, uninstalling, or controlling from outside the apparatus, an application and license which are embedded in the image processing apparatus 110 and provide services. The application management interface 1703 is installed as a Web application (servlet type service) of the SMS 1115, and can be operated by the administrator 1701 from a remote Web browser via network communication (not shown). The application management interface 1703 may also be installed to provide a user interface to the operation unit 112 locally arranged in the image processing apparatus (applet type service).

A MEAP application database (DB) 1704 accumulates and manages MEAP applications and their licenses 1704A which are installed in the embedded application platform of the image processing apparatus 110.

A syndication DB 1705 stores and manages data used to syndicate update information related to an embedded application of the image processing apparatus 110. The stored/managed data include an update information entry which is generated while holding attribute information on an event every time an event of a change in MEAP application and its license occurs.

A template DB 1706 stores and manages templates which provide XML file formats used for syndication (distribution). Data which describes a generation rule is also contained in template data. Examples of the generation rule are information (monitoring target information) 1706A which defines whether to monitor a change as a target of update information, and information (period information) 1706B on the target period of update information. These pieces of information will be explained later with reference to FIGS. 18 and 25. XML applications for syndication comply with respective RSS versions and the specifications of Atom and the like. A plurality of templates are prepared in accordance with types of information to be syndicated and pursuant specifications.

An update information generation unit 1707 includes a template engine. Based on templates accumulated and managed in the template DB 1706, the template engine generates an XML file used for syndication from data which are accumulated and managed in the syndication DB 1705, and attributes (e.g., the configuration and state of the image processing apparatus 110) which are obtained from the apparatus control class library 1106. The update information generation unit 1707 stores the generated XML file (syndication data file for RSS, Atom, or the like) in an update information (RSS) storage unit 1708.

The update information (RSS) storage unit 1708 accumulates XML files used for syndication. The update information storage unit 1708 holds a plurality of different files in accordance with types of information to be syndicated. In accordance with the specifications of pursuant XML applications, the update information storage unit 1708 holds a plurality of files which are described in respective RSS versions and formats such as Atom. The update information storage unit 1708 is mounted as a file system which can be accessed by the HTTP server 1116. The files of XML files accumulated in the update information storage unit 1708 are specified by unique URLs when viewed from HTTP clients connected to the HTTP server 1116. When an HTTP client is connected to the HTTP server 1116 and requests acquisition of a resource specified by a URL, the HTTP server 1116 reads out, from the update information storage unit 1708, an XML file corresponding to the URL designated by the acquisition request, and transmits the XML file to the HTTP client.

In response to a request by HTTP or HTTPS from an HTTP client, the HTTP server 1116 transfers, as a response, data of various resources internally held in the image processing apparatus 110. Examples of the resource accessed by the client by HTTP are static data files (including XML files held in the update information storage unit 1708) such as HTML files and image files which are hold in a nonvolatile memory (e.g., HDD 304) in the image processing apparatus 110, and data dynamically generated by a program executed by the CPU 301. Data dynamically generated in response to an HTTP request includes HTML data which are generated by various Web applications (e.g., the above mentioned SMS user interface for remote control from a desktop computer) provided by a MEAP servlet type application running on the JVM 1104.

<Software Configuration of Computer>

The software configuration in the desktop computer 101 will be explained. The RSS reader 1710 is an application program which acquires each RSS version and an XML format (e.g., Atom) for syndication, and formats and displays data. Most of news distribution sites, information providing sites, and Web sites (e.g., weblog or blog) present on the Internet provide syndication data in order to syndicate new articles of sites, in addition to contents of the sites. By using the RSS reader 1710, the user 1702 can efficiently browse the titles and contents of new articles of sites on the Internet. The RSS reader 1710 can access even syndication data not only on the Internet but also on an intranet as far as the data is laid open to the public as a resource which can be specified by a URI and acquired. The RSS reader 1710 designates a URI for identifying syndication data stored in the update information storage unit 1708 of the image processing apparatus 110, and transmits an HTTP acquisition request to the HTTP server 1116. As a response from the HTTP server 1116 to the acquisition request, the RSS reader 1710 can receive syndication data stored in the update information storage unit 1708. In some cases, syndication data which is formatted and displayed by the RSS reader 1710 contains a hyperlink specified by a URI. When the user 1702 selects a specific hyperlink on the display of the RSS reader 1710, the RSS reader 1710 causes the Web browser 1709 to acquire and display the URI in cooperation with the Web browser 1709.

The Web browser 1709 acquires various resources provided in formats specifiable by URIs in Web servers on the Internet and an intranet, for example, document data of markup languages (e.g., HTML and XHTML) and various multimedia data (still image, moving image, and audio data). The Web browser 1709 appropriately formats the data, and graphically displays the data or outputs the data by voice. Data is acquired mainly using a communication protocol such as HTTP or FTP. The Web browser 1709 serves as a client of a client server model in terms of the communication protocol, and is regarded as, e.g., an HTTP client. When data browsed by the user 1702 contains a hyperlink specified by a URI and the user selects the anchor of the specific hyperlink, the Web browser 1709 acquires and displays resources at the designated URI. By using the form of a markup document such as an HTML document, data may be posted from the Web browser 1709 to a resource on the Web server side. The user 1702 uses the Web browser 1709 to issue an acquisition request by designating a URI assigned to a servlet running on the JVM 1104 of the image processing apparatus 110. The HTTP server 1116 of the image processing apparatus 110 transfers the acquisition request to the servlet, and sends back, to the Web browser 1709, a response such as HTML data generated as a result of a process by the servlet.

Note that the RSS reader 1710 and Web browser 1709 are implemented as single application programs in the first embodiment, but may be implemented as a single application program having the functions of both the RSS reader 1710 and Web browser 1709. The RSS reader 1710 and Web browser 1709 run on the desktop computer 101 in the above description, but may run on various general-purpose information processing apparatuses including a portable computer (e.g., PDA), in addition to the desktop computer. Alternatively, the RSS reader 1710 and Web browser 1709 may run on image processing apparatuses such as a multi-functional peripheral and digital camera, like the image processing apparatuses 120 and 130, and various embedded apparatuses such as a cell phone.

Figure 17:
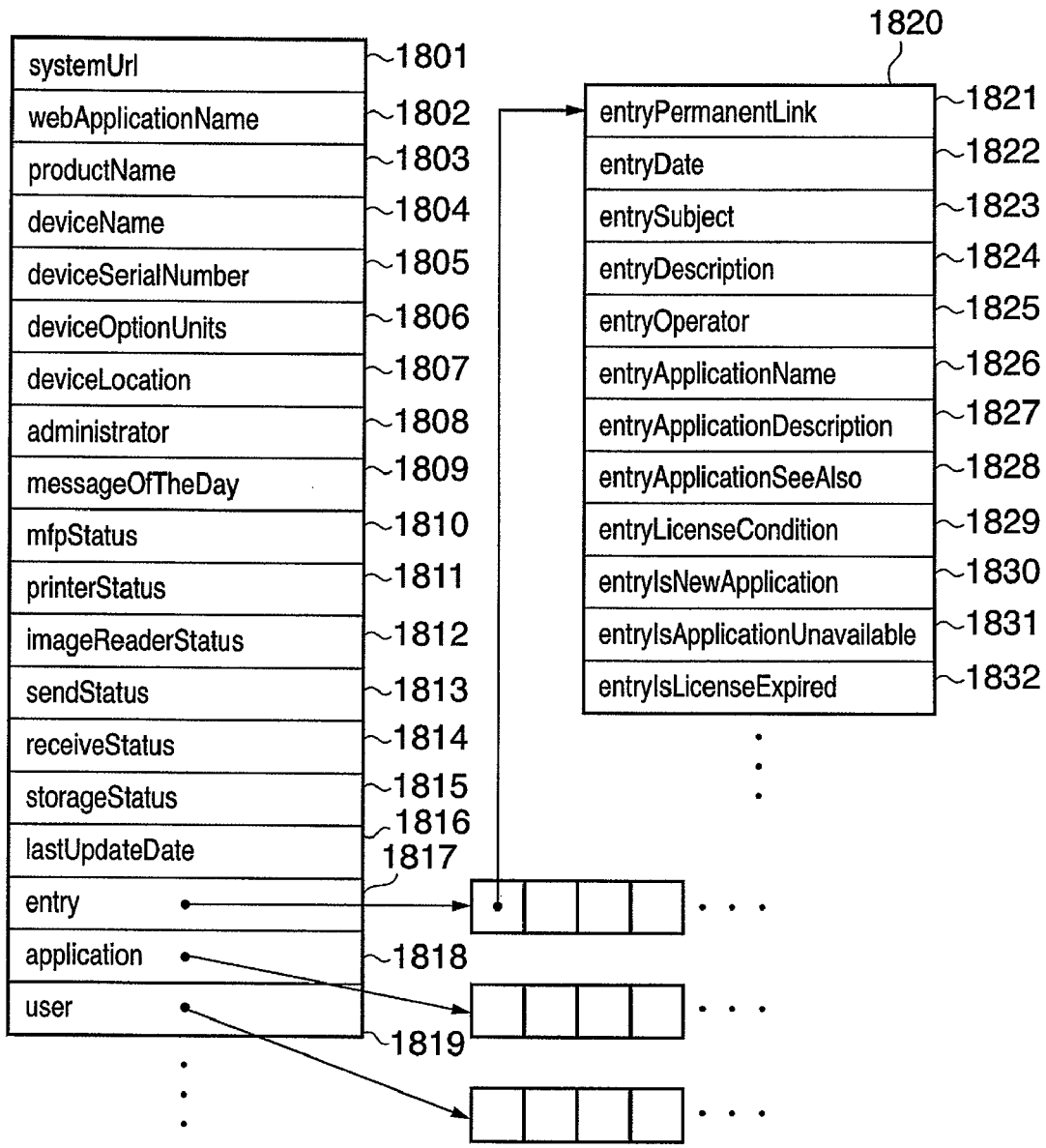
FIG. 17 is a block diagram showing the data structure of a syndication DB.

FIG. 17 is a block diagram showing the data structure of the syndication DB. A systemUrl 1801 represents a URI (URL) for specifying the top page of the Web server of the image processing apparatus 110. The top page plays the role of a portal to various Web server functions provided by the image processing apparatus 110. A webApplicationName 1802 represents a name given to a Web application function provided by the Web server of the image processing apparatus 110. A productName 1803 represents the product name (model name or the like) of the image processing apparatus 110. When the update information generation unit 1707 requires the value in this field, this requirement is dynamically solved by acquiring the value from the controller via the apparatus control class library 1106.

A deviceName 1804 represents an apparatus name uniquely given to a specific image processing apparatus 110. The unique apparatus name is assigned by the user (administrator) of the apparatus in order to specify an apparatus for convenience in use. When the update information generation unit 1707 requires the value in this field, this requirement is dynamically solved by acquiring the value from the controller via the apparatus control class library 1106. A deviceSerialNumber 1805 represents a serial number assigned to a specific image processing apparatus 110. The serial number is sometimes used to specify an individual apparatus by the manufacturer of the image processing apparatus 110. When the update information generation unit 1707 requires the value in this field, this requirement is dynamically solved by acquiring the value from the controller via the apparatus control class library 1106. A deviceOptionUnits 1806 represents a character string which describes optional units mounted in the image processing apparatus 110. When the update information generation unit 1707 requires the value in this field, this requirement is dynamically solved by acquiring the value from the controller via the apparatus control class library 1106. A deviceLocation 1807 represents a character string which describes a location where the image processing apparatus 110 is installed. When the update information generation unit 1707 requires the value in this field, this requirement is dynamically solved by acquiring the value from the controller via the apparatus control class library 1106.

An administrator 1808 describes the name of a user in charge of management of the image processing apparatus 110, and the E-mail address of the user. When the update information generation unit 1707 requires the value in this field, this requirement is dynamically solved by acquiring the value from the controller via the apparatus control class library 1106. A messageOfTheDay 1809 describes a message which is announced by a user in charge of management of the image processing apparatus 110 to other users. This message is sometimes displayed on the operation unit 122 of the image processing apparatus 110 or a Web application (remote UI). When the update information generation unit 1707 requires the value in this field, this requirement is dynamically solved by acquiring the value from the controller via the apparatus control class library 1106.

An mfpStatus 1810 describes the operation status of the image processing apparatus 110 as a multi-functional peripheral. When the update information generation unit 1707 requires the value in this field, this requirement is dynamically solved by acquiring the value from the controller via the apparatus control class library 1106. A printStatus 1811 describes the operation status of the image processing apparatus as a printer. When the update information generation unit 1707 requires the value in this field, this requirement is dynamically solved by acquiring the value from the controller via the apparatus control class library 1106. An imageReaderStatus 1812 describes the operation status of the image processing apparatus 110 as an image input apparatus (image scanner, digital camera, or the like). When the update information generation unit 1707 requires the value in this field, this requirement is dynamically solved by acquiring the value from the controller via the apparatus control class library 1106. A sendStatus 1813 describes the operation status of the image processing apparatus 110 as a transmission apparatus (FAX, IFAX, E-mail, file transfer, or the like). When the update information generation unit 1707 requires the value in this field, this requirement is dynamically solved by acquiring the value from the controller via the apparatus control class library 1106. A receiveStatus 1814 describes the operation status of the image processing apparatus 110 as a reception apparatus (FAX, IFAX, E-mail, file transfer, or the like). When the update information generation unit 1707 requires the value in this field, this requirement is dynamically solved by acquiring the value from the controller via the apparatus control class library 1106. A storageStatus 1815 describes the operation status of the image processing apparatus 110 as a storage apparatus. When the update information generation unit 1707 requires the value in this field, this requirement is dynamically solved by acquiring the value from the controller via the apparatus control class library 1106.

A lastUpdateDate 1816 describes a date and time when the latest update information entry is registered in the syndication DB 1705. An entry 1817 describes a list having a structure for holding a series of update information entries. The structure of each entry contained in the list will be described later. An application 1818 represents a list having a structure for holding information on applications and licenses installed in the MEAP application DB 1704. A user 1819 represents a list having a structure for holding information on the registration user of the image processing apparatus 110. When the update information generation unit 1707 requires the value in this field, this requirement is dynamically solved by acquiring the value from the controller via the apparatus control class library 1106.

The structure of each element contained in a list 1820 of the entry 1817 will be explained. Each element of the list corresponds to an individual update information entry. An entryPermanentLink 1821 describes a URI which specifies a resource for acquiring HTML data that explains detailed information of the update information entry. When the user acquires a resource designated by the URI by using the Web browser 1709 or the like, display of detailed information associated with the update information is obtained. An entryDate 1822 describes a date and time when the update information entry is generated. An entrySubject 1823 describes the subject of the update information entry. For example, for an entry representing installation of a new application, the entrySubject 1823 describes information "install" as an event category.

An entryDescription 1824 describes an explanation of the update information entry. The explanation helps the user understand the contents of update information by reading the explanation, and is described in a natural language. In some cases, the explanation is marked up in HTML or the like, and a hypertext link, image, or the like is embedded. An entryOperator 1825 describes a user who has performed an operation to generate an update event corresponding to the update information entry. When no specific user is involved in generation of an event (for example, an event automatically generated by the timer), the value in this field is "system", "timer", or the like. An entryApplicationName 1826 describes the name of an application pertaining to the update information entry. When the application is a Web application, the entryApplicationName 1826 also contains a description of a URI which specifies the Web application. For example, when update information is installation of a new application, the related application is the installed application. An entryApplicationDescription 1827 describes an explanation of the application pertaining to the update information entry. The explanation helps the user understand the contents of an application by reading the explanation, and is described in a natural language. In some cases, the explanation is marked up in HTML or the like, and a hypertext link, image, or the like is embedded.

An entryApplicationSeeAlso 1828 describes a URI which specifies another information source of the application pertaining to the update information entry. For example, an entryApplicationSeeAlso 1828 describes the URL of an application information display window by the SMS, or the URL of an application information page on a Web site provided by the developer of the application. An entryLicenseCondition 1829 describes the license condition and state of the application pertaining to the update information entry. An entryIsNewApplication 1830 becomes true in a case in which the update information entry is based on an event of adding a new available application. An entryIsApplicationUnavailable 1831 becomes true in a case in which the update information entry is based on an event generated when the application becomes unavailable upon uninstallation or the like. An entryIsLicenseExpired 1833 becomes true in a case in which the update information entry is based on an event of losing the license due to expiration.

Figure 18:
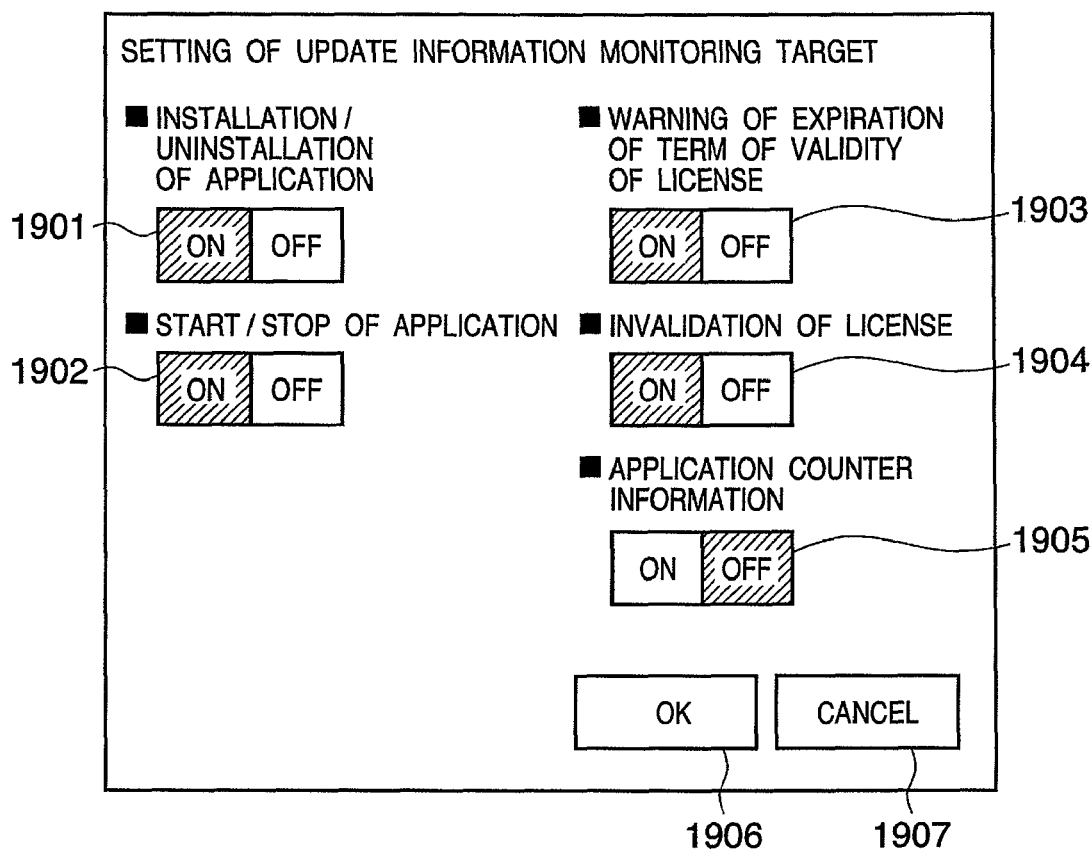
FIG. 18 is a view showing an example of a window for setting a target whose update information is monitored.

FIG. 18 is a view showing an example of a window for setting a target whose update information is monitored. This window displays switches for selecting whether to monitor each event to an application and its license. A switch 1901 is used to set whether to monitor installation/uninstallation of an application. When the switch 1901 is set ON and the user installs or uninstalls an application, the information is recorded in an update information file. Similarly, a switch 1902 is used to set whether to monitor the start/stop of an application.

A switch 1903 is used to set whether to monitor a warning of expiration of the term of validity of a license. When the switch 1903 is set ON and the number of remaining days of the term of validity of the license becomes smaller than a predetermined value (30 days, 10 days, 5 days, or 1 day), the information is recorded in the update information file.

A switch 1904 is used to set whether to monitor invalidation of a license. When the switch 1904 is set ON and the license becomes invalid, the information is recorded as update information. The license becomes invalid when the term of validity is expired or the user invalidates the license.

A switch 1905 is used to set whether to monitor application counter information. When the switch 1905 is set ON and the value of the application counter changes, the information is recorded as update information.

Values set with these switches are saved for the respective items in the monitoring target information 1706A shown in FIG. 16.

Figure 19:
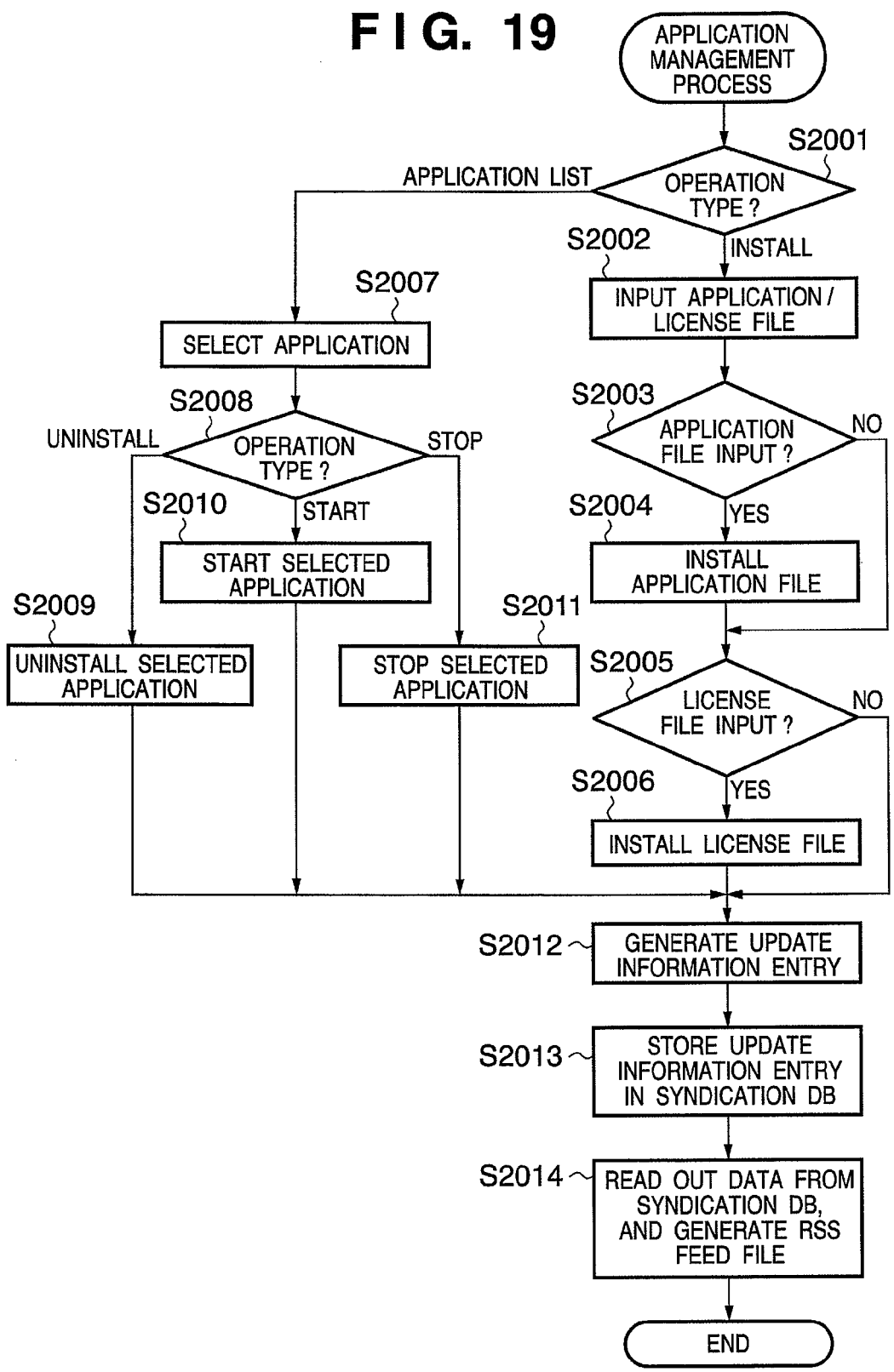
FIG. 19 is a flowchart showing application management process procedures in the image processing apparatus.

FIG. 19 is a flowchart showing application management process procedures in the image processing apparatus. The process procedures are executed by the CPU 301 of the image processing apparatus 110. The algorithm of the process is contained in the application management interface 1703 serving as a software module of the SMS 1115. The SMS 1115 can form an operation window on the operation unit 112, or can be implemented as a Web application. When the SMS 1115 is implemented as a Web application, its operation window is displayed on a remote Web browser, like the examples shown in FIGS. 11 to 15.

In step S2001, the flow waits for an operation selection input by the user, and the condition branches in accordance with the operation type. If the selected operation type is installation (corresponding to 1301 in the operation window), the flow advances to step S2002; if the selected operation type is an application list (corresponding to 1401 in the operation window), to step S2007.

In step S2002, both or one of an application file and license file is input. In step S2003, it is determined whether the application file has been input. If the application file has been input, the flow advances to step S2004; if no application file has been input; to step S2005. In step S2004, the input application file is installed in the MEAP application DB 1704. In step S2005, it is determined whether the license file has been input. If the license file has been input, the flow advances to step S2006; if no license file has been input, to step S2012. In step S2006, the input license file is installed in the MEAP application DB 1704. Then, the flow advances to step S2012.

In step S2007, the application selected by the user is selected from the application list. The following operation targets the selected application.

In step S2008, the flow waits for an operation selection input by the user, and the condition branches in accordance with the operation type. If the selected operation type is uninstallation (corresponding to 1305 in the operation window), the flow advances to step S2009; if the selected operation type is the start (corresponding to 1306 in the operation window), to step S2010; if the selected operation type is the stop (corresponding to 1307 in the operation window), to step S2011.

In step S2009, the selected application is uninstalled from the MEAP application DB 1704. Then, the flow advances to step S2012. In step S2010, the operation of the selected application starts. After that, the flow advances to step S2012.

In step S2011, the operation of the selected application stops. Then, the flow advances to step S2012.

In step S2012, an update information entry corresponding to a process executed in the preceding step is generated. More specifically, an update information entry which describes detailed information of the event is generated in correspondence with an event of installing or uninstalling an application or license, or starting or stopping an application. At this time, an update information entry is generated when the monitoring target information 1706A is referred to and the value of an item corresponding to the event represents that the event is a monitoring target.

In step S2013, the generated update information entry is stored in the syndication DB 1705. In step S2014, an RSS feed file generation process is called to generate a new RSS feed file from the syndication DB which has been changed by adding the new update information entry.

Figure 20:
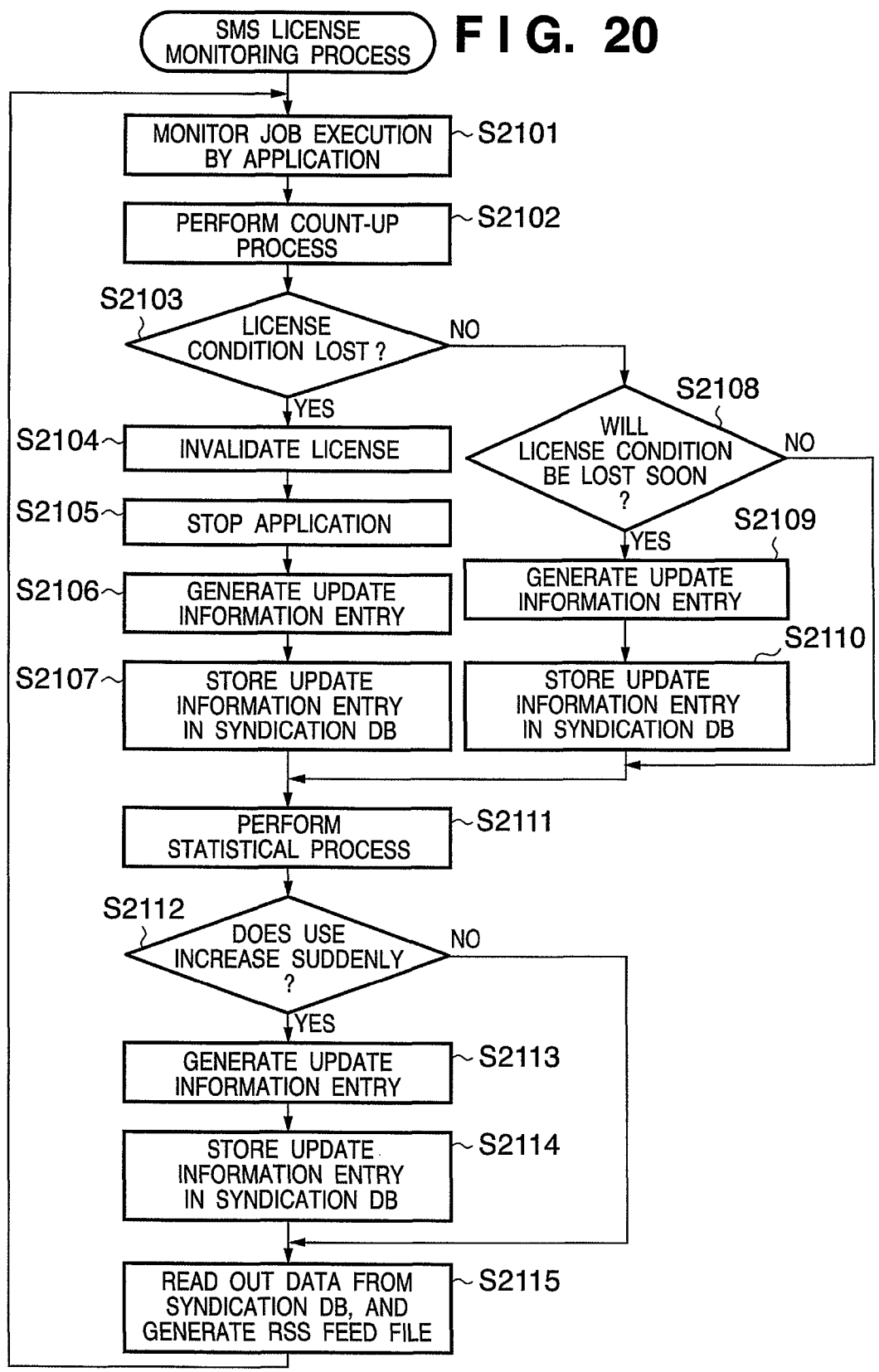
FIG. 20 is a flowchart showing process procedures of monitoring a change in state of the license condition along with the operation of the image processing apparatus.

FIG. 20 is a flowchart showing process procedures of monitoring a change in state of the license condition along with the operation of the image processing apparatus. The process procedures are executed by the CPU 301 of the image processing apparatus 110. The algorithm of the process is contained in the SMS 1115.

In step S2101, job execution by an application is monitored. In step S2102, the total resource use amount along with job execution is counted up. In step S2103, it is determined whether the license condition has been lost upon expiration of the term of validity of the license, an increase in resource use amount, or the like. If the license condition has been lost, the flow advances to step S2104; if the license condition has not been lost, to step S2108.

In step S2104, the MEAP application DB 1704 is changed to invalidate the license of the application whose license has been lost. In step S2105, the operation of the application whose license has been lost is stopped. In step S2106, an update information entry which describes the event of losing the license is generated. At this time, an update information entry is generated when the monitoring target information 1706A is referred to and the value of an item corresponding to the event represents that the event is a monitoring target. In step S2107, the generated update information entry is stored in the syndication DB 1705. Then, the flow advances to step S2111.

In step S2108, the remaining days of the term of validity, the remaining amount of the use amount limitation of the resource, or the like is compared with a default value to determine whether the license condition will be lost soon. If the license condition will be lost soon, the flow advances to step S2109; if the remainder is sufficient, to step S2111. In step S2109, an update information entry which describes an event of losing the license soon is generated. At this time, an update information entry is generated when the monitoring target information 1706A is referred to and the value of an item corresponding to the event, represents that the event is a monitoring target. In step S2110, the generated update information entry is stored in the syndication DB 1705. Then, the flow advances to step S2111.

In step S2111, a statistical process based on monitoring of job execution by the application and the past history is performed. As the statistical process based on monitoring of job execution by the application and the past history, various statistical processes are effective, including calculation of the resource use for each user or each user group, calculation of the correlation between the time period and job execution, calculation of the increase/decrease degree of the application use ratio, integration of the data size by communication and accumulation, and calculation of the running cost of consumables and the maintenance cost unique to the image processing apparatus.

In step S2112, it is determined whether the use count of the job execution-monitored application during a recent predetermined period has increased suddenly from that in the past predetermined period. If the use has increased suddenly, the flow advances to step S2113; if NO, to step S2114. In step S2113, an update information entry which describes the event of suddenly increasing the use of the application is generated. At this time, an update information entry is generated when the monitoring target information 1706A is referred to and the value of an item corresponding to the event represents that the event is a monitoring target. In step S2114, the generated update information entry is stored in the syndication DB 1705.

In step S2115, an RSS feed file generation process is called to generate a new RSS feed file from the syndication DB which has been changed by adding the new update information entry. Then, the flow returns to step S2101 to repeat the application monitoring process.

Figure 21:
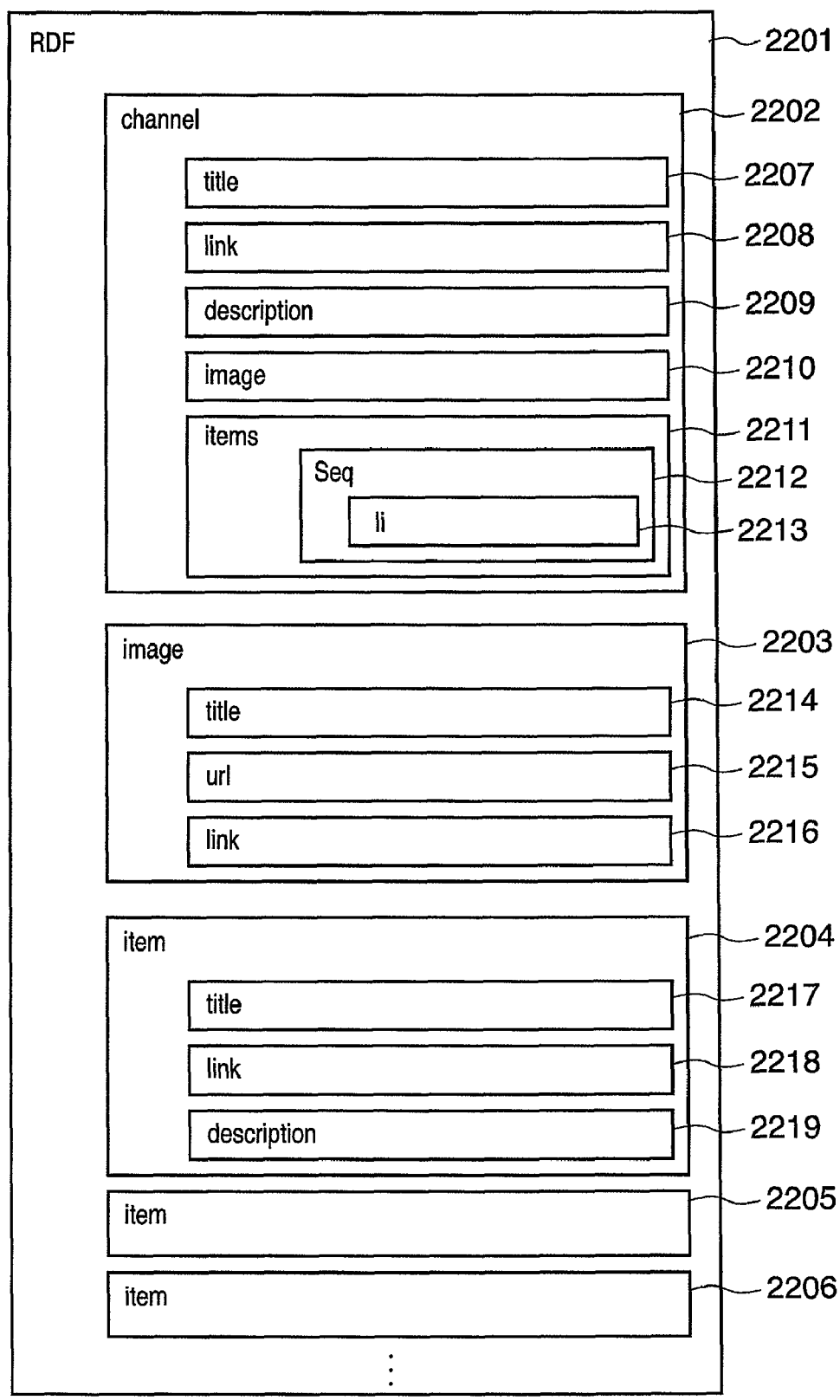
FIG. 21 is a view showing the structure of an example of an XML format used for syndication of update information of the image processing apparatus.

FIG. 21 is a view showing an example of an XML format (i.e., syndication data format) used for syndication of update information of the image processing apparatus. An XML file which is stored in the update information storage unit 1708 and specified by a URI is an XML document which describes information on update of various data associated with an embedded application of the image processing apparatus, and information on various events generated in association with the embedded application of the apparatus. A plurality of types of XML document formats are provided in correspondence with various formats which are used by a general Web site to distribute update information of the site. Although the image processing apparatus 110 supports respective RSS versions and XML formats such as Atom, a description by RSS 1.0 will be exemplified. In FIG. 21, the inclusion relationship of blocks means that of XML elements.

An RDF element 2201 is the top element of an XML document. The RDF element contains a channel element 2202, image element 2203, and item elements 2204, 2205, and 2206. The channel element 2202 describes basic information on the whole update information. This element corresponds to an RDF subject node. The contents of the channel element contain a title element 2207, link element 2208, description element 2209, image element 2210, and items element 2211. The title element 2207 represents the title of the update information. The link element 2208 represents the URI of a site treated by the update information. The description element 2209 describes an explanation of, e.g., the contents and functions of the site treated by the update information. The image element 2210 describes a URI which specifies an image resource such as the logo of the site treated by the update information. Details of the image element 2210 will be described later in association with the image element 2203 to be described below. The items element 2211 provides the indices of the item elements 2204, 2205, and 2206. A li element 2213 listed in the contents of a Seq element 2212 represents each update information URI. The image element 2203 expresses an image such as a logo. The contents of the image element 2203 contain a title element 2214, url element 2215, and link element 2216. The title element 2214 represents the title of an image, and is sometimes used as an alternative text of the image. The url element 2215 describes the URI of an image resource. When a hyperlink using this image as an anchor is displayed, the link element 2216 describes a URI used as a link destination. The item elements 2204, 2205, and 2206, and the like represent the order of elements each expressing update information. The contents of the item element contain a title element 2217, link element 2218, and description element 2219. The title element 2217 describes the title of update information. The link element 2218 describes the URI of the update information. The description element 2219 describes a description of the update information.

FIG. 22 shows an example of a template stored in the template DB. The template exemplified in FIG. 22 is used to generate an XML file of the RSS 1.0 format. Template data is made up of XML elements formed from various syndication vocabularies, template control instructions, and a plurality of text data describing template variables. The same reference numerals as those in FIG. 21 denote the same XML vocabularies in the RSS 1.0 format described above, and a description thereof will be omitted.

A plurality of template data stored in the template DB 1706 exist in accordance with respective formats (respective RSS versions, Atom, and the like) of syndication data to be output. For example, a system integrator which constructs a system including a user, administrator, and image processing apparatus can easily copy and edit a template file to customize it in accordance with the use environment, or prepare a plurality of template variations to selectively use the template. Since the template is structured text data, it can be easily intuitively edited by a visual editor having a graphical user interface. A template editor (not shown) is provided, and the user can graphically edit the correspondence between the template structure and information to be embedded in the template.

In generating an RSS file from the template, most of the text of the template is directly output to an RSS file, but pseudo-elements (represented by bold characters in FIG. 22) having a prefix "TMPL_" are specially processed as template variables or template control instructions by the template engine of the update information generation unit 1707.

A TMPL_VAR pseudo-element is a template variable, and is replaced by the template engine with the value of a variable having a name of the name attribute. More specifically, the TMPL_VAR pseudo-element is a variable which is replaced with an attribute associated with the configuration, setting, or state of the image processing apparatus. The value to be replaced is based on, for example, information of an update information entry in the syndication DB 1705, application information and license information in the MEAP application DB 1704, and configuration information and state information of the image processing apparatus that are obtained from the controller module via the apparatus control class library 1106.

A TMPL_LOOP pseudo-element is a template control instruction, and repetitively processes contents up to the end tag (</TMPL_LOOP>) of TMPL_LOOP while sequentially selecting variables contained in the list on the basis of a list variable having a name of the name attribute. Each of variables sequentially selected from the list has an internal structure (see the contents of the entry list in FIG. 17). When a variable in the internal structure of the variable is referred to by the name attribute of the TMPL_VAR pseudo-element contained in the repetitive block by TMPL_LOOP, the TMPL_VAR pseudo-element is replaced with the variable value in the internal structure, and output.

A TMPL_IF pseudo-element is a template control instruction which controls the process of the template engine in accordance with the Boolean value of a variable having a name of the name attribute. If the variable is true, contents up to the end tag (</TMPL_IF>) of TMPL_IF are processed; if false, contents from the start tag to end tag of TMPL_IF are skipped.

Since update information feed data which is generated from the template in FIG. 22 for syndication is an XML application of the RSS 1.0 format, it has module expandability using an XML name space. In other words, the update information feed data can be combined with other XML vocabularies to easily add necessary information in syndication feed data. For example, the following elements are combined from the DCMES properties of Dublin Core frequently used as standard metadata description elements: date elements 2301 and 2306, a subject element 2304, a creator element 2305, and a generatorAgent element 2302 from an Admin module are combined.

As one of large effects of the first embodiment, it becomes easy to flexibly, strictly expand a data format for feeding update information.

Figure 23:
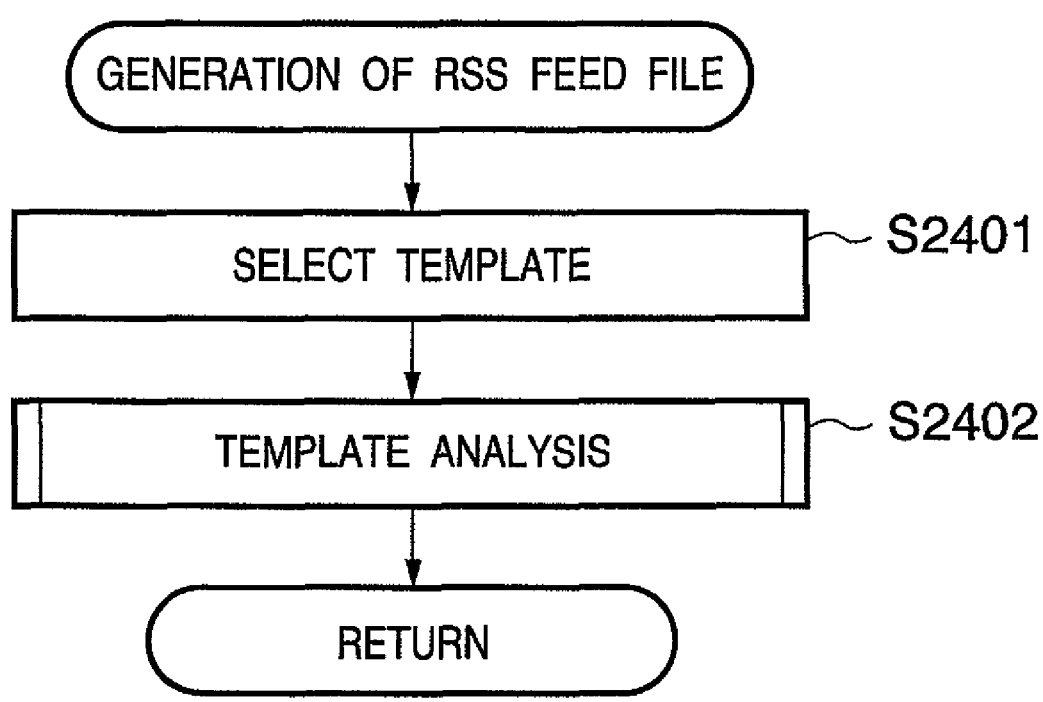
FIG. 23 is a flowchart showing syndication data generation process procedures by an update information generation unit.

FIG. 23 is a flowchart showing syndication data generation process procedures by the update information generation unit. This process is executed by the CPU 301 of the image processing apparatus 110. The algorithm of the process is contained in the update information generation unit 1707. This process is called in updating a feed file. For example, the process is called at the end of the application management process (FIG. 19) or the end of the job monitoring process (FIG. 20) by the SMS. The process is called in synchronism with the timer to periodically update the feed file. Alternatively, the process may be called upon reception of a feed file acquisition request by an HTTP request from a client, and send back an updated feed file as a response. In this case, when no apparatus operates at an interval between previous feed file generation and response, a cached feed file may be sent back as a response.

In step S2401, a template used to generate a syndication data file (feed file) is selected from the template DB 1706 and extracted. As described above, a plurality of templates exist with variations corresponding to various XML formats and selective uses. For example, a system integrator which constructs a system including a user, administrator, and image processing apparatus can use a user interface (not shown) to select a plurality of templates which should be selected to generate a feed file. When a plurality of templates are set and the process procedures are called in order to generate a feed file, a plurality of feed files are generated in correspondence with the set templates.

In step S2402, a process of analyzing a template and outputting feed data is performed. The template analysis process procedures are recursively called, and details thereof will be described later (FIG. 24).

Figure 24:
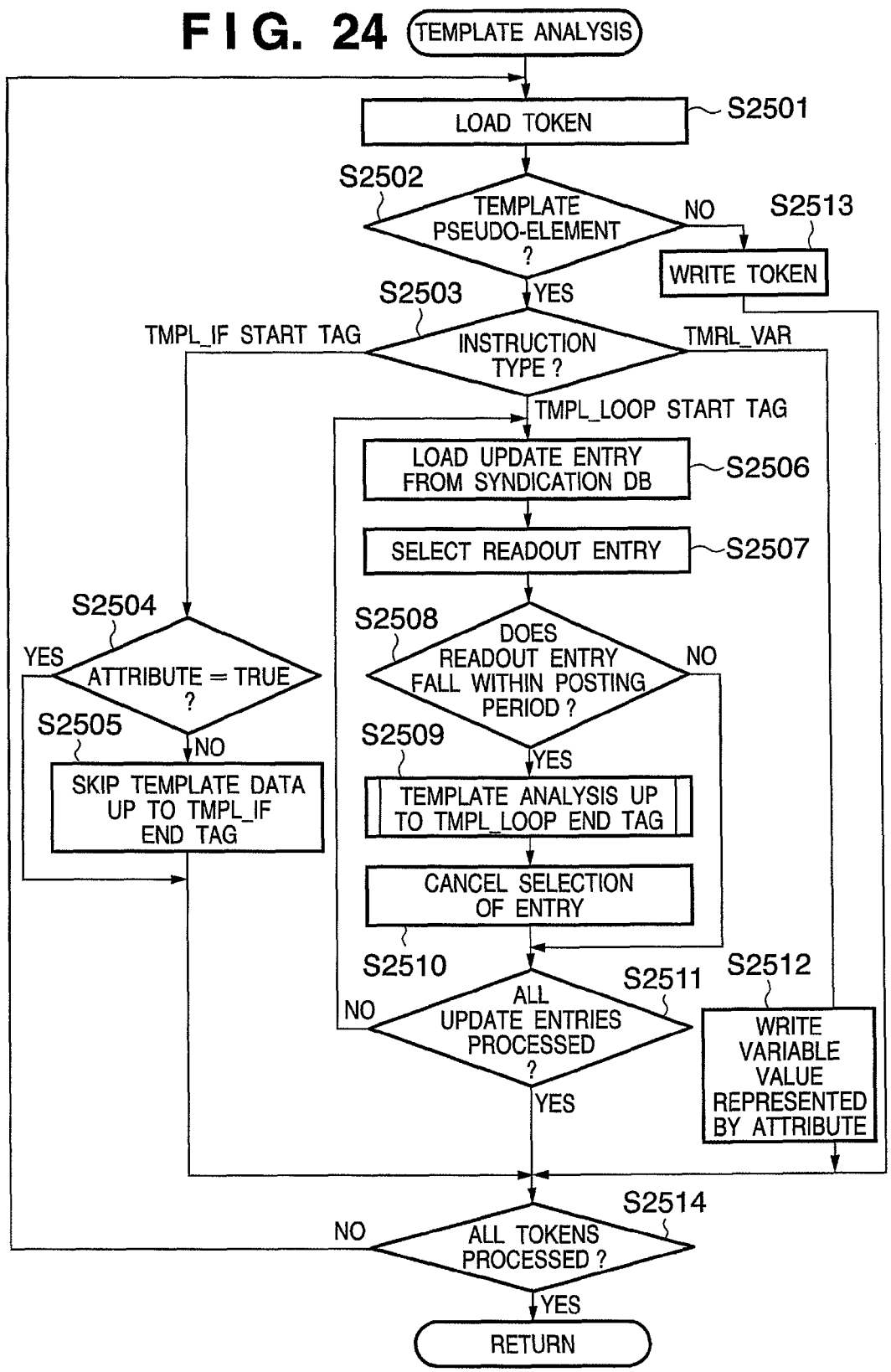
FIG. 24 is a flowchart showing process procedures of analyzing a template and outputting syndication data by the update information generation unit.

FIG. 24 is a flowchart showing process procedures of analyzing a template and outputting syndication data by the update information generation unit. This process is executed by the CPU 301 of the image processing apparatus 110. The algorithm of the process is contained in the update information generation unit 1707.

In step S2501, while template data is loaded as a byte string, tokens divided by lexical analysis are sequentially loaded. In step S2502, it is determined whether the loaded token is a template pseudo-element. If the token is a template pseudo-element, the flow advances to step S2503; if the token is not a template pseudo-element (i.e., a general XML element which should be directly written in the feed file), to step S2513. In step S2503, the template instruction of the template pseudo-element is determined, and the condition branches. If the template pseudo-element is a TMPL_IF start tag, the flow advances to step S2504; if the template pseudo-element is a TMPL_LOOP start tag, to step S2506; if the template pseudo-element is TMPL_VAR, to step S2512.

In step S2504, the variable of a variable name to which the name attribute of the TMPL_IF start tag refers is evaluated to determine the Boolean value. The variable is defined by the schema in the syndication DB 1705, and the variable value is determined on the basis of the update information entry of the syndication DB 1705, the MEAP application DB 1704, and the apparatus control class library 1106. The configuration and state of the image processing apparatus, job information, and the like are obtained from the apparatus control class library 1106. If the Boolean value of the variable is false, the flow advances to step S2505; if true, to step S2514. In step S2505, since the TMPL_IF condition is false, template data up to a TMPL_IF end tag is skipped. Then, the flow advances to step S2514.

In step S2506, a list variable having a name of the name attribute in the TMPL_LOOP start tag is read out from the syndication DB and evaluated. A TMPL_LOOP control instruction is to repetitively process contents up to a TMPL_LOOP end tag (</TMPL_LOOP>) while sequentially selecting variables contained in the list. A case in which the list variable is entry will be explained.

In step S2507, each variable, i.e., each update information entry contained in the list is selected from the entry list read out from the syndication DB. Each variable contained in the list has the internal structure in FIG. 17 in correspondence with the update information entry. If the name attribute of a TMPL_VAR pseudo-element contained in a subsequent repetitive block by TMPL-LOOP refers to a variable in the internal structure of the variable, the TMPL_VAR pseudo-element is replaced with the variable value in the internal structure, and the replaced value is output. In each repeat of the TMPL_LOOP block, update information entries are selected one by one to perform a template process based on the information of the selected update information entry.

In step S2508, an internal variable entryDate of the readout update information entry is compared with the setting of the update information posting period (FIG. 25) which is set in advance, determining whether the readout entry falls within the posting period of syndication in the feed file. If the readout entry falls within the posting period, the flow advances to step S2508; if the readout entry does not fall within the posting period, to step S2511. It can be determined that the readout entry falls within the posting period when the entry date and current date are compared with each other and the current date falls within a period saved as the period information 1706B in FIG. 16 by using the entry date as a reference.

In step S2509, a template analysis process is recursively performed within the scope of the selected update information entry until a TMPL_LOOP end tag appears. In step S2510, selection of the selected update information entry is canceled because one loop of the TMPL_LOOP block ends. In step S2511, it is determined whether all update information entries contained in the entry list have been processed. If all update information entries have been processed, the loop ends and the flow advances to step S2514; if an unprocessed update entry remains, the flow advances to step S2506 to repeat the TMPL_LOOP block process.

In step S2512, the variable of a variable name to which the name attribute of the TMPL_VAR pseudo-element refers is evaluated to write the value in the feed file. The variable is defined by the schema in the syndication DB 1705, and the variable value is determined on the basis of the update information entry of the syndication DB 1705, the MEAP application DB 1704, and the apparatus control class library 1106. The configuration and state of the image processing apparatus, job information, and the like are obtained from the apparatus control class library 1106. Thereafter, the flow advances to step S2514.

In step S2513, the loaded token is directly written in the feed file as a text which forms a general XML description. Then, the flow advances to step S2514. In step S2514, it is determined whether all tokens in template data have been processed. If all tokens have not been processed, the flow returns to step S2501 to repeat the series of process procedures; if all tokens have been processed, the flow returns from the process procedures.

Figure 25:
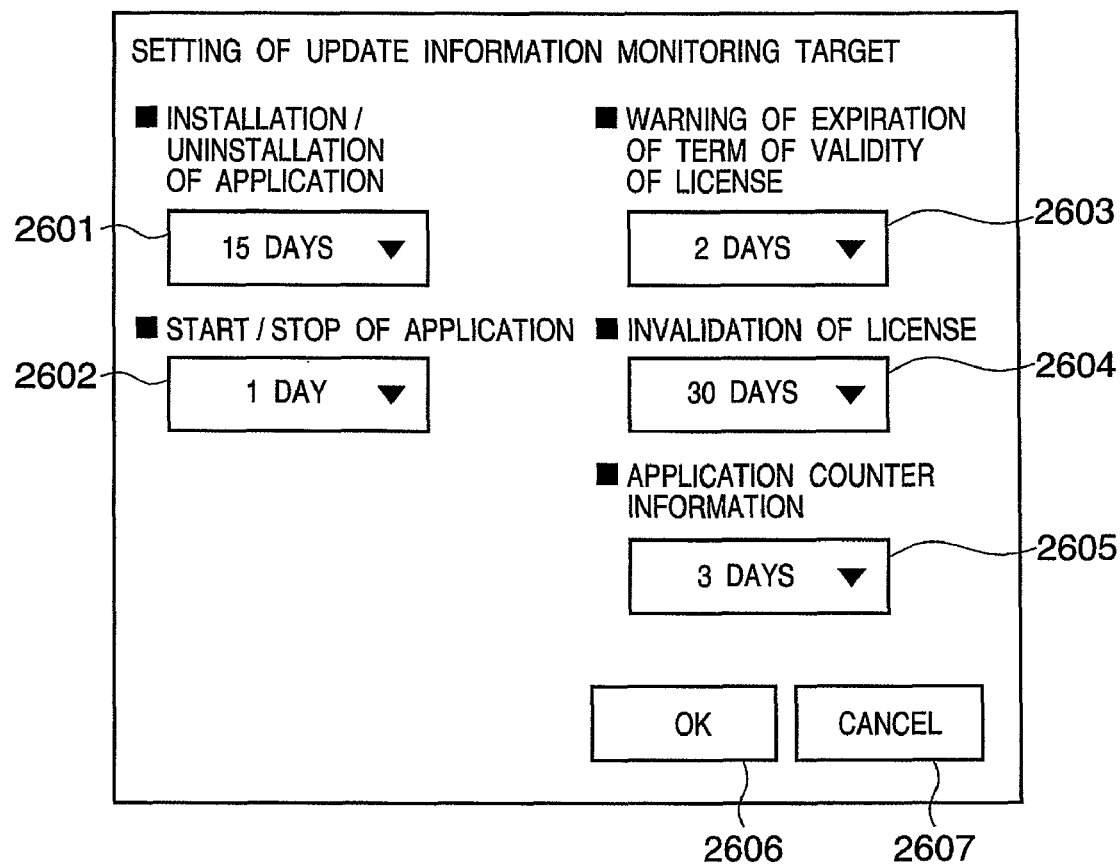
FIG. 25 is a view showing an example of a window for setting a period during which update information is posted in an update information file.

FIG. 25 is a view showing an example of a window for setting a period during which update information is posted in an update information file. A pull-down menu for setting a period is displayed for each event to an application and its license. For example, each pull-down menu allows selecting [1 day/2 days/3 days/4 days/5 days/6 days/7 days/10 days/15 days/30 days]. Reference numerals 2601 to 2605 denote pull-down menus for setting a period during which an event is treated as update information upon generation of an event such as installation/uninstallation of an application, the start/stop of the application, a warning of expiration of the term of validity of the license, license invalidation, or application counter information. For example, at the settings shown in FIG. 25, after a new application is installed, the information is posted as update information in the update information file for 15 days. In response to an update information file acquisition request, an entry whose term of validity has expired is deleted from the update information file. The set period is saved as the period information 1706B in FIG. 16.

FIG. 26 is a view showing an example of a feed file for syndicating application-related update information. The feed file illustrated in FIG. 26 is XML data of the RSS 1.0 format. The feed file is stored in the update information storage unit 1708, and can be specified by a URI and acquired via a network outside the image processing apparatus 110. The same reference numerals denote the same RSS 1.0 vocabularies as those described above in important descriptions, and a description thereof will be omitted.

An element 2307 is a declaration of version information of a markup language, and declares that syndication data is described in XML 1.0. The RDF element 2201 is the top element of an XML document, as described above. At the same time, the RDF element 2201 is a declaration of the version of syndication data, and declares that the syndication data has the RSS 1.0 format. The channel element 2202 describes information on distribution. The channel element contains a link element 2308 representing a URI associated with distribution, the title element 2207 representing the name of distribution, and a description element 2209 which describes an outline of distribution. The link element 2208 describes the URI of the top page of a Web application (remote UI) of the image processing apparatus 110.

The date element 2301 describes a date and time when feed data is generated. The generatorAgent element 2302 describes software which generates feed data. The subject element 2304 describes the category of an entry. The creator element 2305 describes a user, i.e., operator who is involved in generation of an entry. The date element 2306 describes a date and time when an entry is generated.

The item element 2204 is an item which lists update data obtained by processing an update information entry. That is, the image processing apparatus 110 outputs update data in the format of a markup language notation including a plurality of items. The item element 2204 contains the link element 2218 representing a URI associated with the update information, the title element 2217 representing the name of each update information, and the description element 2219 which describes an outline of each update information. The link element 2218 describes the URI of a page which displays details of update information corresponding to an entry in the Web application (remote UI) of the image processing apparatus 110.

(Acquisition and Use of Update Information Feed Data of Provided Service)

Figure 27:
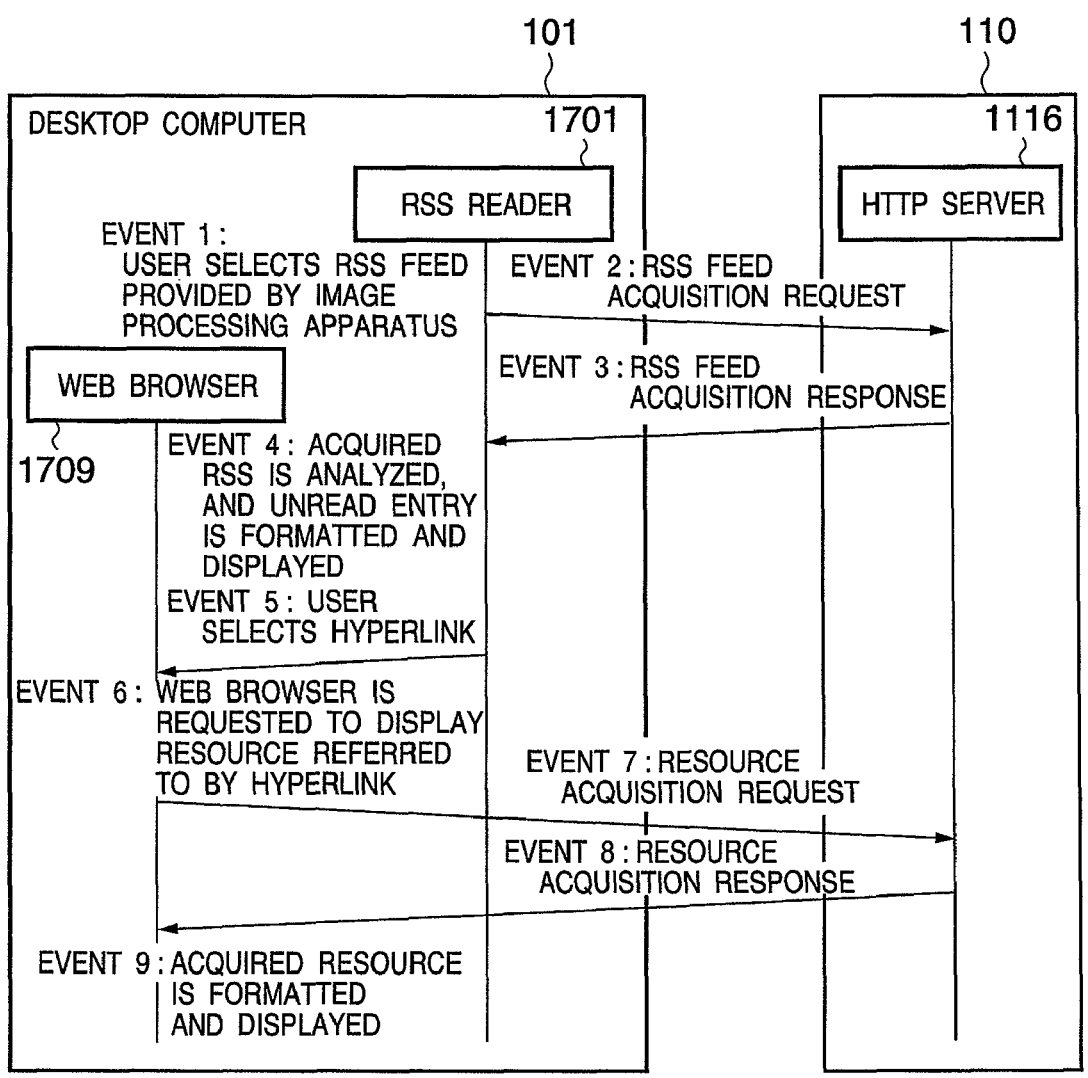
FIG. 27 is a sequence chart for explaining a sequence of communication and cooperation when a client uses an update information feed file provided by the image processing apparatus.

FIG. 27 is a sequence chart for explaining the sequence of communication and cooperation when a client uses an update information feed file provided by the image processing apparatus. The RSS reader 1710 and Web browser 1709 which run on the desktop computer 101, and the HTTP server 1116 which runs on the image processing apparatus 110 cooperate with each other by communication. The software modules of the RSS reader 1710 and Web browser 1709 need not always be installed in the desktop computer 101. For example, these software modules may be installed in another type of information processing apparatus or an embedded apparatus. Alternatively, these software modules may be so installed as to run on the image processing apparatus 110 itself or another image processing apparatus 120 or 130. Since a feed file for syndicating update information is described in a general-purpose XML format and can be specified and acquired by a URI, the form, function, and system configuration of a client which utilizes update information can be flexibly combined. The structure of the above-described syndication data contains the link element 2308 in the channel element and the link element 2218 in the item element, and thus can be easily cooperated with a Web page and Web application provided by the image processing apparatus 110.

At event 1, the user 1702 (not shown) selects an RSS feed of an image processing apparatus of interest by using the RSS reader 1710.

At event 2, the RSS reader 1710 establishes communication with the HTTP server 1116, and transmits an RSS feed acquisition request. Communication is generally performed using an application protocol such as HTTP or HTTPS.

At event 3, the HTTP server 1116 sends back an update information feed file stored in the image processing apparatus to the RSS reader 1710 as a response to the HTTP request.

At event 4, the RSS reader 1710 analyzes the acquired feed file, and formats and displays an entry which has not been read by the user 1702. The displayed update information displays, as a selectable anchor, link information defined by the XML format of syndication. When a description of the update information entry contains a hypertext such as HTML, the hyperlink is displayed as a selectable anchor.

At event 5, the user selects the anchor of a link contained in the entry displayed by the RSS reader 1710.

At event 6, the RSS reader 1710 performs application communication with the Web browser 1709, and requests the Web browser 1709 to display a resource specified by a URI described by the link.

At event 7, the Web browser 1709 acquires the requested resource. If location information of the URI which specifies the given resource designates the HTTP server 1116 of the image processing apparatus 110, the Web browser 1709 establishes communication with the HTTP server 1116, and transmits a resource acquisition request. Communication is generally performed using an application protocol such as HTTP or HTTPS. For example, the Web browser 1709 issues the acquisition request by designating a URI assigned to a servlet running on the JVM 1104 of the image processing apparatus 110.

At event 8, the HTTP server 1116 sends back the requested resource as a response to the HTTP request to the Web browser 1709. The HTTP server 1116 reads out the requested resource from the storage, or dynamically generates it by the program. For example, when the resource designated by the acquisition request is a servlet, the HTTP server 1116 transfers the acquisition request to the servlet, and sends back a response such as HTL data generated as a result of a process by the servlet.

At event 9, the Web browser 1709 formats and displays the acquired resource.

Figure 28:
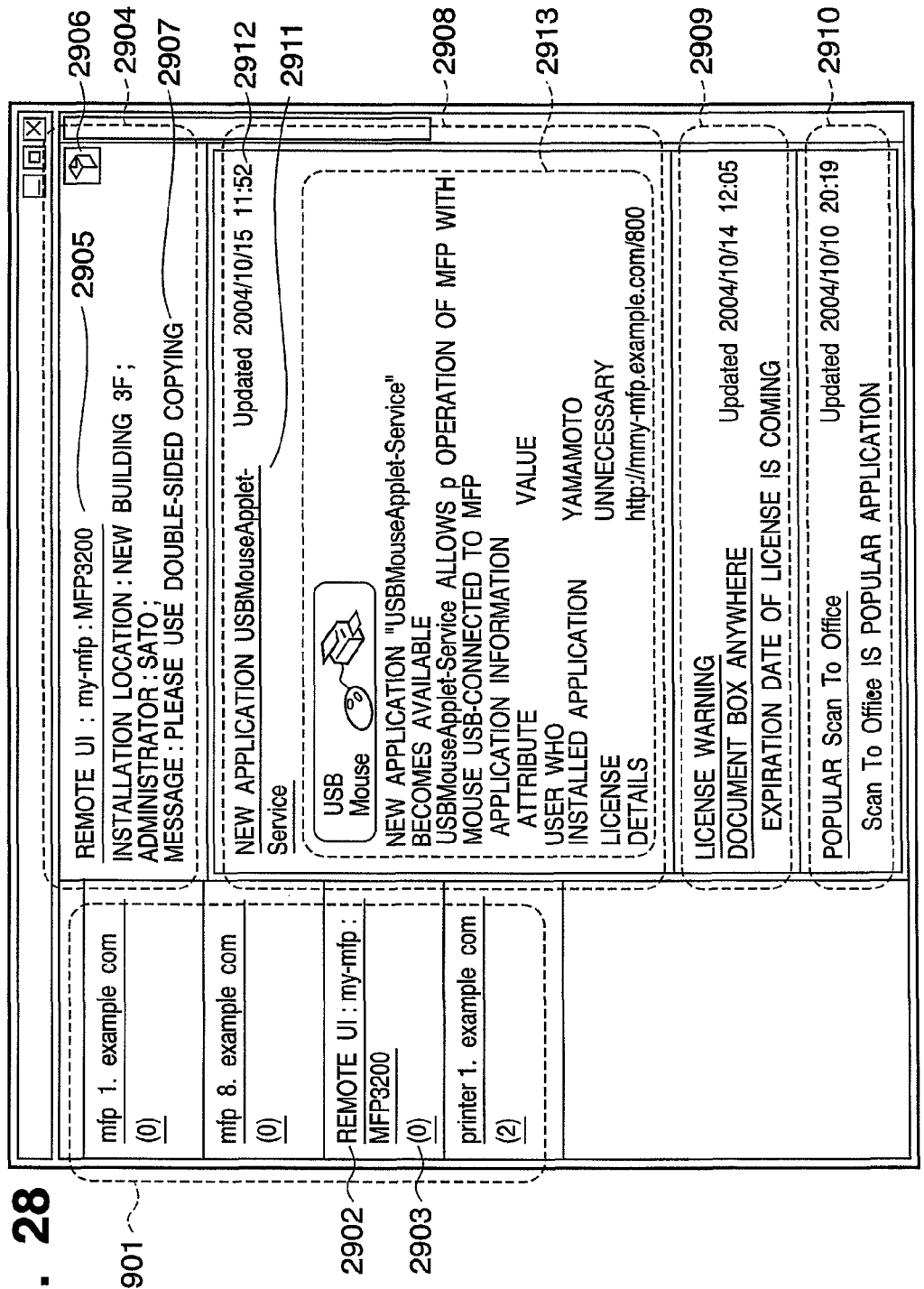
FIG. 28 is a view showing an example of an update information feed display window displayed by a general feed reader.

FIG. 28 shows an example of an update information feed display window displayed by a general feed reader. The feed reader in FIG. 28 is, e.g., the RSS reader 1710 running on the desktop computer 101. An RSS feed list 2901 is a menu which is set in advance in the feed reader, is found as a result of dynamic search by the feed reader, or lists available syndication feed data. Each item of the list corresponds to available feed data. When the user selects an item, the feed reader acquires corresponding feed data, expands it, and displays it on the right pane. The highlight of an item means that the item is selected. A feed title 2902 displays the title of feed data for identifying feed data corresponding to the item. An unread count 2903 displays the number of unread entries contained in feed data corresponding to the item.

The right pane in the display window of FIG. 28 will be explained. The right pane displays information corresponding to feed data selected from the RSS feed list 2901. A feed outline 2904 displays an overall outline of feed data. The displayed information corresponds to the contents of the channel element 2202 in the RSS feed examples of FIGS. 22 and 26. A feed title 2905 displays the title of feed data, and corresponds to the title element 2207 in the channel element 2202 in the RSS feed example. The displayed title is the anchor of a hypertext, and when the user selects the title, the resource of a URI described in the link element 2208 is acquired and displayed in cooperation with the Web browser 1709. In this example, the feed title 2905 is the anchor of a top page which provides a portal of Web applications in the image processing apparatus 110.

A feed logo image 2906 displays the logo image of feed data. Although not shown in the RSS feed example, the feed logo image 2906 corresponds to the image elements 2210 and 2203. Displayed image data is a resource acquired from a URI described in the url element 2215. The displayed image is an anchor, and when the user selects the image, the resource of a URI described in the link element 2216 is acquired and displayed in cooperation with the Web browser 1709. A feed outline 2907 displays a description of an outline of feed data, and corresponds to the description element 2209 in the RSS feed example. As shown in this example, data to be syndicated can be flexibly designed by freely combining feed data formats and template variables which can be replaced with various types of information held in the image processing apparatus. Update information entries 2908, 2909, and 2910 display update information syndicated by feed files. In the RSS feed example, the update information entries 2908, 2909, and 2910 are indexed as a list of the li elements 2213 in the items element 2211, and correspond to elements listed in the item elements 2204, 2205, and 2206.

An entry title 2911 displays the title of the update information entry. In the RSS feed example, the entry title 2911 corresponds to the title element 2217. The displayed title is the anchor of a hypertext, and when the user selects the title, the resource of a URI described in the link element 2218 is acquired and displayed in cooperation with the Web browser 1709. In this example, the entry title 2911 is the anchor of an individual entry information page for browsing details of the update information entry. An entry update date & time 2912 displays a date and time when an update information entry event occurs. In the RSS feed example, the entry update date & time 2912 corresponds to the date element 2306.

An entry description 2913 describes information on an update information entry. In the RSS feed example, the entry description 2913 corresponds to the description element 2219. The entry description is structured as a text marked up in HTML (XHTML) using an image, citation, table, and the like. The entry description is formatted and displayed so as to present the structures of these elements. Links to various resources including a Web page and E-mail address are embedded in the entry description, and their anchors are also displayed. In generating an RSS feed example, displayed information is generated on the basis of templates, various databases in the image processing apparatus, and various types of information obtained via the apparatus control class library 1106. As shown in this example, data to be syndicated can be flexibly designed by freely combining feed data formats and template variables which can be replaced with various types of information held in the image processing apparatus. For example, an anchor described in the "details" attribute value field of the table is a link to the detailed information page of the application, and when the user selects this anchor, a Web page which provides detailed application information as shown in FIG. 14 can be easily browsed. When an application associated with an entry is a Web application, an anchor which describes a link to a Web page for operating the application itself is embedded, and update information is so configured as to utilize the Web application by one action from the browsing window.

By the above configuration and operation, when the state of designated data changes, the image processing apparatus according to the first embodiment generates and saves data of a predetermined format (RSS 1.0 in the first embodiment) that represents the change in state and schematic contents of the change. The data of the predetermined format is read out by a computer which can interpret and process the data, and a remote computer can be notified of the change in data that has occurred in the image processing apparatus. Since the data complies with RSS, a change in state of the image processing apparatus can be easily monitored at low cost by causing a computer to execute a program including a commercially available or free RSS reader function. The computer can poll a change in state at a set interval of, e.g., 1 h, 1 day, or 1 week, or poll it at a designated timing. In addition, data is described in XML and can be easily processed.

As the apparatus state, many pieces of information can be monitored, including installation and uninstallation of an application, the start and stop of the application, a warning of expiration of the term of validity of a license, license invalidation, and statistical information. Further, monitoring targets can be selected. The period during which state change information is supplied to a computer can also be designated.

Needless to say, events to be monitored are not limited to the above ones, and another event can also be monitored. For example, a change in settings important to security (e.g., switching of whether to perform encryption, and TCP/IP port setting) may also be monitored.

Second Embodiment

Figure 29:
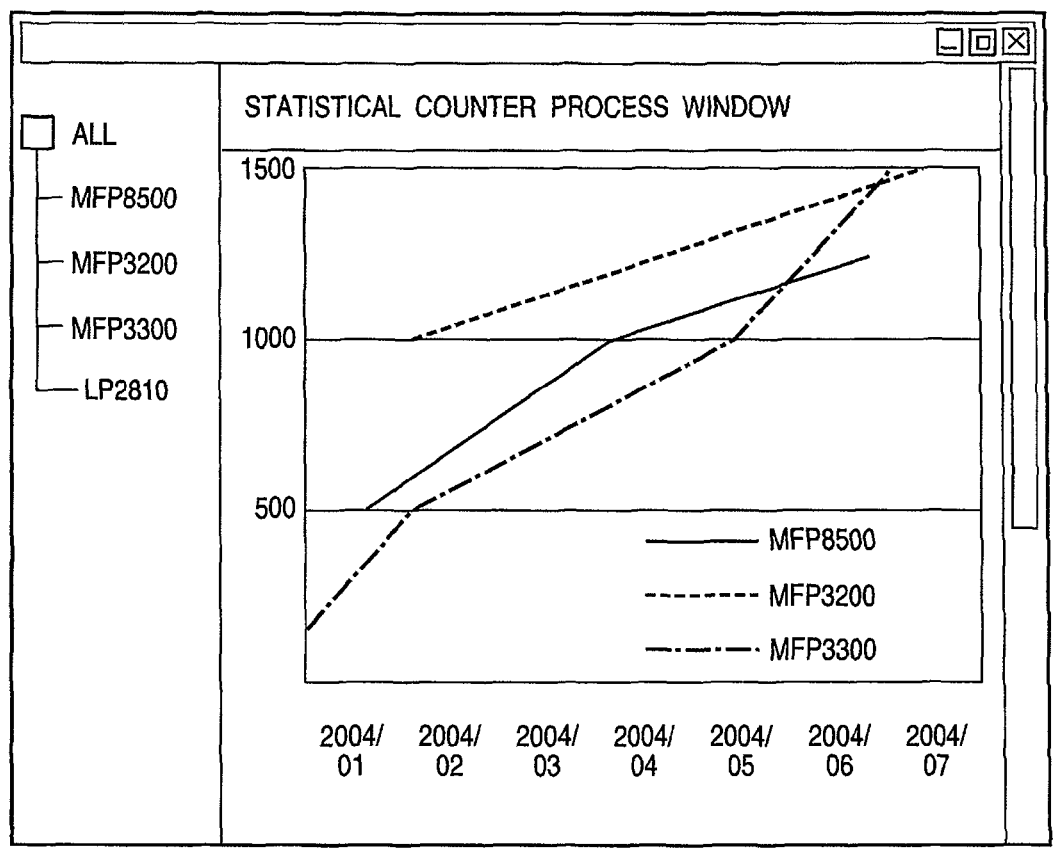
FIG. 29 is a view showing a display example of a dedicated application which performs aggregation of feed files and a statistical process, and displays the resultant data.

FIG. 29 is a view showing a display example of a dedicated application which performs aggregation of feed files and a statistical process, and displays the resultant data. The application in FIG. 29 runs on a desktop computer 101 or the like. The application integrates a plurality of feed data, processes them together with a stock of past feed data, and generates a graphical display. The syndication format (e.g., RSS 1.0) of feed data is expanded using the framework of XML expandability, and a uniquely defined element is contained to embed a dedicated value such as counter information of the apparatus. Update information provided by the image processing apparatus is described in XML, and can be acquired by referring to a URI, browsed by a general RSS feed reader, and applied to various purposes, like this example.

Third Embodiment (Generation and Supply of Feed Data of Box-Related Update Information)

Figure 30:
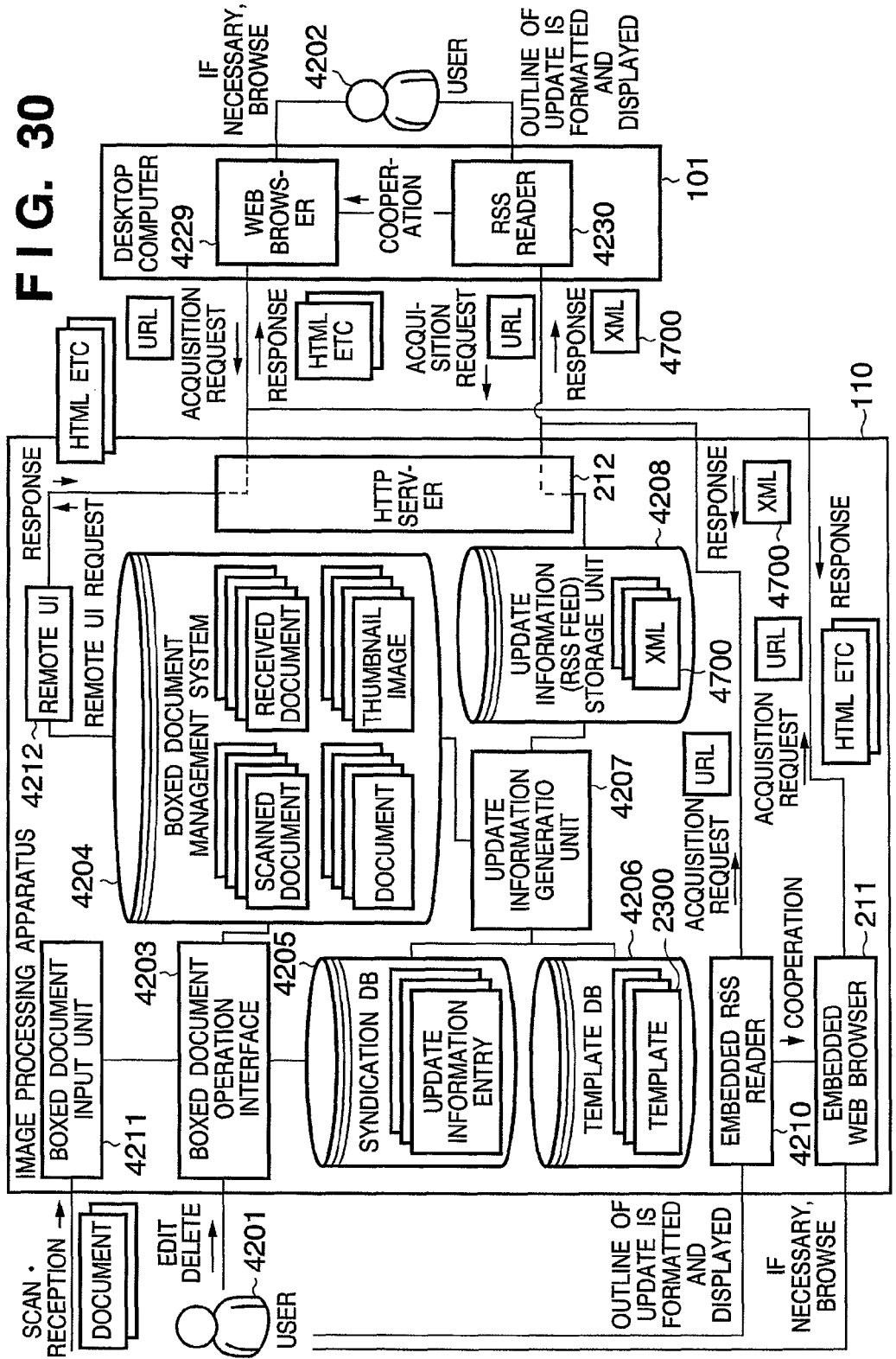
FIG. 30 is a block diagram showing a software structure for generating and supplying the RSS feed of box-related update information.

FIG. 30 is a block diagram showing a software structure for generating and supplying the RSS feed of box-related update information. A user 4201 operates a box, and performs operations such as addition, editing, and deletion of a document to a box function which is embedded in an image processing apparatus 110 and serves as a document management system. A document input unit 4211 inputs a document outside the apparatus into the image processing apparatus 110. The document input unit 4211 adds, as a document file to the box function, image pages which are loaded by operating the scanner of the image processing apparatus 110 by the user 4201. The document input unit 4211 also adds, as a document file to the box function, document data which is transmitted from a remote place to the image processing apparatus 110 by the communication protocol of the FAX, IFAX, E-mail, or the like.

The user 4201 accesses the same image processing apparatus 110 via an embedded RSS reader 4210 running on the image processing apparatus 110, and refers to box-related update information. The user 4201 accesses the same image processing apparatus 110 via an embedded Web browser 211 running on the image processing apparatus 110, and browses a resource and Web application provided by the image processing apparatus 110.

A software configuration for generating and supplying the RSS feed of box-related update information in the image processing apparatus 110 will be explained. A document operation interface 4203 provides an interface for operating the box function of the image processing apparatus 110. A boxed document management system 4204 is a database for the box function serving as the embedded document management system of the image processing apparatus 110. Data stored in the database include a scanned/loaded document file, a document file received by the communication function, a document file input by another input route such as generation by the PDL function, and the thumbnail image file of each document.

A syndication DB 4205 accumulates and manages data used to syndicate update information related to the box function of the image processing apparatus 110. The accumulated/managed data include an update information entry which is generated while holding attribute information on an event every time an event of a change in box structure and documents accumulated in the box occurs.

A template DB 4206 accumulates and manages templates which provide XML file formats used for syndication. XML applications for syndication comply with respective RSS versions and the specifications of Atom and the like. A plurality of templates are prepared in accordance with types of information to be syndicated and pursuant specifications. An update information generation unit 4207 includes a template engine which generates, on the basis of templates accumulated and managed in the template DB 4206, an XML file used for syndication from data which are accumulated and managed in the syndication DB 4205, and attributes (e.g., the configuration and state of the image processing apparatus 110) obtained from an apparatus control class library 1106. The update information generation unit 4207 stores the generated XML file (syndication data file for RSS, Atom, or the like) in an update information (RSS) storage unit 4208.

The update information (RSS) storage unit 4208 accumulates an XML file used for syndication. The update information storage unit 4208 holds a plurality of different files in accordance with types of information to be syndicated. In accordance with the specifications of pursuant XML applications, the update information storage unit 4208 holds a plurality of files which are described in respective RSS versions and formats such as Atom. The update information storage unit 4208 is mounted as a file system which can be accessed by an HTTP server 212. The files of XML files accumulated in the update information storage unit 4208 are specified by unique URLs when viewed from HTTP clients connected to the HTTP server 212. When an HTTP client is connected to the HTTP server 212 and requests acquisition of a resource specified by a URL, the HTTP server 212 reads out, from the update information storage unit 4208, an XML file corresponding to the URL designated by the acquisition request, and transmits the XML file to the HTTP client.

In response to a request based on HTTP or HTTPS from an HTTP client, the HTTP server 212 transfers, as a response, data of various resources internally held in the image processing apparatus 110. Examples of the resource accessed by the client by HTTP are static data files (including XML files held in the update information image storage unit 4208) such as HTML files and image files which are hold in a nonvolatile memory (e.g., HDD 304) in the image processing apparatus 110, and data dynamically generated by a program executed by a CPU 301. Data dynamically generated in response to an HTTP request include HTML data which are generated by various Web applications such as a remote UI 4212.

The remote UI 4212 is a Web application provided by the image processing apparatus 110, and provides the same function as that of the document operation interface 4203 to a client such as a connected Web browser.

The embedded RSS reader 4210 is an embedded application program which acquires each RSS version and an XML format (e.g., Atom) for syndication, and formats and displays data. The display and operation are done on an operation unit 122 of the image processing apparatus 110. Most of news distribution sites, information providing sites, and Web sites (e.g., weblog or blog) present on the Internet provide syndication data in order to syndicate new articles of sites, in addition to contents of the sites. By using the RSS reader 4210, the user 4201 can efficiently browse the titles and contents of new articles of sites on the Internet. The RSS reader 4210 can access even syndication data not only on the Internet but also on an intranet as far as the data is laid open to the public as a resource which can be specified by a URI and acquired. A URI for identifying syndication data stored in the update information storage unit 4208 of the image processing apparatus 110 is designated to transmit an HTTP acquisition request from the RSS reader 4210 to the HTTP server 212. As a response from the HTTP server 212, the RSS reader 4210 can receive syndication data stored in the update information storage unit 4208. In some cases, syndication data which is formatted and displayed by the RSS reader 4210 contains a hyperlink specified by a URI. When the user 4201 selects a specific hyperlink on the display of the RSS reader 4210, the RSS reader 4210 causes the Web browser 211 to acquire and display the URI in cooperation with the embedded Web browser 211. Upon reception of a request from another embedded application by communication with an application in the image processing apparatus 110, the embedded RSS reader 4210 acquires syndication data of a URI designated by the request, and displays the syndication data on the operation unit 122 of the image processing apparatus 110.

The Web browser 211 acquires various resources provided in formats specifiable by URIs in Web servers on the Internet and an intranet, for example, document data of markup languages (e.g., HTML and XHTML) and various multimedia data (still image, moving image, and audio data). The Web browser 211 appropriately formats the data, and graphically displays the data or outputs the data by voice. Data is acquired mainly using a communication protocol such as HTTP or FTP. The Web browser 211 serves as a client of a client server model in terms of the communication protocol, and is regarded as, e.g., an HTTP client. When data browsed by the user 4201 contains a hyperlink specified by a URI and the user selects the anchor of the specific hyperlink, the Web browser 211 acquires and displays resources at the designated URI. By using the form of a markup document such as an HTML document, data may be posted from the Web browser 211 to a resource on the Web server side. The user 4201 can also use the Web browser 211 to issue an acquisition request by designating a URI for specifying the remote UI 4212 of the same image processing apparatus 110. The HTTP server 212 of the image processing apparatus 110 internally transfers the acquisition request to the remote UI 4212 via an interface such as CGI (Common Gateway Interface), and sends back, to the Web browser 211, a response such as HTML data generated as a process result by the remote UI 4212. Upon reception of a request from another embedded application by communication with an application in the image processing apparatus 110, the embedded Web browser 211 acquires the resource of a URI designated by the request, and displays the resource on the operation unit 122 of the image processing apparatus 110.

The software configuration in a desktop computer 101 will be explained. The image processing apparatus 110 and desktop computer 101 are connected via a network, and software programs running on the respective apparatuses communicate data with each other in accordance with a protocol such as HTTP or HTTPS. A user 4202 accesses the image processing apparatus 110 via an RSS reader 4230 running on the desktop computer 101, and refers to box-related update information. The user 4202 accesses the image processing apparatus 110 via a Web browser 4229 running on the desktop computer 101, and browses resources and Web applications provided by the image processing apparatus 110. The operation of the RSS reader 4230 is identical to that of the embedded RSS reader 4210, and the operation of the Web browser 4229 is identical to that of the embedded Web browser 211.

Note that the RSS reader 4210 and Web browser 211, and the RSS reader 4230 and Web browser 4229 are implemented as single application programs in the third embodiment, but the RSS reader 4210 and Web browser 211, or the RSS reader 4230 and Web browser 4229 may be implemented as a single application program having the functions of both the RSS reader and Web browser. The RSS reader 4230 and Web browser 211 run on the desktop computer 101 in the above description, but may run on various general-purpose information processing apparatuses including a portable computer (e.g., PDA), in addition to the desktop computer. Alternatively, the RSS reader 4230 and Web browser 211 may run on various embedded apparatuses such as a cell phone. There is also widely known a technique of implementing distributed systems from combinations of front-end Web browsers and back-end Web applications (see, e.g., Bloglines <http://www.bloglines.com/>). When a Web application which provides such an RSS reader function is used, the operation of the embedded RSS reader 4210 can be substituted by a combination of the embedded Web browser 211 and Web application. The Web application which provides the RSS reader function may run on an external server computer, or may be configured as one of Web applications running in the image processing apparatus 110, similar to the remote UI 4212. When a feed file to be acquired exists in the same image processing apparatus 110, the embedded RSS reader 4210 may directly read out the feed file from the update information storage unit 4208 without using any network communication.

FIG. 21 is a view showing an example of an XML format used for syndication of update information of the image processing apparatus. An XML file which is stored in the update information storage unit 4208 and specified by a URI is an XML document which describes information on update of various data associated with an embedded application of the image processing apparatus, and information on various events generated in association with the embedded application of the apparatus. A plurality of types of XML document formats are provided in correspondence with various formats which are used by a general Web site to distribute update information of the site. Although the image processing apparatus 110 supports respective RSS versions and XML formats such as Atom, a description by RSS 1.0 will be exemplified. In FIG. 21, the inclusion relationship of blocks means that of XML elements.

An RDF element 2201 is the top element of an XML document. The RDF element contains a channel element 2202, image element 2203, and item elements 2204, 2205, and 2206. The channel element 2202 describes basic information on the whole update information. This element corresponds to an RDF subject node. The contents of the channel element contain a title element 2207, link element 2208, description element 2209, image element 2210, and items element 2211. The title element 2207 represents the title of the update information. The link element 2208 represents the URI of a site treated by the update information. The description element 2209 describes an explanation of, e.g., the contents and functions of the site treated by the update information. The image element 2210 describes a URI which specifies an image resource such as the logo of the site treated by the update information. Details of the image element 2210 will be described later in association with the image element 2203 to be described below. The items element 2211 provides the indices of the item elements 2204, 2205, and 2206. A li element 2213 listed in the contents of a Seq element 2212 represents each update information URI. The image element 2203 expresses an image such as a logo. The contents of the image element 2203 contain a title element 2214, url element 2215, and link element 2216. The title element 2214 represents the title of an image, and is sometimes used as an alternative text of the image. The url element 2215 describes the URI of an image resource. When a hyperlink using this image as an anchor is displayed, the link element 2216 describes a URI used as a link destination. The item elements 2204, 2205, and 2206, and the like represent the order of elements each expressing update information. The contents of the item element contain a title element 2217, link element 2218, and description element 2219. The title element 2217 describes the title of update information. The link element 2218 describes the URI of the update information. The description element 2219 describes a description of the update information.

Figure 31:
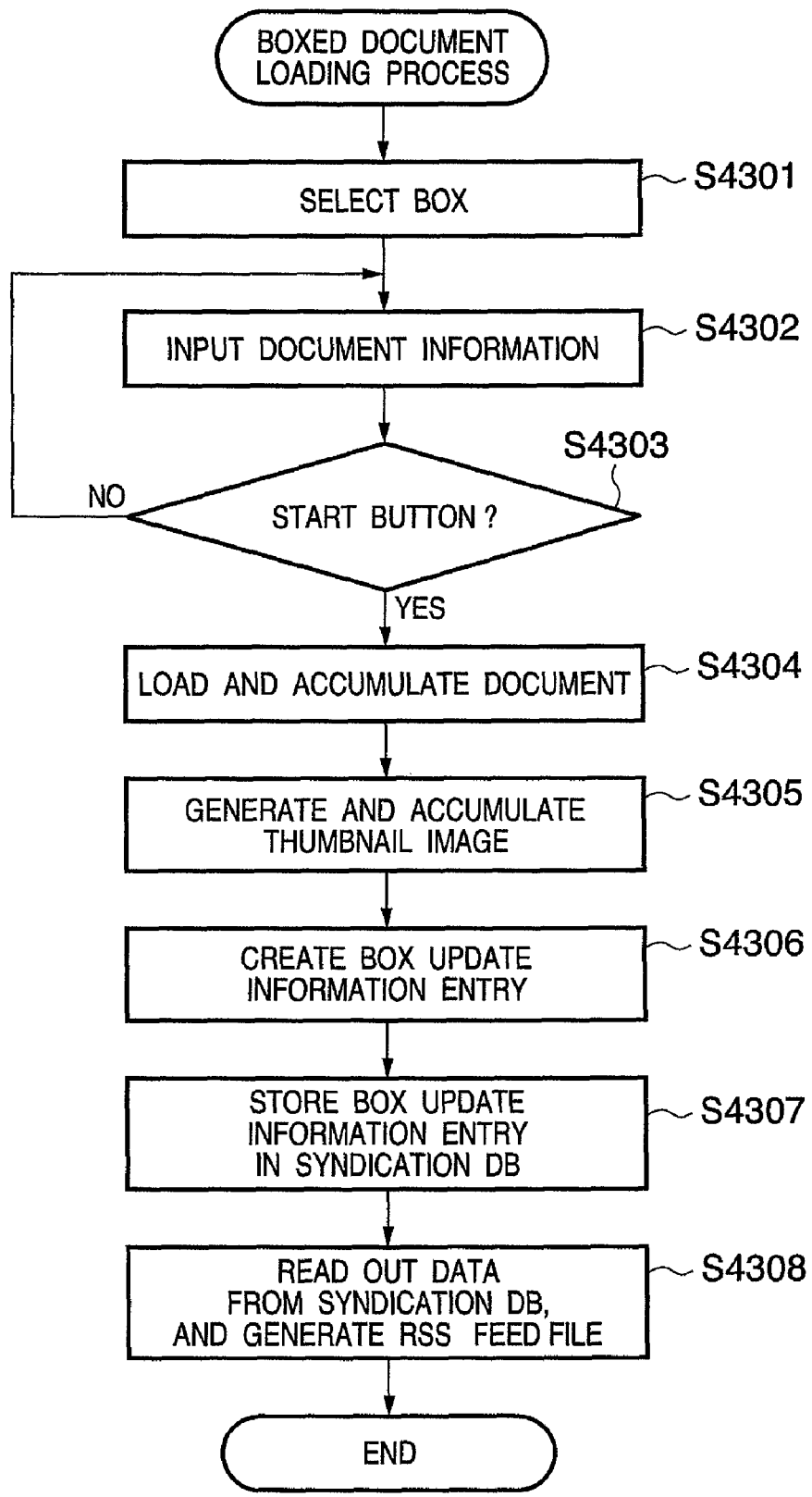
FIG. 31 is a flowchart showing boxed document loading process procedures in the image processing apparatus.

FIG. 31 is a flowchart showing boxed document loading process procedures in the image processing apparatus. In step S4301, a box selection process by the user is accepted. In step S4302, a document information input by the user is accepted. The document information is the document name of a document to be loaded and a description of the document. The user inputs document information with the button of an operation window. An input window appears when "box" is selected from the window of FIG. 9, and allows the user to input document information. In step S4303, it is determined whether the start button is pressed. If the start button is pressed, the flow advances to step S4304; if no start button is pressed, returns to step S4302 to accept a document information input.

In step S4304, a document is loaded and accumulated in the box. In step S4305, the resolution of the loaded image is decreased to generate and accumulate a thumbnail image. In step S4306, a box update information entry is generated. More specifically, an update information entry which describes detailed information of the loaded document is generated. The update information entry also contains the generated thumbnail image. In step S4307, the generated update information entry is stored in the syndication DB. In step S4308, an RSS feed file generation process is called to generate a new RSS feed file from the syndication DB which is changed by adding the new update information entry.

Figure 32:
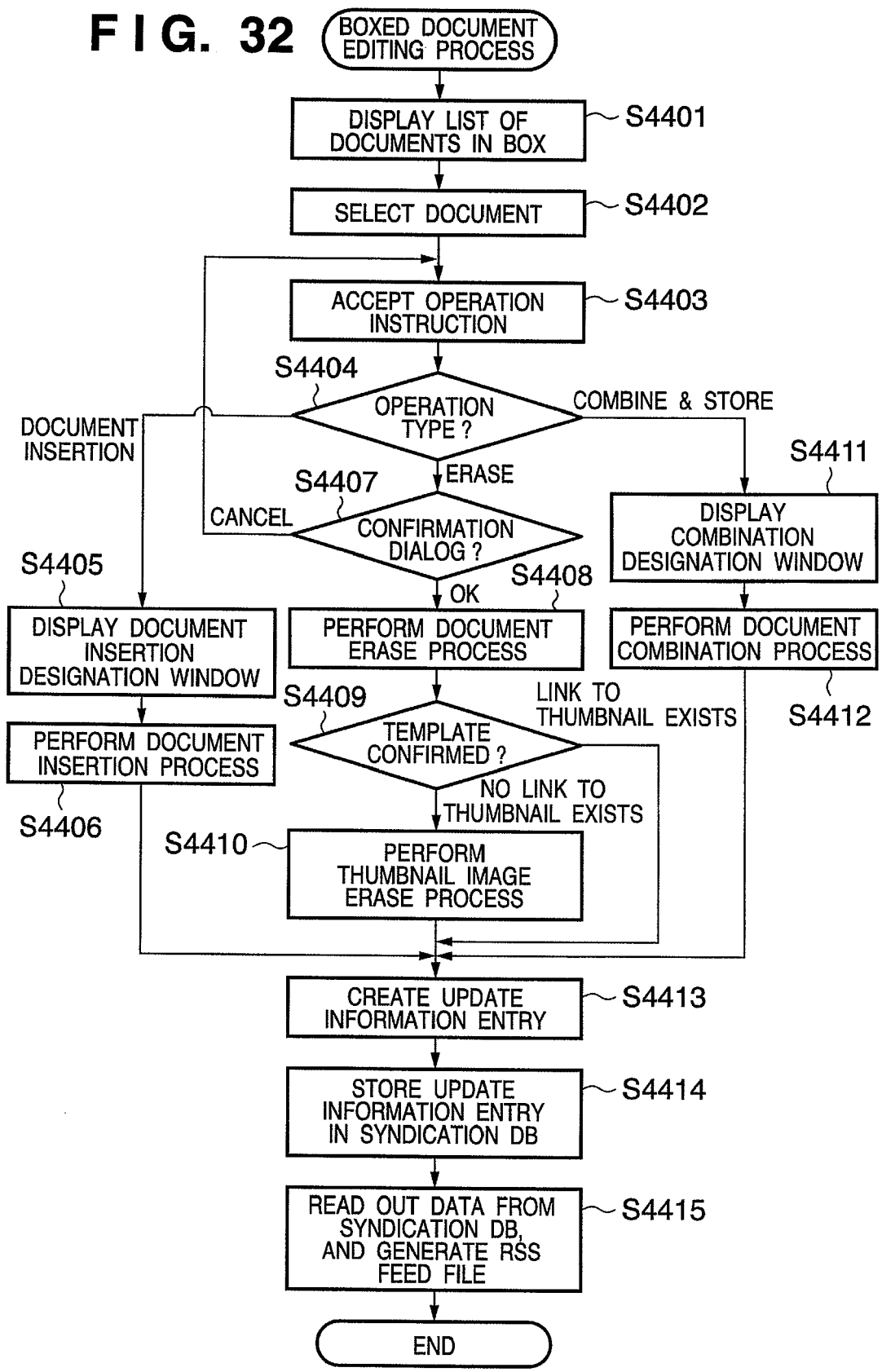
FIG. 32 is a flowchart showing boxed document editing process procedures in the image processing apparatus.

FIG. 32 is a flowchart showing boxed document editing process procedures in the image processing apparatus. In step S4401, a list of documents in the box is displayed. In step S4402, document selection by the user is accepted. The following operation targets the selected document. In step S4403, an operation instruction from the user is accepted. In step S4404, the condition branches in accordance with the operation type. If the selected operation type is document insertion, the flow advances to step S4405; if the selected operation type is erase, to step S4407; if the selected operation type is combine & store, to step S4411.

In step S4405, a window for inputting an insertion instruction is displayed. In the insertion instruction window, the user inputs a document to be inserted, insertion position, document name after insertion, and the like. In step S4406, a document insertion process is performed to generate a new document. Then, the flow advances to step S4413. In step S4407, a dialog which prompts the user to confirm whether to actually erase the document is displayed to wait for an input by the user. If the user cancels erase, the flow returns to S4403; if the user responds OK, advances to S4408. In step S4408, the selected document is erased. After that, the flow advances to step S4409.

In step S4409, a template used to generate a syndication data file (feed file) is extracted from the template DB 1706 to determine whether the template contains a link to a thumbnail image. If the template contains a link to a thumbnail image, the flow advances to step S4410; if the template does not contain any link to a thumbnail image, to S4413. In step S4410, the thumbnail image is erased. Thereafter, the flow advances to step S4413. In step S4411, a window for inputting a combine/store instruction is displayed. In the combine/store window, the user inputs documents to be combined, the combination order, document name after combination, and the like. In step S4412, a combine/store process is performed to generate a new document. Then, the flow advances to step S4413.

In step S4413, an update information entry is generated in accordance with the process executed in the preceding step. That is, an update information entry which describes detailed information of the event is generated in correspondence with the event such as document insertion, document erase, or combine & store. In step S4414, the generated update information entry is stored in the syndication DB. In step S4415, an RSS feed file generation process is called to generate a new RSS feed file from the syndication DB which is changed by adding the new update information entry.

In accumulating or editing a boxed document, its importance [more importance/normal/less importance] can be selected and set. The period during which update information is posted in the update information file can be set in accordance with the importance.

Figure 33:
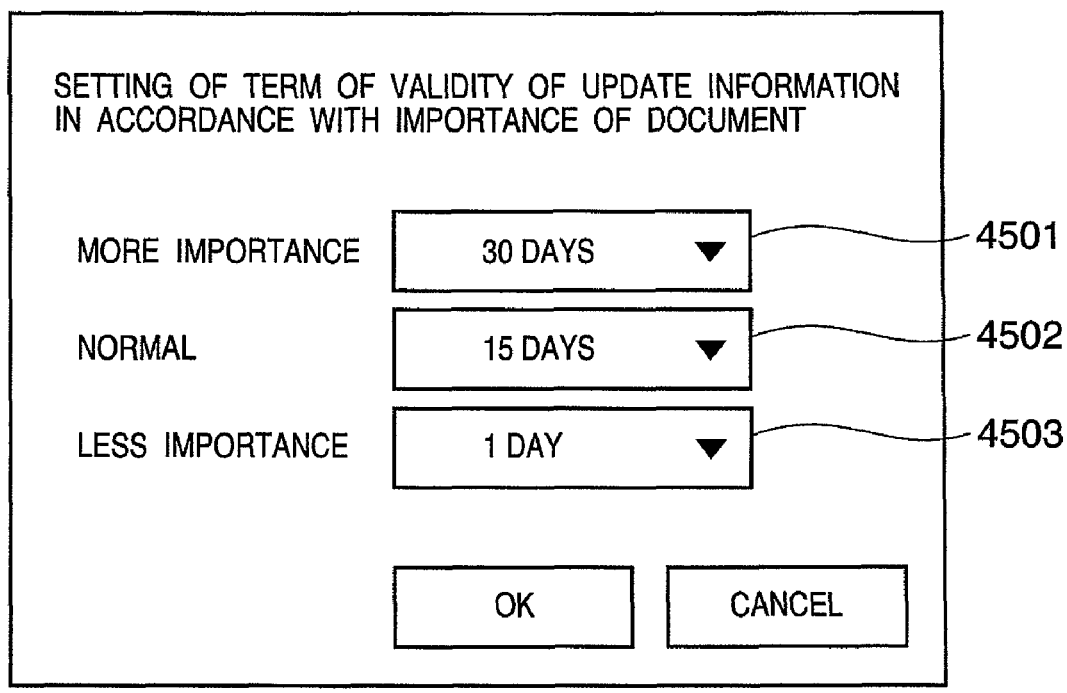
FIG. 33 is a view showing an example of a window for setting a period during which update information is posted in the update information file.

FIG. 33 is a view showing an example of a window for setting a period during which update information is posted in the update information file. A pull-down menu for setting a period is displayed for each importance level of a document. For example, each pull-down menu allows selecting [1 day/2 days/3 days/4 days/5 days/6 days/7 days/10 days/15 days/30 days]. Reference numerals 4501 denotes a pull-down menu for setting a period during which an event is treated as update information upon generation of an event to a document set as "more importance"; 4502, a pull-down menu for setting a period during which an event is treated as update information upon generation of an event to a document set as "normal"; and 4503, a pull-down menu for setting a period during which an event is treated as update information upon generation of an event to a document set as "less importance". In response to an update information file acquisition request, an entry whose term of validity has expired is deleted from the update information file. In the reception box, the period during which update information is posted in the update information file can be set in accordance with the source of a received document. Similar to the first embodiment, the period information is saved and referred to in generating syndication data.

FIG. 34 is a view showing an example of a window for setting a period during which update information of a document in the reception box is posted in the update file. Reference numerals 4601, 4602, and 4603 denote areas for inputting a source. When each area is pressed, a soft keyboard window (not shown) is displayed to allow inputting a source. Reference numerals 4604, 4605, and 4606 denote pull-down menus for setting the term of validity for each source. For example, each pull-down menu allows selecting [1 day/2 days/3 days/4 days/5 days/6 days/7 days/10 days/15 days/30 days]. In response to an update information file acquisition request, an entry whose term of validity has expired is deleted from the update information file.

FIG. 35 is a view showing an example of a feed file (i.e., syndication data) for syndicating box-related update information. The feed file illustrated in FIG. 35 is XML data of the RSS 1.0 format. The feed file is stored in the update information storage unit 4208, and can be specified by a URI and acquired outside or inside the image processing apparatus 110. The same reference numerals denote the same RSS 1.0 vocabularies as those described above in important descriptions, and a description thereof will be omitted. Since update information feed data which is generated from the template in FIG. 35 for syndication is an XML application of the RSS 1.0 format, it has module expandability using an XML name space. In other words, the update information feed data can be combined with other XML vocabularies to easily add necessary information in syndication feed data. For example, the following elements are combined from the DCMES properties of Dublin Core frequently used as standard metadata description elements.

That is, date elements 4701 and 4706, a subject element 4704, a creator element 4705, and a generatorAgent element 4702 from an Admin module are combined. The date element 4701 describes a date and time when feed data is generated. The generatorAgent element 4702 describes software which generates feed data. The subject element 4704 describes the category of an entry. The creator element 4705 describes a user, i.e., operator who is involved in generation of an entry. The date element 4706 describes a date and time when an entry is generated. As one of large effects of the third embodiment, it becomes easy to flexibly, strictly expand a data format for feeding update information.

(Acquisition and Display of Update Information Feed Data)

FIG. 36 shows an example of a boxed document update information feed display window displayed on the operation panel of the image processing apparatus. An RSS feed list 5301 is a menu which is set in advance in the feed reader, is found as a result of dynamic search by the feed reader, or lists available syndication feed data. Each item of the list corresponds to available feed data. When the user selects an item, the feed reader acquires corresponding feed data, expands it, and displays it on the right pane. The highlight of an item means that the item is selected.

Note that when the window is automatically activated by a boxed document list display operation, the window appears while feed data of a boxed document in the image processing apparatus itself is selected. At this time, the area of the RSS feed list 5301 may be hidden. A feed title 5302 displays the title of feed data for identifying feed data corresponding to an item. An unread count 5303 displays the number of unread entries contained in feed data corresponding to an item. The right pane in the display window of FIG. 36 will be explained. The right pane displays information corresponding to feed data selected from the RSS feed list 5301. A feed outline 5304 displays an overall outline of feed data. The displayed information corresponds to the contents of the channel element 2202 in the RSS feed example of FIG. 35.

A feed title 5305 displays the title of feed data, and corresponds to the title element 2207 in the channel element 2202 in the RSS feed example. The displayed title is the anchor of a hypertext, and when the user selects the title, the resource of a URI described in the link element 2208 is acquired and displayed in cooperation with the Web browser. In this example, the feed title 5305 is the anchor of a top page which provides a portal of Web applications in the image processing apparatus 110. A feed logo image 5306 displays the logo image of feed data. Although not shown in the RSS feed example, the feed logo image 5306 corresponds to the image elements 2210 and 2203. The displayed image data is a resource acquired from a URI described in the url element 2215. The displayed image is an anchor, and when the user selects the image, the Web browser is activated to acquire and display the resource of a URI described in the link element 2216.

A feed outline 5307 displays a description of an outline of feed data, and corresponds to the description element 2209 in the RSS feed example. As shown in this example, data to be syndicated can be flexibly designed by freely combining feed data formats and template variables which can be replaced with various types of information held in the image processing apparatus. Update information entries 5308, 5309, and 5310 display update information syndicated by feed files. In the RSS feed example, the update information entries 5308, 5309, and 5310 are indexed as a list of the li elements 2213 in the items element 2211, and correspond to elements listed in the item elements 2204, 2205, and 2206.

An entry title 5311 displays the title of the update information entry. In the RSS feed example, the entry title 5311 corresponds to the title element 2217. The displayed title is the anchor of a hypertext, and when the user selects the title, the Web browser is activated to acquire and display the resource of a URI described in the link element 2218. In this example, the entry title 5311 is the anchor of an individual entry information page for browsing details of the update information entry.

An entry update date & time 5312 displays a date and time when an update information entry event occurs. In the RSS feed example, the entry update date & time 5312 corresponds to the date element 2306. An entry description 5313 describes information on an update information entry. In the RSS feed example, the entry description 5313 corresponds to the description element 2219. The entry description is structured as a text marked up in HTML (XHTML) using an image, citation, table, and the like. The entry description is formatted and displayed so as to present the structures of these elements. Links to various resources including a Web page and E-mail address are embedded in the entry description, and their anchors are also displayed.

In generating an RSS feed example, displayed information is generated on the basis of templates, various databases in the image processing apparatus, and various types of information obtained via the apparatus control class library 1106. As shown in this example, data to be syndicated can be flexibly designed by freely combining feed data formats and template variables which can be replaced with various types of information held in the image processing apparatus. In the example of FIG. 36, the text of a document explanation and the thumbnail image of a document are displayed.

Figure 37:
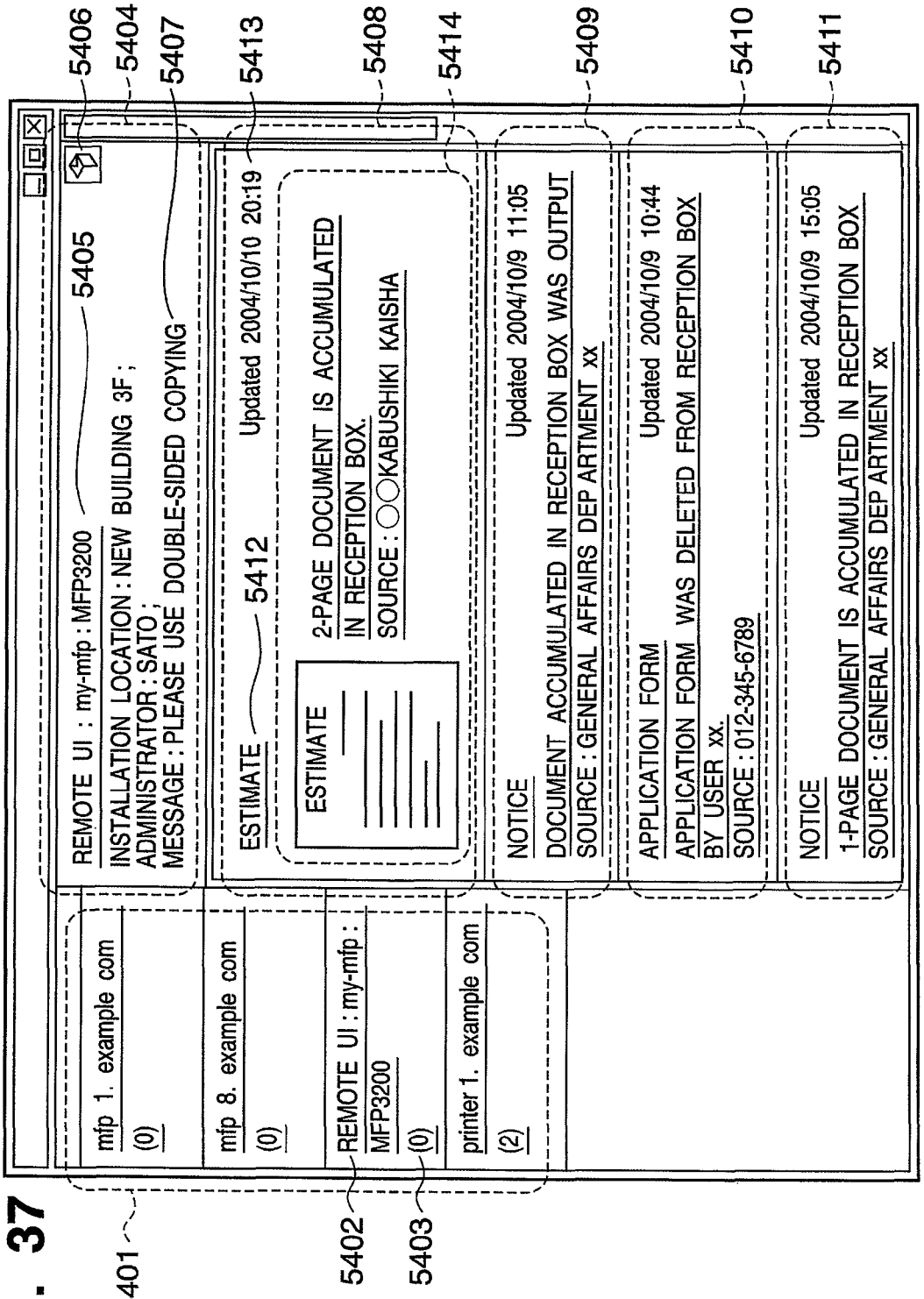
FIG. 37 is a view showing an example of a reception box update information feed display window displayed by a general feed reader.

FIG. 37 shows an example of a reception box update information feed display window displayed by a general feed reader. The feed reader in FIG. 37 is, e.g., an RSS reader 1710 running on the desktop computer 101. The window in FIG. 37 is the same as that in FIG. 36 except that an entry description 5414 describes the contents of update information of the reception box, so a detailed description thereof will be omitted. The entry description 5414 contains the event type, the source, and the thumbnail image of a received document.

FIG. 38 shows an example of an update information feed display window which is displayed by a general feed reader and related to deletion of a boxed document. The window in FIG. 38 is the same as that in FIG. 36 except that an entry description 5514 describes the contents of boxed document deletion information, so a detailed description thereof will be omitted. The entry description 5514 contains the name of a user who performed a deletion process, and the thumbnail image of a document. Note that a document is deleted by a user operation or automatically upon the lapse of a preset save period. In either case, the deletion is recorded as an update information entry.

Fourth Embodiment

When the user performs an editing operation such as registration, editing, or deletion to the address book, an update information entry can be created and stored in the syndication DB to generate a feed file. FIG. 39 shows an example of an address book update information feed display window displayed on the operation panel of an image processing apparatus. The window in FIG. 39 is the same as that in FIG. 36 except that an entry description 6014 describes the contents of address book update information, so a detailed description thereof will be omitted. The entry description 6014 contains the name of a user who performed an address book update process, and the contents of the change.

Fifth Embodiment

When the user performs an editing operation such as registration, editing, or deletion to the bulletin board function of an image processing apparatus, an update information entry can be created and stored in the syndication DB to generate a feed file. FIG. 40 shows an example of a bulletin board update information feed display window displayed on the operation panel of the image processing apparatus. The bulletin board function is to display a set character string on the operation panel and the top page of a remote UI in order to deliver a message from the administrator to another user of the apparatus. The window in FIG. 40 is the same as that in FIG. 36 except that an entry description 6514 describes the contents of bulletin board update information.

Other Embodiment

Note that all the first to fifth embodiments have described a digital multi-functional peripheral (image processing apparatus) having the scanner function, the printer function, the copying function using a composition of the scanner and printer functions, the facsimile function, the electronic file function, and the like. These embodiments have described the function of providing a computer connected to the apparatus with the fact that data internally held in the apparatus has been updated, and an outline of the update. However, a connected computer can also be provided with information on update of internal data not only in the image processing apparatus but also in an embedded system connected to a network, i.e., a network device. For example, among home appliances, some recording apparatuses which record TV programs have a function of allowing remote access from a computer and programming recording. In these apparatuses, information on recording, for example, the fact of programming and the completion of recording can be provided as changes in state by RSS feeds, similar to the first to fifth embodiments. The present invention is not limited to these apparatuses, and can also be applied to devices which can be connected to a network (e.g., printer scanner, digital still camera, and video camera).

The image processing apparatuses according to the first to fifth embodiments provide information representing a change in state to a computer connected to the same network (LAN) as that of the image processing apparatuses. However, state (i.e., specific data) information in these embodiments is provided by the application layer, and can be provided over the network. In other words, even if another network (e.g., Internet) is interposed between the computer and the image processing apparatus, the image processing apparatus can provide information to the computer.

Note that the embodiments of the present invention have been explained in conformity with RSS 1.0. However, the format can be Atom or another RSS version such as RSS 0.9 (RDF Site Summary), RSS 0.91 (Rich Site Summary), RSS 0.92, or RSS 2.0 (Really Simple Syndication) as far as update information/summary information of contents can be distributed and announced. The format includes a new format for syndication which will be derived in the future.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-145881 filed on May 18, 2005, which is hereby incorporated by reference herein in its entirety.

The invention claimed is:

1. An image processing apparatus which is connected to a network and communicates with an external apparatus, comprising:
information collection means for collecting information on update of data stored in the apparatus;
generation means for generating and saving syndication data which describes the update information collected by said information collection means in a markup language; and
syndication data providing means for providing the syndication data in response to a request from the external apparatus.

2. The image processing apparatus according to claim 1, wherein said information collection means collects update information on addition, change, or deletion of the data.

3. The image processing apparatus according to claim 1, further comprising service management means for increasing/decreasing services to be provided to a user among a plurality of services which can be implemented using a function of the image processing apparatus,
wherein said information collection means collects information on a change in the services provided by said service management means.

4. The image processing apparatus according to claim 3, wherein
said service management means increases/decreases services of the apparatus by installing or uninstalling said service management means as an application program, and
said information collection means collects a change in an install state of the application as the update information.

5. The image processing apparatus according to claim 3, wherein
said service management means increases/decreases services of the apparatus by installing or uninstalling license data for controlling use of services embedded in the apparatus, and
said information collection means collects a change in an install state of the license as the update information.

6. The image processing apparatus according to claim 1, further comprising document storage means for accumulating and storing document data available as an image process target,
wherein said information collection means collects information on one of addition, deletion, editing, reception, and transmission of the accumulated document data, and a change of an accumulation method.

7. The image processing apparatus according to claim 1, further comprising address book means for accumulating and storing address data associated with a document transmission/reception process,
wherein said information collection means collects information on one of addition, deletion, and editing of the accumulated address data, and a change of an accumulation method.

8. The image processing apparatus according to claim 1, wherein a description format of the syndication data in the markup language is based on XML.

9. The image processing apparatus according to claim 8, wherein the description format based on XML is a syndication format including RSS or Atom used to supply news of a Web resource.

10. The image processing apparatus according to claim 1, further comprising information selection means for selecting the update information to be collected in accordance with an update target or an update type,
wherein said information collection means selectively collects the update information on the basis of selection by said information selection means.

11. The image processing apparatus according to claim 1, further comprising syndication period setting means for setting, in accordance with an update target or an update type, a period during which the update information is contained in the syndication data, wherein said generation means sets each update information in the syndication data on the basis of the period set by said syndication period setting means.

12. The image processing apparatus according to claim 1, further comprising template storage means for accumulating template data containing format data of the syndication data and data which describes a generation rule, wherein said generation means generates syndication data on the basis of the template.

13. The image processing apparatus according to claim 12, wherein the template contains an attribute associated with a configuration, setting, or state of the image processing apparatus, and a replaceable variable.

14. The image processing apparatus according to claim 12, further comprising template selection means for selecting, from a plurality of templates, a template used to generate the syndication data by said syndication data generation means.

15. The image processing apparatus according to claim 1, wherein when an apparatus state associated with a license condition for controlling use of services changes, said information collection means collects the change as the update information.

16. The image processing apparatus according to claim 15, wherein the apparatus state associated with the license condition is a state based on either of a counter which is counted along with an operation of the apparatus, and a system timer for acquiring a time or timing by software of the apparatus.

17. The image processing apparatus according to claim 1, wherein said information collection means also generates update information based on statistical information which changes along with use of the apparatus.

18. The image processing apparatus according to claim 1, wherein said syndication data generation means sets, in the syndication data, reference to a thumbnail image of a document associated with the update information.

19. The image processing apparatus according to claim 18, wherein while the reference to the thumbnail image of the document associated with the update information is contained in the syndication data, thumbnail image data of the document is held even after an entity of the document is deleted.

20. The image processing apparatus according to claim 1, wherein syndication data providing means performs communication by HTTP.

21. The image processing apparatus according to claim 1, further comprising message bulletin board means for displaying a message set in an operation unit for allowing a user to operate the apparatus, wherein said information collection means collects information on update of the set message.

22. A network apparatus which can communicate with an external apparatus on a network, comprising:

information collection means for collecting update information representing that data stored in the network apparatus has been updated;

generation means for generating data which describes the update information collected by said information collection means in a format that can be reproduced by the external apparatus;

save means for saving the data generated by said generation means; and data transmission means for transmitting data saved in said save means in response to a request from the external apparatus.

23. A computer readable storage medium on which is stored a computer program, said program being executable by a computer incorporated in an image processing apparatus which is connected to a network and communicates with an external apparatus, said program causing the computer to implement information collection means for collecting information on update of data stored in the apparatus, generation means for generating and saving syndication data which describes the update information collected by said information collection means in a markup language, and syndication data providing means for providing the syndication data in response to a request from the external apparatus.

24. A computer readable storage medium on which is stored a computer program, said program being executable by a computer incorporated in a network apparatus which can communicate with an external apparatus on a network, said program causing the computer to implement information collection means for collecting update information representing that data stored in the network apparatus has been updated, generation means for generating data which describes the update information collected by said information collection means in a format that can be reproduced by the external apparatus, save means for saving the data generated by said generation means, and data transmission means for transmitting data saved in said save means in response to a request from the external apparatus.

25. A control method of controlling an image processing apparatus which is connected to a network and communicates with an external apparatus, comprising:

an information collection step of collecting information on update of data stored in the apparatus;

a generation step of generating and saving syndication data which describes the update information collected in the information collection step in a markup language; and a syndication data providing step of providing the syndication data in response to a request from the external apparatus.

26. A control method of controlling a network apparatus which can communicate with an external apparatus on a network, comprising:

an information collection step of collecting update information representing that data stored in the network apparatus has been updated;

a generation step of generating data which describes the update information collected in the information collection step in a format that can be reproduced by the external apparatus;

a save step of saving, in save means, the data generated in the generation step; and a data transmission step of transmitting data saved in the save means in response to a request from the external apparatus.

27. A structure of syndication data in a markup language notation that is recorded on a computer readable recording medium and represents update information available in an information processing apparatus or an image processing apparatus, comprising:

a declaration of version information of the markup language;

a declaration of version information of the syndication data;

an element which describes information on distribution; and elements which list pieces of update information, wherein the structure of the syndication data is distributed as update information of data stored in an image processing apparatus which is connected to a network, communicates with an external apparatus, and has a printing unit or an image reading unit.

28. The syndication data structure according to claim 27, wherein the element which describes the information on distribution has at least one of a link element representing a URI associated with the distribution, a title element representing a name of the distribution, and a description element which explains an outline of the distribution.

29. The syndication data structure according to claim 27, wherein each of the elements which list the update information has at least one of a link element representing a URI associated with each update information, a title element representing a name of said each update information, and a description element which explains an outline of said each update information.

30. The syndication data structure according to claim 29, wherein the URI associated with the distribution represents a Web site held by the image processing apparatus.

31. The syndication data structure according to claim 30, wherein a URI associated with the element which lists the update information represents a specific page of a Web site held by the image processing apparatus, and the specific page includes a page representing each update information of data stored in the apparatus.

* * * * *